(12) United States Patent
Strasser et al.

(10) Patent No.: US 9,213,594 B2
(45) Date of Patent: Dec. 15, 2015

(54) APPARATUS, SYSTEM, AND METHOD FOR MANAGING OUT-OF-SERVICE CONDITIONS

(75) Inventors: John Strasser, Syracuse, UT (US); David Flynn, Sandy, UT (US); Bill Inskeep, West Valley City, UT (US)

(73) Assignee: Intelligent Intellectual Property Holdings 2 LLC, Wilmington, DE (US)

( * ) Notice: Subject to any disclaimer, the term of this patent is extended or adjusted under 35 U.S.C. 154(b) by 242 days.

(21) Appl. No.: 13/354,215

(22) Filed: Jan. 19, 2012

(65) Prior Publication Data

US 2013/0019072 A1    Jan. 17, 2013

Related U.S. Application Data

(60) Provisional application No. 61/434,362, filed on Jan. 19, 2011.

(51) Int. Cl.
*G06F 12/00* (2006.01)
*G06F 11/10* (2006.01)
*G06F 3/06* (2006.01)

(52) U.S. Cl.
CPC ............ *G06F 11/1044* (2013.01); *G06F 3/067* (2013.01); *G06F 11/108* (2013.01)

(58) Field of Classification Search
None
See application file for complete search history.

(56) References Cited

U.S. PATENT DOCUMENTS

| | | |
|---|---|---|
| 5,193,184 A | 3/1993 | Belsan et al. |
| 5,261,068 A | 11/1993 | Gaskins et al. |
| 5,325,509 A | 6/1994 | Lautzenheiser |
| 5,404,485 A | 4/1995 | Ban |
| 5,438,671 A | 8/1995 | Miles |
| 5,504,882 A | 4/1996 | Chai |
| 5,535,399 A | 7/1996 | Blitz et al. |
| 5,553,261 A | 9/1996 | Hasbun et al. |
| 5,594,883 A | 1/1997 | Pricer |
| 5,598,370 A | 1/1997 | Niijima et al. |
| 5,598,549 A * | 1/1997 | Rathunde ................ 711/114 |
| 5,651,133 A | 7/1997 | Burkes |

(Continued)

FOREIGN PATENT DOCUMENTS

| | | |
|---|---|---|
| CN | 1771495 | 5/2006 |
| GB | 0123416 | 9/2001 |

(Continued)

OTHER PUBLICATIONS

State Intellectual Property Office, Office Action, CN Application No. 200780050983.8, issued May 18, 2011.

(Continued)

*Primary Examiner* — Brian Peugh

(57) ABSTRACT

An adaptive logical storage element comprises a plurality of solid-state storage elements accessible in parallel. The logical storage element includes logical storage units, which may include logical page, logical storage divisions (erase blocks), and so on. Each logical storage unit comprises a plurality of physical storage units. A logical storage unit may include one or more physical storage units that are out-of-service (OOS). The OOS status of logical storage units is tracked by OOS metadata. When data is stored on the logical storage element, padding data is provided to physical storage units that are OOS, and valid and/or parity data is provided to in-service physical storage units. A write data pipeline accesses the OOS metadata to insert padding data, and a read data pipeline accesses the OOS metadata to strip padding data.

17 Claims, 16 Drawing Sheets

(56) References Cited

U.S. PATENT DOCUMENTS

| | | |
|---|---|---|
| 5,682,497 A | 10/1997 | Robinson |
| 5,682,499 A | 10/1997 | Bakke et al. |
| 5,701,434 A | 12/1997 | Nakagawa |
| 5,754,563 A | 5/1998 | White |
| 5,802,602 A | 9/1998 | Rahman et al. |
| 5,831,989 A | 11/1998 | Fujisaki |
| 5,845,329 A | 12/1998 | Onishi et al. |
| 5,854,796 A | 12/1998 | Sato |
| 5,960,462 A | 9/1999 | Solomon et al. |
| 6,000,019 A | 12/1999 | Dykstal et al. |
| 6,014,724 A | 1/2000 | Jenett |
| 6,014,755 A | 1/2000 | Wells et al. |
| 6,034,831 A | 3/2000 | Dobbek et al. |
| 6,170,039 B1 | 1/2001 | Kishida |
| 6,170,047 B1 | 1/2001 | Dye |
| 6,173,381 B1 | 1/2001 | Dye |
| 6,185,654 B1 | 2/2001 | Van Doren |
| 6,188,619 B1 | 2/2001 | Jung |
| 6,236,593 B1 | 5/2001 | Hong et al. |
| 6,256,642 B1 | 7/2001 | Krueger et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,507,911 B1 | 1/2003 | Langford |
| 6,523,102 B1 | 2/2003 | Dye et al. |
| 6,564,285 B1 | 5/2003 | Mills |
| 6,587,915 B1 | 7/2003 | Kim |
| 6,601,211 B1 | 7/2003 | Norman |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,715,027 B2 | 3/2004 | Kim et al. |
| 6,751,155 B2 | 6/2004 | Gorobets |
| 6,754,774 B2 | 6/2004 | Gruner et al. |
| 6,775,185 B2 | 8/2004 | Fujisawa et al. |
| 6,779,088 B1 | 8/2004 | Benveniste et al. |
| 6,785,785 B2 | 8/2004 | Piccirillo et al. |
| 6,845,465 B2 | 1/2005 | Hashemi |
| 6,877,076 B1 | 4/2005 | Cho et al. |
| 6,880,049 B2 | 4/2005 | Gruner et al. |
| 6,883,079 B1 | 4/2005 | Priborsky |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,043,599 B1 | 5/2006 | Ware et al. |
| 7,050,337 B2 | 5/2006 | Iwase et al. |
| 7,058,769 B1 | 6/2006 | Danilak |
| 7,076,599 B2 | 7/2006 | Aasheim et al. |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,167,953 B2 | 1/2007 | Megiddo et al. |
| 7,173,852 B2 | 2/2007 | Gorobets |
| 7,181,572 B2 | 2/2007 | Walmsley |
| 7,194,577 B2 | 3/2007 | Johnson et al. |
| 7,194,740 B1 | 3/2007 | Frank et al. |
| 7,215,580 B2 | 5/2007 | Gorobets |
| 7,219,238 B2 | 5/2007 | Saito et al. |
| 7,243,203 B2 | 7/2007 | Scheuerlein |
| 7,246,179 B2 | 7/2007 | Camara et al. |
| 7,272,755 B2 | 9/2007 | Smith |
| 7,305,520 B2 | 12/2007 | Voigt et al. |
| 7,340,558 B2 | 3/2008 | Lee et al. |
| 7,340,566 B2 | 3/2008 | Voth |
| 7,352,621 B2 * | 4/2008 | Rothman et al. ......... 365/185.09 |
| 7,395,384 B2 | 7/2008 | Sinclair |
| 7,398,348 B2 | 7/2008 | Moore et al. |
| 7,450,420 B2 | 11/2008 | Sinclair et al. |
| 7,487,320 B2 | 2/2009 | Bansal et al. |
| 7,516,267 B2 | 4/2009 | Coulson et al. |
| 7,529,905 B2 | 5/2009 | Sinclair |
| 7,552,271 B2 | 6/2009 | Sinclair et al. |
| 7,603,532 B2 | 10/2009 | Rajan et al. |
| 7,610,348 B2 | 10/2009 | Kisley et al. |
| 7,623,365 B2 | 11/2009 | Jeddeloh |
| 7,644,239 B2 | 1/2010 | Ergan et al. |
| 7,725,628 B1 | 5/2010 | Phan et al. |
| 7,765,426 B2 | 7/2010 | Li |
| RE20,533 E | 8/2010 | Phan et al. |
| 7,856,528 B1 | 12/2010 | Frost et al. |
| 7,873,782 B2 | 1/2011 | Terry |
| 7,941,696 B2 | 5/2011 | Frost et al. |
| 8,176,237 B2 * | 5/2012 | Yano et al. ..................... 711/103 |
| 8,195,978 B2 | 6/2012 | Flynn et al. |
| 8,423,730 B2 * | 4/2013 | Miranda ....................... 711/159 |
| 2001/0052093 A1 | 12/2001 | Oshima et al. |
| 2002/0069318 A1 | 6/2002 | Chow et al. |
| 2002/0103819 A1 | 8/2002 | Duvillier |
| 2002/0108016 A1 | 8/2002 | Haines et al. |
| 2002/0161855 A1 | 10/2002 | Manczak et al. |
| 2002/0181134 A1 | 12/2002 | Bunker et al. |
| 2003/0061296 A1 | 3/2003 | Craddock et al. |
| 2003/0140051 A1 | 7/2003 | Fujiwara |
| 2003/0145230 A1 | 7/2003 | Chiu et al. |
| 2003/0149753 A1 | 8/2003 | Lamb |
| 2003/0198084 A1 | 10/2003 | Fujisawa et al. |
| 2003/0204788 A1 | 10/2003 | Smith |
| 2004/0003002 A1 | 1/2004 | Adelmann |
| 2004/0073829 A1 | 4/2004 | Olarig |
| 2004/0148360 A1 | 7/2004 | Mehra et al. |
| 2004/0186946 A1 | 9/2004 | Lee |
| 2004/0268359 A1 | 12/2004 | Hanes |
| 2005/0002263 A1 | 1/2005 | Iwase et al. |
| 2005/0005191 A1 | 1/2005 | Judd |
| 2005/0015539 A1 | 1/2005 | Horii et al. |
| 2005/0027951 A1 | 2/2005 | Piccirillo et al. |
| 2005/0091452 A1 | 4/2005 | Chen et al. |
| 2005/0141313 A1 | 6/2005 | Gorobets |
| 2005/0144361 A1 | 6/2005 | Gonzalez et al. |
| 2005/0193166 A1 | 9/2005 | Johnson et al. |
| 2005/0240713 A1 | 10/2005 | Wu |
| 2005/0246510 A1 | 11/2005 | Retnamma et al. |
| 2005/0257017 A1 | 11/2005 | Yagi |
| 2005/0273476 A1 | 12/2005 | Wertheimer |
| 2006/0004955 A1 | 1/2006 | Ware et al. |
| 2006/0075057 A1 | 4/2006 | Gildea et al. |
| 2006/0085670 A1 | 4/2006 | Carver et al. |
| 2006/0149893 A1 | 7/2006 | Barfuss et al. |
| 2006/0179263 A1 | 8/2006 | Song et al. |
| 2006/0184722 A1 | 8/2006 | Sinclair |
| 2006/0190552 A1 | 8/2006 | Henze et al. |
| 2006/0236061 A1 | 10/2006 | Koclanes |
| 2006/0248387 A1 | 11/2006 | Nicholson et al. |
| 2006/0265636 A1 | 11/2006 | Hummler |
| 2007/0006048 A1 | 1/2007 | Zimmer et al. |
| 2007/0016699 A1 | 1/2007 | Minami |
| 2007/0033325 A1 | 2/2007 | Sinclair |
| 2007/0033326 A1 | 2/2007 | Sinclair |
| 2007/0033327 A1 | 2/2007 | Sinclair |
| 2007/0033362 A1 | 2/2007 | Sinclair |
| 2007/0043900 A1 | 2/2007 | Yun |
| 2007/0050571 A1 | 3/2007 | Nakamura |
| 2007/0061508 A1 | 3/2007 | Zweighaft |
| 2007/0088666 A1 | 4/2007 | Saito |
| 2007/0106870 A1 | 5/2007 | Bonwick et al. |
| 2007/0118713 A1 | 5/2007 | Guterman |
| 2007/0143560 A1 | 6/2007 | Gorobets |
| 2007/0156998 A1 | 7/2007 | Gorobets |
| 2007/0198770 A1 | 8/2007 | Horii et al. |
| 2007/0208790 A1 | 9/2007 | Reuter et al. |
| 2007/0233937 A1 | 10/2007 | Coulson et al. |

(56) References Cited

U.S. PATENT DOCUMENTS

| | | | |
|---|---|---|---|
| 2007/0245068 A1 | 10/2007 | Yero | |
| 2007/0260608 A1 | 11/2007 | Hertzberg et al. | |
| 2007/0266037 A1 | 11/2007 | Terry | |
| 2007/0266276 A1 | 11/2007 | Gatzemeier et al. | |
| 2007/0274150 A1 | 11/2007 | Gorobets | |
| 2007/0300008 A1 | 12/2007 | Rogers et al. | |
| 2008/0010395 A1 | 1/2008 | Mylly et al. | |
| 2008/0010566 A1 | 1/2008 | Chang et al. | |
| 2008/0120518 A1 | 5/2008 | Ritz et al. | |
| 2008/0126507 A1 | 5/2008 | Wilkinson | |
| 2008/0140737 A1 | 6/2008 | Garst et al. | |
| 2008/0141043 A1 | 6/2008 | Flynn et al. | |
| 2008/0243966 A1 | 10/2008 | Croisettier | |
| 2008/0244368 A1 | 10/2008 | Chin et al. | |
| 2008/0263259 A1 | 10/2008 | Sadovsky et al. | |
| 2008/0263305 A1 | 10/2008 | Shu et al. | |
| 2008/0263569 A1 | 10/2008 | Shu et al. | |
| 2009/0089603 A1 | 4/2009 | Ding et al. | |
| 2009/0125700 A1 | 5/2009 | Kisel | |
| 2009/0150599 A1* | 6/2009 | Bennett | 711/103 |
| 2009/0210611 A1* | 8/2009 | Mizushima | 711/103 |
| 2009/0248763 A1 | 10/2009 | Rajan | |
| 2009/0287887 A1 | 11/2009 | Matsuki | |
| 2010/0005228 A1 | 1/2010 | Fukutomi | |
| 2010/0095059 A1 | 4/2010 | Kisley et al. | |
| 2010/0100664 A1* | 4/2010 | Shimozono | 711/103 |
| 2011/0252186 A1* | 10/2011 | Dinker | 711/103 |
| 2011/0289261 A1* | 11/2011 | Candelaria | 711/103 |
| 2012/0110252 A1* | 5/2012 | McKean | 711/103 |

FOREIGN PATENT DOCUMENTS

| | | |
|---|---|---|
| WO | WO0201365 | 1/2002 |
| WO | WO2004099989 | 11/2004 |
| WO | WO2005103878 | 11/2005 |
| WO | WO2006062511 | 6/2006 |
| WO | WO2006065626 | 6/2006 |
| WO | WO2008130799 | 3/2008 |
| WO | WO 2010054410 | 5/2010 |
| WO | WO2011106394 | 9/2011 |

OTHER PUBLICATIONS

State Intellectual Property Office, Office Action, CN Application No. 200780050970.0, issued Oct. 28, 2010.
State Intellectual Property Office, Office Action, CN Application No. 200780050970.0, issued Jun. 29, 2011.
State Intellectual Property Office, Office Action, CN Application No. 200780050970.0, issued Jan. 5, 2012.
State Intellectual Property Office, Office Action, CN Application No. 200780051020.X, issued Nov. 11, 2010.
State Intellectual Property Office, Office Action, CN Application No. 200780051020.X, issued Jul. 6, 2011.
State Intellectual Property Office, Office Action, CN Application No. 200780051020.X, issued Nov. 7, 2011.
European Patent Office, Office Action, EP Application No. 07865345.8, issued Nov. 17, 2010.
United States Patent Office, Final Office Action, U.S. Appl. No. 11/952,109, mailed Nov. 29, 2011.
United States Patent Office, Office Action, U.S. Appl. No. 11/952,113, mailed Mar. 6, 2012.
United States Patent Office, Office Action, U.S. Appl. No. 11/952,113, mailed Dec. 15, 2010.
United States Patent Office, Office Action, U.S. Appl. No. 11/952,109, issued May 1, 2012.
Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-227.
Gutmann, "Secure Deletion of Data from Magnetic and Solid-State Memory", Usenix, 14 pages, San Jose, CA, published Jul. 1, 1996.
Brandon, Jr., "Sparse Matrices in CS Education," Journal of Computing Sciences in Colleges, vol. 24 Issue 5, May 2009, pp. 93-98.
Kawaguchi, "A Flash-Memory Based File System," TCON'95 Proceedings of the USENIX 1995 Technical Conference Proceedings, p. 13.
Gal, "A Transactional Flash File System for Microcontrollers," 2005 USENIX Annual Technical Conference, published Apr. 10, 2009.
Plank, "A Tutorial on Reed-Solomon Coding for Fault Tolerance in RAID-like System," Department of Computer Science, University of Tennessee, pp. 995-1012, Sep. 1997.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Asine, "ASPMC-660 Rugged IDE Flash Drive PMC Module ", http://www.asinegroup.com/products/aspmc660.html, copyright 2002, visited Nov. 8, 2009.
BiTMICRO, "BiTMICRO Introduces E-Disk PMC Flash Disk Module at Military & Aerospace Electronics East 2004," http://www.bitmicro.com/press.sub, published May 18, 2004, visited Mar. 8, 2011.
Spansion, "Data Management Software (DMS) for AMD Simultaneous Read/Write Flash Memory Devices", published Jul. 7, 2003.
Van Hensbergen, "Dynamic Policy Disk Caching for Storage Networking," IBM Research Division, RC24123 (W0611-189), Nov. 2006.
Spillane, "Enabling Transactional File Access via Lightweight Kernel Extensions", Stony Brook University, IBM T. J. Watson Research Center, published Feb. 25, 2009.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Wright, "Extending ACID Semantics to the File System", ACM Transactions on Storage, vol. 3, No. 2, published May 1, 2011, pp. 1-40.
Seltzer, "File System Performance and Transaction Support", University of California at Berkeley, published Jan. 1, 1992.
Novell, "File System Primer", http://wiki.novell.com/index.php/File_System_Primer, 2006, visited Oct. 18, 2006.
Dan, "Implementing MLC NAND Flash for Cost-Effective, High-Capacity Memory," M-Systems, White Paper, 91-SR-014-02-8L, Rev 1.1, Sep. 2003.
Samsung Electronics, "Introduction to Samsung's Linux Flash File System—RFS Application Note", Version 1.0, Nov. 2006.
Morgenstern, David, "Is There a Flash Memory RAID in your Future?", http://www.eweek.com—eWeek, Ziff Davis Enterprise Holdings Inc., Nov. 8, 2006, visited Mar. 18, 2010.
Anonymous, "Method for Fault Tolerance in Nonvolatile Storage", http://ip.com, IP.com No. IPCOM000042269D, 2005.
Volos, "Mnemosyne: Lightweight Persistent Memory", ACM 978-1-4503-0266-1/11/03, published Mar. 5, 2011.
Micron Technology, Inc., "NAND Flash 101: An Introduction to NAND Flash and How to Design it in to Your Next Product (TN-29-19)," http://www.micron.com/~/media/Documents/Products/Technical%20Note/NAND%20Flash/145tn2919_nand_101.pdf, 2006, visited May 10, 2010.
Elnec, "NAND Flash Memories and Programming NAND Flash Memories Using ELNEC Device Programmers, Application Note," published Mar. 1, 2007.
Tal, "NAND vs. NOR Flash Technology," M-Systems, www2.electronicproducts.com/PrintArticle.aspx?ArticleURL=FEBMSY1.feb2002.html, visited Nov. 22, 2010.
Coburn, "NV-Heaps: Making Persistent Objects Fast and Safe with Next-Generation, Non-Volatile Memories", ACM 978-1-4503-0266-1/11/0, published Mar. 5, 2011.
Mesnier, "Object-Based Storage," IEEE Communications Magazine, Aug. 2003, pp. 84-90.
Garfinkel, "One Big File is Not Enough: A Critical Evaluation of the Dominant Free-Space Sanitization Technique," 6th Workshop on Privacy Enhancing Technologies. Cambridge, United Kingdom, published Jun. 1, 2006.

(56) References Cited

OTHER PUBLICATIONS

Porter, "Operating System Transactions," ACM 978-1-60558-752-3/09/10, published Oct. 1, 2009.
Sears, "Stasis: Flexible Transactional Storage," OSDI '06: 7th USENIX Symposium on Operating Systems Design and Implementation, published Nov. 6, 2006.
Rosenblum, "The Design and Implementation of a Log-Structured File System," ACM Transactions on Computer Systems, vol. 10 Issue 1, Feb. 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
Terry et al., U.S. Appl. No. 60/797,127, "Filesystem-aware Block Storage System, Apparatus, and Method," filed May 3, 2006.
United States Patent Office, U.S. Appl. No. 60/912,728, published as U.S. Application Publication No. 20080263305 on Oct. 23, 2008.
WIPO, International Search Report and Written Opinion for PCT/US2011/025885, mailed Sep. 28, 2011.
WIPO, International Search Report and Written Opinion for PCT/US2007/025048, mailed May 27, 2008.
WIPO, International Preliminary Report on Patentability for PCT/US2007/025048, mailed Jun. 10, 2009.
WIPO, International Preliminary Report on Patentability for PCT/US2008/059048, mailed Oct. 20, 2009.
WIPO, International Search Report and Written Opinion for PCT/US2008/059048, mailed Aug. 25, 2008.
WIPO, International Preliminary Report on Patentability for PCT/US2007/086687, mailed Mar. 18, 2009.
WIPO, International Search Report and Written Opinion for PCT/US2007/086687, mailed Sep. 5, 2008.
WIPO, International Preliminary Report on Patentability for PCT/US2007/086688, mailed Mar. 16, 2009.
WIPO, International Search Report and Written Opinion for PCT/US2007/086691, mailed May 8, 2008.
WIPO, International Preliminary Report on Patentability for PCT/US2007/086691, mailed Feb. 16, 2009.
WIPO, International Search Report and Written Opinion for PCT/US2007/086701, mailed Jun. 5, 2008.
WIPO, International Preliminary Report on Patentability for PCT/US2007/086701, mailed Mar. 16, 2009.
WIPO, International Search Report and Written Opinion for PCT/US2010/048325, mailed Jun. 1, 2011.
WIPO, International Preliminary Report on Patentability for PCT/US2010/048325, mailed Mar. 13, 2012.
Raz, Singer, "Implementing MLC NAND Flash for Cost-Effective, High-Capacity Memory," M-Systems White Paper, Sep. 2003, 91-SR-014-02-8L, Rev 1.1.
ST®, AN1819 Application Note, "Bad Block Management in Single Level Cell NAND Flash Memories," Jan. 2006.
WIPO, International Preliminary Report on Patentability for PCT/US2009/063938, mailed May 19, 2011.
WIPO, International Search Report and Written Opinion for PCT/US2009/063938, mailed Jun. 23, 2010.
STMicroelectronics, AN1819 Application Note, "Bad Block Management in Single Level Cell NAND Flash Memories," Jan. 2006, p. 1-7.
Samsung Electronics Co Ltd., "ECC Algorithm (512Byte)", Flash Planning Group, Memory Division, Mar. 2005, p. 1-8, ecc_algorithm_for_web_512b_March_2005.pdf= http://www.samsung.com/global/business/semiconductor/products/flash/FlashApplicationNote.html.

\* cited by examiner

APPARATUS, SYSTEM, AND METHOD FOR MANAGING OUT-OF-SERVICE CONDITIONS

CROSS-REFERENCE TO RELATED APPLICATIONS

This Application claims priority to U.S. Provisional Patent Application No. 61/434,362, filed Jan. 19, 2011, and entitled, "Apparatus, System, and Method for Storage Operations Using an Adaptive Logical Storage Element," which is hereby incorporated by reference in its entirety.

TECHNICAL FIELD

This disclosure relates data storage on a logical storage unit comprising physical storage units of a plurality of storage elements that are accessible in parallel.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
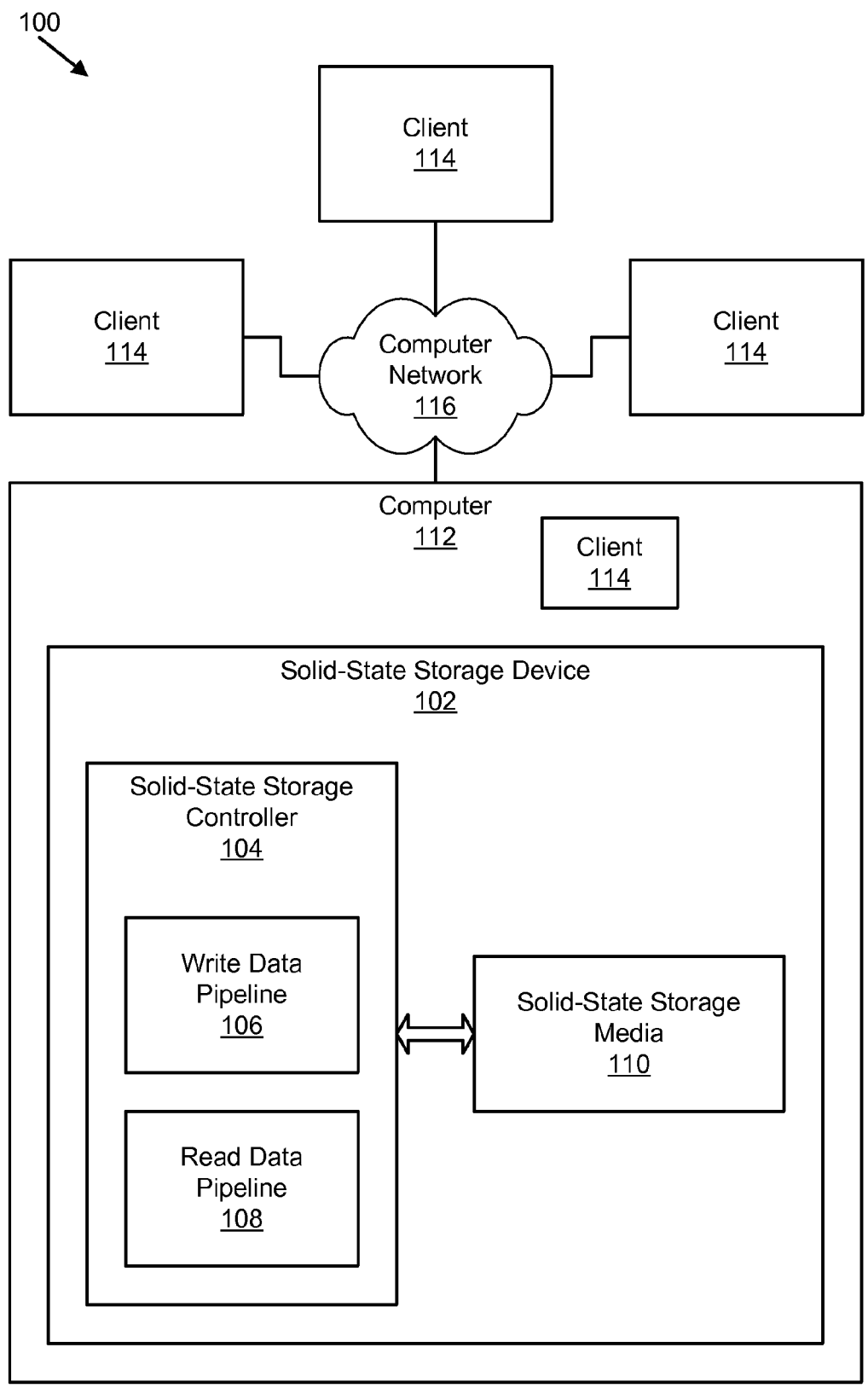
FIG. 1 is a schematic block diagram illustrating one embodiment of a system for storing data on solid-state storage media.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors, such as logic chips, transistors, or other discrete components. A module may also be implemented in programmable hardware devices, such as field programmable gate arrays (FPGAs), programmable array logic, programmable logic devices or the like.

Modules may also be implemented in software for execution by various types of processors. An identified module of computer readable program code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations, including over different storage devices, and may exist, at least partially, merely as electronic signals on a system or network. Where a module or portions of a module are implemented in software, the computer readable program code may be stored and/or propagated on or in one or more computer readable medium(s).

The computer readable medium may be a tangible computer readable storage medium storing the computer readable program code. The computer readable storage medium may comprise, but is not limited to, an electronic, magnetic, optical, electromagnetic, infrared, holographic, micromechanical, or semiconductor system, apparatus, or device, or any suitable combination of the foregoing.

More specific examples of the computer readable medium may include, but are not limited to: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including, but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language, such as Java, Smalltalk, C++, or the like, and/or conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "some embodiments," "an embodiment," or similar language means that a particular feature, structure, or characteristic described in connection with the embodiment is included in at least some embodiments. Thus, the phrases "in some embodiments," "in an embodiment," and similar language throughout this specification may all refer to the same embodiment and/or may refer to "one or more but not all embodiments." The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagram blocks or blocks.

The computer readable program code may also be stored in a non-transitory computer readable storage medium that can direct a machine, such as a computer, other programmable data processing apparatus, or other device to function in a particular manner, such that the instructions stored in the non-transitory computer readable storage medium produce an article of manufacture including instructions that implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Solid-State Storage System

FIG. 1 is a schematic block diagram illustrating one embodiment of a system 100 for storing data on solid-state storage media. The system 100 includes a solid-state storage device 102, a solid-state storage controller 104, a write data pipeline 106, a read data pipeline 108, a solid-state storage media 110, a computer 112, a client 114, and a computer network 116, which are described below.

The system 100 includes at least one solid-state storage device 102. In another embodiment, the system 100 includes two or more solid-state storage devices 102. Each solid-state storage device 102 may include non-volatile, solid-state storage media 110, such as flash memory, nano random access memory ("nano RAM or NRAM"), nanocrystal wire-based memory, silicon-oxide based sub-10 nanometer process memory, graphene memory, Silicon-Oxide-Nitride-Oxide-Silicon ("SONOS"), Resistive random-access memory ("RRAM"), programmable metallization cell ("PMC"), conductive-bridging RAM ("CBRAM"), magneto-resistive RAM ("MRAM"), dynamic RAM ("DRAM"), phase change RAM ("PRAM"), etc. The solid-state storage device 102 is depicted in a computer 112 connected to a client 114 through a computer network 116. In one embodiment, the solid-state storage device 102 is internal to the computer 112 and is connected using a system bus, such as a peripheral component interconnect express ("PCI-e") bus, a Serial Advanced Technology Attachment ("serial ATA") bus, or the like. In another embodiment, the solid-state storage device 102 is external to the computer 112 and is connected using, a universal serial bus ("USB") connection, an Institute of Electrical and Electronics Engineers ("IEEE") 1394 bus ("FireWire"), or the like. In other embodiments, the solid-state storage device 102 is connected to the computer 112 using a peripheral component interconnect ("PCI") express bus using external electrical or optical bus extension or bus networking solution, such as Infiniband or PCI Express Advanced Switching ("PCIe-AS"), or the like. Alternatively, the solid-state storage device 102 may be implemented as a stand-alone device independent of the computer 112 and/or clients 114.

The solid-state storage device may be packaged in various ways. In some embodiments, the solid-state storage device 102 may be in the form of a dual-inline memory module ("DIMM"), a daughter card, or a micro-module. In another embodiment, the solid-state storage device 102 is an element within a rack-mounted blade. In another embodiment, the solid-state storage device 102 is contained within a package that is integrated directly onto a higher level assembly (e.g. mother board, lap top, graphics processor). In another embodiment, individual components comprising the solid-state storage device 102 are integrated directly onto a higher level assembly without intermediate packaging.

The solid-state storage device 102 includes one or more solid-state storage controllers 104, each of which may include a write data pipeline 106, a read data pipeline 108, and solid-state storage media 110.

The system 100 includes one or more computers 112 connected to the solid-state storage device 102. A computer 112 may be a host, a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. Alternatively, a computer 112 may be a client and the solid-state storage device 102 may operate autonomously to service data requests sent from the computer 112. In this embodiment, the computer 112 and solid-state storage device 102 may be connected using a computer network 116, system bus (not shown), or other communication medium suitable for connection between a computer 112 and an autonomous solid-state storage device 102.

In one embodiment, the system 100 includes one or more clients 114 connected to one or more computers 112 through one or more computer networks 116. A client 114 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. In another embodiment, the client 114 operates within the computer 112. The client 114 may be an application, a server, an applet, a thread, a driver, a database management system, a daemon, or the like. The computer network 116 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The computer network 116 may also include a network from the IEEE 802 family of network technologies, such as Ethernet, token ring, WiFi, WiMax, and the like.

The computer network 116 may include servers, switches, routers, cabling, radios, and other equipment used to facilitate networking computers 112 and clients 114. In one embodiment, the system 100 includes multiple computers 112 that communicate as peers over a computer network 116. In another embodiment, the system 100 includes multiple solid-state storage devices 102 that communicate as peers over a computer network 116. One of skill in the art will recognize other computer networks 116 comprising one or more computer networks 116 and related equipment with single or redundant connection between one or more clients 114 or other computer with one or more solid-state storage devices 102 or one or more solid-state storage devices 102 connected to one or more computers 112. In one embodiment, the system 100 includes two or more solid-state storage devices 102 connected through the computer network 116 to a client 114 without a computer 112.

Solid-State Storage Device

Figure 2:
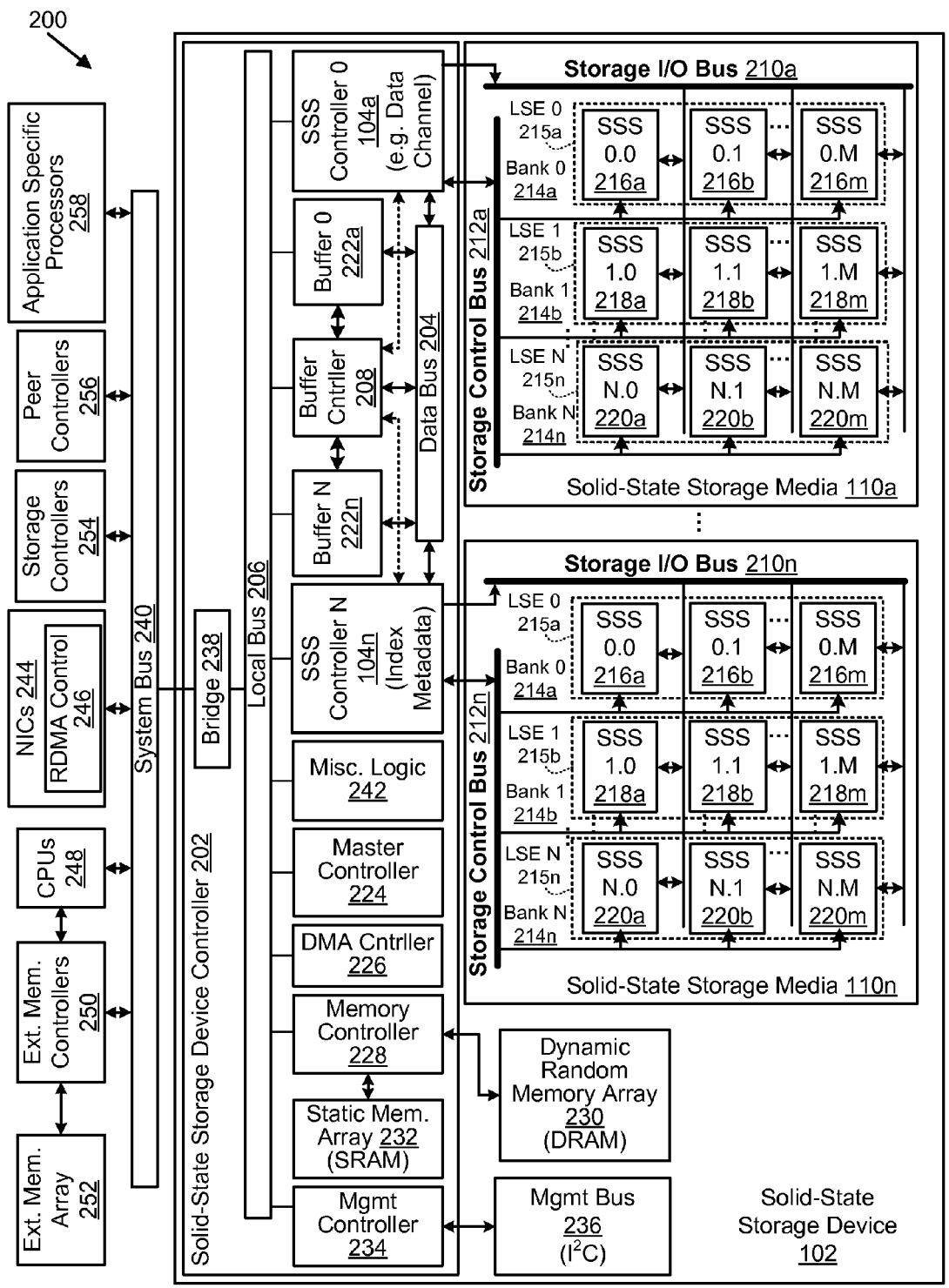
FIG. 2 is a schematic block diagram illustrating one embodiment of a solid-state storage controller.

FIG. 2 is a schematic block diagram illustrating one embodiment 200 of a solid-state storage device controller 202 in accordance with the present invention. The solid-state storage device controller 202 may be embodied as hardware, as software, or as a combination of hardware and software. The solid-state storage device controller 202 may include a number of solid-state storage controllers 0-N 104a-n, each controlling solid-state storage media 110.

In the depicted embodiment, two solid-state controllers are shown: solid-state controller 0 104a and solid-state storage controller N 104n, and each controls solid-state storage media 110a-n. In the depicted embodiment, solid-state storage controller 0 104a controls a data channel so that the attached solid-state storage media 110a stores data. Solid-state storage controller N 104n controls an index metadata channel associated with the stored data and the associated solid-state storage media 110n stores index metadata. In an alternate embodiment, the solid-state storage device controller 202 includes a single solid-state controller 104a with a single solid-state storage media 110a. In another embodiment, there are a plurality of solid-state storage controllers 104a-n and associated solid-state storage media 110a-n. In one embodiment, one or more solid-state controllers 104a-104n-1, coupled to their associated solid-state storage media 110a-110n-1, control data while at least one solid-state storage controller 104n, coupled to its associated solid-state storage media 110n, controls index metadata.

In one embodiment, at least one solid-state controller 104 comprises a field-programmable gate array ("FPGA") and controller functions are programmed into the FPGA. In a particular embodiment, the FPGA is a Xilinx® FPGA. In another embodiment, the solid-state storage controller 104 comprises components specifically designed as a solid-state storage controller 104, such as an application-specific integrated circuit ("ASIC") or other custom logic solution. Alternatively, or in addition, the solid-state controllers 104 may comprise one or more general purpose processors or embedded processors. Each solid-state storage controller 104 typically includes a write data pipeline and a read data pipeline (discussed below).

Solid-State Storage

The solid-state storage media 110 may comprise an array of non-volatile solid-state storage elements 216, 218, 220. In some embodiments, the non-volatile solid-state storage elements 216, 218, 220, and so on are arranged in banks 214, which are accessible in parallel through a bi-directional storage input/output ("I/O") bus 210. In some embodiments, the storage I/O bus 210, is capable of unidirectional communication. When data is being written to the solid-state storage media 110, data cannot be read from the solid-state storage media 110. In other embodiments, the storage I/O bus 210 supports data flow in both directions simultaneously. However, bi-directional, as used herein with respect to a data bus, refers to a data pathway that can have data flowing in only one direction at a time, but when data flowing in one direction on the bi-directional data bus is stopped, data can flow in the opposite direction on the bi-directional data bus.

A solid-state storage element (e.g. SSS 0.0 216a) is typically configured as a chip (a package of one or more dies) or a die on a circuit board. As depicted, a solid-state storage element (e.g. 216a) operates independently or semi-independently of other solid-state storage elements (e.g. 218a) even if these several elements are packaged together in a chip package, a stack of chip packages, or some other package element. As depicted, a row of solid-state storage elements 216a, 216b, 216m is designated as a bank 214.

As depicted, there may be "n" banks 214a-n and "m" solid-state storage elements 216a-m, 218a-m, 220a-m per bank in an array of n×m solid-state storage elements 216, 218, 220 in a solid-state storage media 110. Of course, different embodiments may include different values for n and m. In one embodiment, the solid-state storage media 110a includes twenty solid-state storage elements 216, 218, 220 per bank 214 with eight banks 214. In one embodiment, the solid-state storage media 110a includes twenty four solid-state storage elements 216, 218, 220 per bank 214 with eight banks 214. In addition to the n×m storage elements 216, 218, 220, one or more additional columns (P) may also be addressed and operated in parallel with other solid-state storage elements 216a, 216b, 216m for one or more rows. In some embodiments, the added P columns, store parity data for the portions of an ECC chunk (i.e. an ECC codeword) that span m storage elements for a particular bank. In one embodiment, each solid-state storage element 216, 218, 220 is comprised of single-level cell ("SLC") devices. In another embodiment, each solid-state storage element 216, 218, 220 is comprised of multi-level cell ("MLC") devices.

In some embodiments, the solid-state storage elements that share a common connection to the storage I/O bus 210a (e.g. 216b, 218b, 220b) are packaged together. In some embodiments, a solid-state storage element 216, 218, 220 may have one or more dies per chip with one or more chips stacked vertically and each die may be accessed independently.

The solid-state storage elements 216, 218, 220, etc. may be packaged in various ways. In some embodiments, a solid-state storage element (e.g. SSS 0.0 216a) may have one or more virtual dies per die and one or more dies per chip and one or more chips stacked vertically and each virtual die may be accessed independently. Alternatively a solid-state storage element SSS 0.0 216a may have one or more virtual dies per die and one or more dies per chip with some or all of the one or more dies stacked vertically and each virtual die may be accessed independently. In some embodiments, two dies may be stacked vertically with four stacks per group to form eight storage elements (e.g. SSS 0.0-SSS 8.0) 216a-220a, each in a separate bank 214a-n.

The solid-state storage elements 216, 218, 220, etc. may be formed into logical storage elements (LSE) 215. In some embodiments, the twenty-four (24) storage elements (e.g. SSS 0.0-SSS 0.24) 216 in the banks 214 form logical storage elements 215, each of the eight logical storage elements comprises 24 storage elements (e.g. SSS 0.0-SSS 8.24) 216, 218, 220. Data is sent to the solid-state storage media 110 over the storage I/O bus 210 to all storage elements of a particular logical storage element 215 (SSS 0.0-SSS 8.0) 216a, 218a, 220a in parallel. The storage control bus 212a is used to select a particular bank (e.g. Bank 0 214a) so that the data received over the storage I/O bus 210 connected to all banks 214 and/or logical storage elements 215 is written just to the selected bank 214a or logical storage element 215.

In a one embodiment, the storage I/O bus 210 is comprised of one or more independent storage I/O buses ("IIOBa-m" comprising 210a.a-m, 210n.a-m) wherein the solid-state storage elements within each column share one of the independent I/O buses that accesses each solid-state storage element 216, 218, 220 in parallel so that all banks 214 are accessed simultaneously. For example, one channel of the storage I/O bus 210 may access a first solid-state storage element 216a, 218a, 220a of each bank 214a-n simultaneously. A second channel of the storage I/O bus 210 may access a second solid-state storage element 216b, 218b, 220b of each bank 214a-n simultaneously. Each row of solid-state storage element 216a, 216b, 216m is accessed simultaneously. In one embodiment, where solid-state storage elements 216, 218, 220 are multi-level (physically stacked), all physical levels of the solid-state storage elements 216, 218, 220 are accessed simultaneously. As used herein, "simultaneously" also includes near simultaneous access where devices are accessed at slightly different intervals to avoid switching noise. Simultaneously is used in this context to be distinguished from a sequential or serial access wherein commands and/or data are sent individually one after the other.

Typically, banks 214*a*-*n* are independently selected using the storage control bus 212. In one embodiment, a bank 214 is selected using a chip enable or chip select. Where both chip select and chip enable are available, the storage control bus 212 may select one level of a multi-level solid-state storage element 216, 218, 220. In other embodiments, other commands are used by the storage control bus 212 to individually select one level of a multi-level solid-state storage element 216, 218, 220. Solid-state storage elements 216, 218, 220 may also be selected through a combination of control of and of address information transmitted on storage I/O bus 210 and the storage control bus 212.

In some embodiments, each solid-state storage element 216, 218, 220 comprises a plurality of physical storage units capable of storing data. As used herein, a "storage unit" or "physical storage unit" refers to any unit of data storage on the solid-state storage media 110. Storage units may refer to pages, erase blocks, die, planes, storage elements, chips, or other storage locations on the solid-state storage media 110. In some embodiments, certain storage operations may be performed on groups of storage units (storage divisions). As used herein, a storage division refers to a group of storage units on a solid-state storage media 110. A storage division may refer to an erase block (or another erasable unit of the solid-state storage media 110). Some implementations of solid-state storage media 110 erase storage units by storage division (e.g., in an erase block). Erasing an erase block storage division erases all of the storage units therein. Accordingly, a storage unit may refer to an "erasable unit" of the solid-state storage media 110.

An erase block on a solid-state storage element 216, 218 220 may be called a physical erase block or "PEB." An erase block may comprise a plurality of pages. A typical page is approximately 2000 bytes ("2 kB"), although the disclosure is not limited in this regard and could be used with storage units of any size. In one example, a solid-state storage element (e.g. SSS 0.0) includes two program registers capable of programming two pages (approximately 4 kB). The contents of the program register may be stored in the solid-state storage media 110 in response to a write or program command. Accordingly, each of the exemplary solid-state storage elements 216, 218, 220 may be capable of programming 4 kB of data in response to a single programming operation.

As described above, the solid-state storage elements 216, 218, 220, may be accessible in parallel via the storage I/O bus 210. This parallel access allows the elements 216, 218, 220, to be grouped together to form logical storage elements 215. As used herein, a logical storage element refers to a set of two or more solid-state storage elements that can be accessed in parallel (e.g., via the storage I/O bus 210). A logical storage element may comprise a plurality of logical storage units, such as logical pages, logical storage divisions (e.g., logical erase blocks), and so on. Each logical storage unit is comprised of storage units on the solid-state storage elements in the respective logical storage element 215. As used herein, a logical storage unit refers to logical construct combining two or more physical storage units, each physical storage unit on a respective solid-state storage element in the respective logical storage element (each solid-state storage element being accessible in parallel). As used herein, a logical storage division refers to a set of two or more physical storage divisions, each physical storage division on a respective solid-state storage element in the respective logical storage element.

In the FIG. 2 example, since each element 216*a*, 216*b*, through 216*m* of bank 214*a* is accessible in parallel via the storage I/O bus 210*a*, the elements 216 may form a logical storage element 215*a*. The storage units of solid-state storage elements 216*a*, 216*b*, 216*m* in the logical storage element 215*a* form logical storage units (e.g., logical pages), each logical storage unit comprising a physical storage unit on the solid-state storage elements 216*a*-*m*. The logical storage units may be partitioned into logical storage divisions (e.g., logical erase blocks), each comprising a plurality of logical storage units, and being formed from physical storage divisions of the storage elements 216*a*-*m*.

The storage capacity and/or effective read/write bandwidth of a logical storage element 215 may be proportional to the number of solid-state storage elements comprising the logical storage element 215 and/or the width of the storage I/O bus 210. For example, if a logical storage element includes twenty-five (25) solid-state storage elements accessible in parallel, each comprising pages of approximately 2 kB, the logical storage units (logical pages) will be approximately 50 kB. Therefore, the effective read bandwidth of the logical storage element is 50 kB per storage operation; a single page read operation on a logical storage unit yields 50 kB of data (2 kB from each of the twenty-five (25) constituent solid-state storage element 216*a*-*m* pages). If each solid-state storage element of the logical storage element 215*a* comprises a 4 kB program register, the "logical program register capacity" is 100 kB. Accordingly, a single program command (a program command issued to the 25 solid-state storage elements 216 comprising the logical storage element 215) may cause 100 kB of data to be programmed at once.

As described above, the logical storage elements 215 may comprise logical storage divisions (e.g., logical erase blocks) comprising erase blocks of the solid-state storage units 216*a*-*m* in the logical storage element 215*a*. Some storage operations may occur at the "storage division" granularity level (e.g., may operate on all the storage units in a particular storage division). For instance, a storage division may correspond to an erase block of pages within a solid-state storage element 216, 218, 220. The storage division is erased when an erase command is received within a solid-state storage element 216, 218, 220. Accordingly, an erase command on a logical storage division may erase a storage division on each of the solid-state storage elements 216, 218, 220 in the respective logical storage element 215. Whereas the size and number of erase blocks, pages, planes, or other logical and physical divisions within a solid-state storage element 216, 218, 220 are expected to change over time with advancements in technology, it is to be expected that many embodiments consistent with new configurations are possible and are consistent with the general description herein. The teachings of this disclosure could be applied to logical associations between any physical and/or logical divisions within solid-state storage media 110.

Typically, when a data packet is written to a particular storage unit within a solid-state storage element 216, 218, 220, it is intended to be written to a specific storage unit therein (e.g., a specific physical address). Therefore, a physical address is typically sent with data packets. The physical address contains enough information to direct the data packet to the designated storage unit within a logical storage element 215. Since all storage elements in a column of storage elements (e.g. SSS 0.0-SSS N.0 216*a*, 218*a*, 220*a*) are accessed simultaneously by the appropriate bus within the storage I/O bus 210*a*, to reach the proper logical storage unit and to avoid writing the data packet to similarly addressed storage units in the column of storage elements (SSS 0.0-SSS N.0 216*a*, 218*a*, 220*a*), the logical storage element 215*a* (bank 214*a*) that includes the solid-state storage element SSS 0.0 216*a* with the correct storage unit where the data packet is to be written is simultaneously selected by the storage control bus 212.

Similarly, satisfying a read command on the storage I/O bus 210 requires a simultaneous signal on the storage control bus 212 to select a logical storage element 215*a* (bank 214*a*) and the appropriate logical page within that logical storage element 215*a*. In one embodiment, a read command reads an entire logical storage unit (e.g., logical page), and because there are multiple solid-state storage elements 216*a*, 216*b*, 216*m* in parallel in a bank 214, an entire logical page is read with a read command. However, the read command may be broken into subcommands, as will be explained below with respect to bank interleave. A logical page may also be accessed in program operations.

An erase block erase command may be sent out to erase an erase block over the storage I/O bus 210 with a particular erase block address to erase a particular erase block. Typically, an erase block erase command may be sent over the parallel paths of the storage I/O bus 210 to erase a logical erase block, each with a particular erase block address to erase a particular erase block. Simultaneously a particular bank or logical storage element (e.g. Bank 0 214*a* and/or logical storage element 215*a*) is selected over the storage control bus 212 to prevent erasure of similarly addressed erase blocks in all of the banks (Banks 1-N 214*b-n*). Alternatively, no particular bank (e.g. Bank 0 214*a*) is selected over the storage control bus 212 to enable erasure of similarly addressed erase blocks in all of the banks (Banks 1-N 214*b-n*) simultaneously. Other commands may also be sent to a particular location using a combination of the storage I/O bus 210 and the storage control bus 212. One of skill in the art will recognize other ways to select a particular physical storage unit using the bi-directional storage I/O bus 210 and the storage control bus 212.

In one embodiment, data packets are written sequentially to the solid-state storage media 110. For example, data packets are streamed to the storage write buffers of storage elements 216 in a logical storage element 215*a* and, when the buffers are full, the data is programmed to a designated logical storage unit (e.g., logical page). Data packets then refill the storage write buffers (program registers) and, when full, the contents of the registers are programmed to the next logical page. The next logical page may be in the logical storage element 215*a* (same bank 214*a*) or another logical storage element 215*b* (e.g. bank 214*b*). This process continues, logical page after logical page, typically until a logical storage division (e.g., logical erase block) is filled. In another embodiment, the streaming may continue across logical erase block boundaries with the process continuing, logical erase block after logical erase block.

In a read-modify-write operation, data packets associated with requested data are located and read in a read operation. Data segments of the modified requested data that have been modified are not written to the location from which they are read. Instead, the modified data segments are written out-of-place (e.g., sequentially at an append point); the data segments are again converted to data packets and then written sequentially to the next available storage unit in the logical page currently being written. The index entries for the respective data packets are modified to point to the packets that contain the modified data segments. The entry or entries in the index for data packets associated with the same requested data that have not been modified will include pointers to the original location of the unmodified data packets. Thus, if the original requested data is maintained, for example to maintain a previous version of the requested data, the original requested data will have pointers in the index to all data packets as originally written. The new requested data will have pointers in the index to some of the original data packets and pointers to the modified data packets in the logical page that is currently being written.

In a copy operation, the index includes an entry for the original requested data mapped to a number of packets stored in the solid-state storage media 110. When a copy is made, new copy of the requested data is created and a new entry is created in the index mapping the new copy of the requested data to the original packets. The new copy of the requested data is also written to the solid-state storage media 110 with its location mapped to the new entry in the index. The new copy of the requested data packets may be used to identify the packets within the original requested data that are referenced in case changes have been made in the original requested data that have not been propagated to the copy of the requested data and the index is lost or corrupted.

Beneficially, sequentially writing packets facilitates a more even use of the solid-state storage media 110 and allows the solid-storage device controller 202 to monitor storage hot spots and level usage of the various logical pages in the solid-state storage media 110. Sequentially writing packets also facilitates a powerful, efficient garbage collection system, which is described in detail below. One of skill in the art will recognize other benefits of sequential storage of data packets.

Solid-State Storage Device Controller

In various embodiments, the solid-state storage device controller 202 also includes a data bus 204, a local bus 206, a buffer controller 208, buffers 0-N 222*a-n*, a master controller 224, a direct memory access ("DMA") controller 226, a memory controller 228, a dynamic random-access memory array (DRAM) 230, a static random-access memory array (SRAM) 232, a management controller 234, a management bus 236, a bridge 238 to a system bus 240, and miscellaneous logic 242, which are described below. In other embodiments, the system bus 240 is coupled to one or more network interface cards ("NICs") 244, some of which may include remote DMA ("RDMA") controllers 246, one or more central processing units ("CPU") 248, one or more external memory controllers 250 and associated external memory arrays 252, one or more storage controllers 254, peer controllers 256, and application specific processors 258, which are described below. The components 244-258 connected to the system bus 240 may be located in the computer 112 or may be other devices.

Typically the solid-state storage controller(s) 104 communicate data to the solid-state storage media 110 over a storage I/O bus 210. In a typical embodiment where the solid-state storage is arranged in banks 214 (logical storage elements) and each logical storage element 215 includes multiple storage elements 216*a*, 216*b*, 216*m* accessed in parallel, the storage I/O bus 210 is an array of busses; the bus array may comprise a bus for each column of storage elements 216, 218, 220 spanning the logical storage elements 215. As used herein, the term "storage I/O bus" may refer to one storage I/O bus 210 (a wide bus), an array of data independent busses 204, a time multiplexed bus, or the like.

Data may also be communicated to the solid-state storage controller(s) 104 from a requesting device (a client 114) through the system bus 240, bridge 238, local bus 206, buffer(s) 222, and finally over a data bus 204. The data bus 204 typically is connected to one or more buffers 222a-n controlled with a buffer controller 208. The buffer controller 208 typically controls transfer of data from the local bus 206 to the buffers 222 and through the data bus 204 to the pipeline input buffer and output buffer (discussed below in conjunction with FIG. 3). The buffer controller 208 typically controls how data arriving from a requesting device can be temporarily stored in a buffer 222 and then transferred onto a data bus 204, or vice versa, to account for different clock domains, to prevent data collisions, etc. The buffer controller 208 typically works in conjunction with the master controller 224 to coordinate data flow. As data arrives, the data will arrive on the system bus 240, be transferred to the local bus 206 through a bridge 238.

Typically the data is transferred from the local bus 206 to one or more data buffers 222 as directed by the master controller 224 and the buffer controller 208. The data then flows out of the buffer(s) 222 to the data bus 204, through a solid-state controller 104, and on to the solid-state storage media 110 such as NAND flash or other storage media. In one embodiment, data and associated out-of-band metadata ("metadata") arriving with the data is communicated using one or more data channels comprising one or more solid-state storage controllers 104a-104n−1 and associated solid-state storage media 110a-110n−1 while at least one channel (solid-state storage controller 104n, solid-state storage media 110n) is dedicated to in-band metadata, such as index information and other metadata generated internally to the solid-state storage device 102.

The local bus 206 is typically a bidirectional bus or set of busses that allows for communication of data and commands between devices internal to the solid-state storage device controller 202 and between devices internal to the solid-state storage device 102 and devices 244-258 connected to the system bus 240. The bridge 238 facilitates communication between the local bus 206 and system bus 240. One of skill in the art will recognize other embodiments such as ring structures or switched star configurations and functions of buses 240, 206, 204, 210 and bridges 238.

The system bus 240 is typically a bus of a computer 112 or other device in which the solid-state storage device 102 is installed or connected. In one embodiment, the system bus 240 may be a PCI-e bus, a Serial Advanced Technology Attachment ("serial ATA") bus, parallel ATA, or the like. In another embodiment, the system bus 240 is an external bus such as small computer system interface ("SCSI"), FireWire, Fiber Channel, USB, PCIe-AS, or the like. The solid-state storage device 102 may be packaged to fit internally to a device or as an externally connected device.

The solid-state storage device 102 is configured to continue operating when physical storage units in the storage media 110a are taken out of service. As used herein, a physical storage unit that is out of service (an "OOS storage location") refers to a physical storage unit that is no longer used to store data. A storage unit may be taken out of service for various reasons, including, but not limited to: a failure condition, partial failure, inaccessibility, unacceptable error rate, unacceptable performance (e.g., long read, program, and/or erase times), programming errors, wear level, or the like. The solid-state controller 202 may be configured to monitor storage operations performed on the solid-state storage media 110 to identify storage units (e.g., pages, storage divisions, erase blocks, die, planes, chips, etc.) that should be taken out of service. Alternatively, the solid-state storage controller 202 may provide access to another entity (e.g., a dedicated monitoring entity, a client, driver, or the like), which may identify OOS conditions on the logical storage elements 215. For example, the solid-state storage controller 202 may report metadata pertaining to the performance and/or operational status of the solid-state storage media to a client (e.g., client 114) via the system bus 240.

Out of service conditions may be detected and/or maintained at varying levels of granularity; OOS conditions may be tracked and/or maintained by logical page, by logical erase blocks, die, chip, plane, and/or according to other storage partitions (e.g., individual storage elements, storage element partitions, and so on). However, the disclosure should not be read as limited in this regard, and could be applied to any size and/or organization of erase blocks, pages, planes, or other logical and physical divisions within the solid-state storage media 110.

In some embodiments, OOS conditions on the logical storage elements 215 are managed using a "bad block remapping" approach, in which each storage I/O bus 210 accessing a column of storage elements (e.g. 216a, 218a, 220a) includes a logical-to-physical mapping for storage units and/or divisions (e.g. erase blocks) accessed in a column of storage elements 216a, 218a, 220a. This mapping (or bad block remapping) allows an OOS storage unit of a logical storage unit to be replaced by another storage unit on the solid-state storage media 110. The re-mapping operation may prevent a few OOS storage units from removing an entire logical storage unit from service. Since a logical storage unit may include units remapped from other storage elements, the remapping approach comprises providing each storage element 216, 218, and/or 220 in a logical storage element 215 with independent addressing information.

In some embodiments, the solid-state storage controller 202 implements an adaptive approach to managing OOS conditions. In these embodiments, the same addressing information is provided to the elements in the logical storage elements 215 (no remapping), including storage units that are out of service (if any). OOS conditions are managed by masking (e.g., avoiding, skipping, ignoring, or the like) the OOS storage units (if any) on the storage I/O bus 210. Masking the OOS physical storage units may comprise mapping padding data to the OOS storage units. The masking may reduce the storage capacity and/or effective bandwidth of one or more logical storage units of the element 215, while allowing the remaining in-service storage units to continue in operation. In the adaptive approach, addressing may be simplified, since all storage elements in a logical storage element 215 are given the same addressing information. As used herein, padding data refers to any data that is used in place of valid data. Accordingly, padding data may be actively added as a particular data pattern (e.g., ones, zeros, or other patterns) or may be passive by reusing whatever data is on the bus, allowing the bus to float, or the like.

In some embodiments, the solid-state storage controller implements a hybrid approach. In this approach, OOS conditions are managed by masking the OOS physical storage units (if any) of a logical storage element, as described above, until the number of OOS storage units reaches a threshold. When the threshold is reached, OOS conditions are managed by replacing OOS storage units with replacement storage units (where available) as in the bad block remapping approach described above. Storage units for which there is no available replacement are managed using the adaptive approach.

The solid-state storage device controller 202 includes a master controller 224 that controls higher-level functions within the solid-state storage device 102. The master controller 224, in various embodiments, controls data flow by interpreting object requests and other requests, directs creation of indexes to map object identifiers associated with data to physical locations of associated data, coordinating DMA requests, etc. Many of the functions described herein are controlled wholly or in part by the master controller 224.

In one embodiment, the master controller 224 uses embedded controller(s). In another embodiment, the master controller 224 uses local memory, such as a dynamic memory array 230 (dynamic random access memory "DRAM"), a static memory array 232 (static random access memory "SRAM"), etc. In one embodiment, the local memory is controlled using the master controller 224. In another embodiment, the master controller 224 accesses the local memory via a memory controller 228. In another embodiment, the master controller 224 runs a Linux server and may support various common server interfaces, such as the World Wide Web, hyper-text markup language ("HTML"), etc. In another embodiment, the master controller 224 uses a nano-processor. The master controller 224 may be constructed using programmable or standard logic, or any combination of controller types listed above. One skilled in the art will recognize many embodiments for the master controller 224.

In one embodiment, where the storage device/solid-state storage device controller 202 manages multiple data storage devices/solid-state storage media 110a-n, the master controller 224 divides the work load among internal controllers, such as the solid-state storage controllers 104a-n. For example, the master controller 224 may divide an object to be written to the data storage devices (e.g. solid-state storage media 110a-n) so that a portion of the object is stored on each of the attached data storage devices. This feature is a performance enhancement allowing quicker storage and access to an object. In one embodiment, the master controller 224 is implemented using an FPGA. In another embodiment, the firmware within the master controller 224 may be updated through the management bus 236, the system bus 240 over a network connected to a NIC 244 or other device connected to the system bus 240.

In one embodiment, the master controller 224, which manages objects, emulates block storage such that a computer 112 or other device connected to the storage device/solid-state storage device 102 views the storage device/solid-state storage device 102 as a block storage device and sends data to specific physical addresses in the storage device/solid-state storage device 102. The master controller 224 then divides up the blocks and stores the data blocks as it would objects. The master controller 224 then maps the blocks and physical address sent with the block to the actual locations determined by the master controller 224. The mapping is stored in the object index. Typically, for block emulation, a block device application program interface ("API") is provided in a driver in the computer 112, client 114, or other device wishing to use the storage device/solid-state storage device 102 as a block storage device.

In another embodiment, the master controller 224 coordinates with NIC controllers 244 and embedded RDMA controllers 246 to deliver just-in-time RDMA transfers of data and command sets. NIC controller 244 may be hidden behind a non-transparent port to enable the use of custom drivers. Also, a driver on a client 114 may have access to the computer network 116 through an I/O memory driver using a standard stack API and operating in conjunction with NICs 244.

In one embodiment, the master controller 224 is also a redundant array of independent drive ("RAID") controller. Where the data storage device/solid-state storage device 102 is networked with one or more other data storage devices/solid-state storage devices 102, the master controller 224 may be a RAID controller for single tier RAID, multi-tier RAID, progressive RAID, etc. The master controller 224 also allows some objects to be stored in a RAID array and other objects to be stored without RAID. In another embodiment, the master controller 224 may be a distributed RAID controller element. In another embodiment, the master controller 224 may comprise many RAID, distributed RAID, and other functions as described elsewhere. In one embodiment, the master controller 224 controls storage of data in a RAID-like structure where parity information is stored in one or more storage elements 216, 218, 220 of a logical page where the parity information protects data stored in the other storage elements 216, 218, 220 of the same logical page.

In one embodiment, the master controller 224 coordinates with single or redundant network managers (e.g. switches) to establish routing, to balance bandwidth utilization, failover, etc. In another embodiment, the master controller 224 coordinates with integrated application specific logic (via local bus 206) and associated driver software. In another embodiment, the master controller 224 coordinates with attached application specific processors 258 or logic (via the external system bus 240) and associated driver software. In another embodiment, the master controller 224 coordinates with remote application specific logic (via the computer network 116) and associated driver software. In another embodiment, the master controller 224 coordinates with the local bus 206 or external bus attached hard disk drive ("HDD") storage controller.

In one embodiment, the master controller 224 communicates with one or more storage controllers 254 where the storage device/solid-state storage device 102 may appear as a storage device connected through a SCSI bus, Internet SCSI ("iSCSI"), fiber channel, etc. Meanwhile the storage device/solid-state storage device 102 may autonomously manage objects and may appear as an object file system or distributed object file system. The master controller 224 may also be accessed by peer controllers 256 and/or application specific processors 258.

In another embodiment, the master controller 224 coordinates with an autonomous integrated management controller to periodically validate FPGA code and/or controller software, validate FPGA code while running (reset) and/or validate controller software during power on (reset), support external reset requests, support reset requests due to watchdog timeouts, and support voltage, current, power, temperature, and other environmental measurements and setting of threshold interrupts. In another embodiment, the master controller 224 manages garbage collection to free erase blocks for reuse. In another embodiment, the master controller 224 manages wear leveling. In another embodiment, the master controller 224 allows the data storage device/solid-state storage device 102 to be partitioned into multiple virtual devices and allows partition-based media encryption. In yet another embodiment, the master controller 224 supports a solid-state storage controller 104 with advanced, multi-bit ECC correction. One of skill in the art will recognize other features and functions of a master controller 224 in a storage controller 202, or more specifically in a solid-state storage device 102.

In one embodiment, the solid-state storage device controller 202 includes a memory controller 228, which controls a dynamic random memory array 230 and/or a SRAM 232. As stated above, the memory controller 228 may be independent or integrated with the master controller 224. The memory controller 228 typically controls volatile memory of some type, such as DRAM (dynamic random memory array 230) and SRAM (static random memory array 232). In other examples, the memory controller 228 also controls other memory types, such as electrically erasable programmable read only memory ("EEPROM"), etc. In other embodiments, the memory controller 228 controls two or more memory types and the memory controller 228 may include more than one controller. Typically, the memory controller 228 controls as much SRAM 232 as is feasible and by DRAM 230 to supplement the SRAM 232.

In one embodiment, the object index is stored in memory 230, 232 and then periodically off-loaded to a channel of the solid-state storage media 110n or other non-volatile memory. One of skill in the art will recognize other uses and configurations of the memory controller 228, dynamic memory array 230, and static memory array 232.

In one embodiment, the solid-state storage device controller 202 includes a DMA controller 226 that controls DMA operations between the storage device/solid-state storage device 102 and one or more external memory controllers 250 and associated external memory arrays 252 and CPUs 248. Note that the external memory controllers 250 and external memory arrays 252 are called external because they are external to the storage device/solid-state storage device 102. In addition the DMA controller 226 may also control RDMA operations with requesting devices through a NIC 244 and associated RDMA controller 246.

In one embodiment, the solid-state storage device controller 202 includes a management controller 234 connected to a management bus 236. Typically, the management controller 234 manages environmental metrics and status of the storage device/solid-state storage device 102. The management controller 234 may monitor device temperature, fan speed, power supply settings, etc. over the management bus 236.

The management controller 234 may support the reading and programming of erasable programmable read only memory ("EEPROM") for storage of FPGA code and controller software. Typically the management bus 236 is connected to the various components within the storage device/solid-state storage device 102. The management controller 234 may communicate alerts, interrupts, etc. over the local bus 206 or may include a separate connection to a system bus 240 or other bus. In some embodiments, the management bus 236 is an Inter-Integrated Circuit ("I2C") bus. One of skill in the art will recognize other related functions and uses of a management controller 234 connected to components of the storage device/solid-state storage device 102 by a management bus 236.

In some embodiments, the solid-state storage device controller 202 includes miscellaneous logic 242 that may be customized for a specific application. Typically where the solid-state device controller 202 or master controller 224 is/are configured using a FPGA or other configurable controller, custom logic may be included based on a particular application, customer requirement, storage requirement, etc.

Data Pipeline

Figure 3:
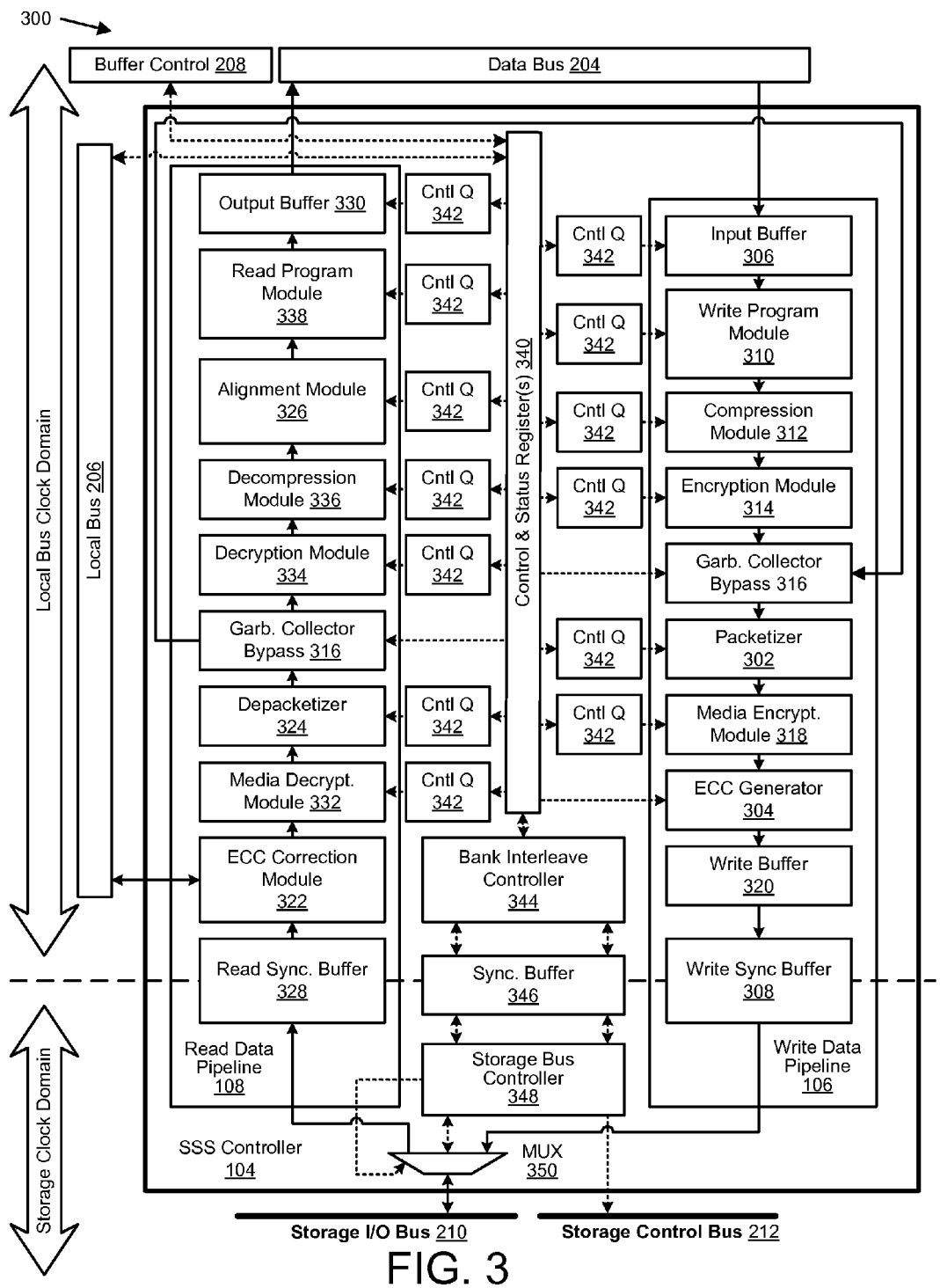
FIG. 3 is a schematic block diagram illustrating another embodiment of a solid-state storage controller comprising a write data pipeline and a read data pipeline.

FIG. 3 is a schematic block diagram illustrating one embodiment 300 of a solid-state storage controller 104 with a write data pipeline 106 and a read data pipeline 108. The embodiment 300 includes a data bus 204, a local bus 206, and buffer control 208, which are substantially similar to those described in relation to the solid-state storage device controller 202 of FIG. 2. The write data pipeline 106 includes a packetizer 302 and an error-correcting code ("ECC") generator 304. In other embodiments, the write data pipeline 106 includes an input buffer 306, a write synchronization buffer 308, a write program module 310, a compression module 312, an encryption module 314, a garbage collector bypass 316 (with a portion within the read data pipeline 108), a media encryption module 318, and a write buffer 320. The read data pipeline 108 includes a read synchronization buffer 328, an ECC correction module 322, a depacketizer 324, an alignment module 326, and an output buffer 330. In other embodiments, the read data pipeline 108 may include a media decryption module 332, a portion of the garbage collector bypass 316, a decryption module 334, a decompression module 336, and a read program module 338. The solid-state storage controller 104 may also include control and status registers 340 and control queues 342, a bank interleave controller 344, a synchronization buffer 346, a storage bus controller 348, and a multiplexer ("MUX") 350. The components of the solid-state controller 104 and associated write data pipeline 106 and read data pipeline 108 are described below. In other embodiments, synchronous solid-state storage media 110 may be used and synchronization buffers 308 328 may be eliminated.

Write Data Pipeline

The write data pipeline 106 includes a packetizer 302 that receives a data or metadata segment to be written to the solid-state storage, either directly or indirectly through another write data pipeline 106 stage, and creates one or more packets sized for the solid-state storage media 110. The data or metadata segment is typically part of a data structure, such as an object, but may also include an entire data structure. In another embodiment, the data segment is part of a block of data, but may also include an entire block of data. Typically, a set of data, such as a data structure, is received from a computer, such as the host device 114, or other computer or device and is transmitted to the solid-state storage device 102 in data segments streamed to the solid-state storage device 102 and/or the host device 114. A data segment may also be known by another name, such as data parcel, but as referenced herein includes all or a portion of a data structure or data block.

Each data structure is stored as one or more packets. Each data structure may have one or more container packets. Each packet contains a header. The header may include a header type field, which may comprise data, attribute, metadata, data segment delimiters (multi-packet), data structures, data linkages, and the like. The header may also include information regarding the size of the packet, such as the number of bytes of data included in the packet. The length of the packet may be established by the packet type. The header may include information that establishes the relationship of the packet to a data structure. An example might be the use of an offset in a data packet header to identify the location of the data segment within the data structure. One of skill in the art will recognize other information that may be included in a header added to data by a packetizer 302 and other information that may be added to a data packet.

Each packet includes a header and possibly data from the data or metadata segment. The header of each packet includes pertinent information to relate the packet to the data structure to which the packet belongs. For example, the header may include an object identifier or other data structure identifier and offset that indicate the data segment, object, data structure or data block from which the data packet was formed. The header may also include a logical address used by the storage bus controller 348 to store the packet. The header may also include information regarding the size of the packet, such as the number of bytes included in the packet. The header may also include a sequence number that identifies where the data segment belongs with respect to other packets within the data structure when reconstructing the data segment or data structure. The header may include a header type field. Type fields may include data, data structure attributes, metadata, data segment delimiters (multi-packet), data structure types, data structure linkages, and the like. One of skill in the art will recognize other information that may be included in a header added to data or metadata by a packetizer 302 and other information that may be added to a packet.

The write data pipeline 106 includes an ECC generator 304 that generates one or more error-correcting codes ("ECC") for the one or more packets received from the packetizer 302. The ECC generator 304 typically uses an error correcting algorithm to generate ECC check bits which are stored with the one or more data packets. The ECC codes generated by the ECC generator 304 together with the one or more data packets associated with the ECC codes comprise an ECC chunk. The ECC data stored with the one or more data packets is used to detect and to correct errors introduced into the data through transmission and storage. In one embodiment, packets are streamed into the ECC generator 304 as un-encoded blocks of length N. A syndrome of length S is calculated, appended and output as an encoded block of length N+S. The value of N and S are dependent upon the characteristics of the algorithm, which is selected to achieve specific performance, efficiency, and robustness metrics. In one embodiment, there is no fixed relationship between the ECC blocks and the packets, the packet may comprise more than one ECC block, the ECC block may comprise more than one packet; and a first packet may end anywhere within the ECC block and a second packet may begin after the end of the first packet within the same ECC block. In one embodiment, ECC algorithms are not dynamically modified. In one embodiment, the ECC data stored with the data packets is robust enough to correct errors in more than two bits.

Beneficially, using a robust ECC algorithm allowing more than single bit correction or even double bit correction allows the life of the solid-state storage media 110 to be extended. For example, if flash memory is used as the storage medium in the solid-state storage media 110, the flash memory may be written approximately 100,000 times without error per erase cycle. This usage limit may be extended using a robust ECC algorithm. Having the ECC generator 304 and corresponding ECC correction module 322 onboard the solid-state storage device 102, the solid-state storage device 102 can internally correct errors and has a longer useful life than if a less robust ECC algorithm is used, such as single bit correction. However, in other embodiments the ECC generator 304 may use a less robust algorithm and may correct single-bit or double-bit errors. In another embodiment, the solid-state storage device 102 may comprise less reliable storage, such as multi-level cell ("MLC") flash in order to increase capacity, which storage may not be sufficiently reliable without more robust ECC algorithms.

In one embodiment, the write pipeline 106 includes an input buffer 306 that receives a data segment to be written to the solid-state storage media 110 and stores the incoming data segments until the next stage of the write data pipeline 106, such as the packetizer 302 (or other stage for a more complex write data pipeline 106) is ready to process the next data segment. The input buffer 306 typically allows for discrepancies between the rate at which data segments are received and the rate they are processed by the write data pipeline 106 using an appropriately sized data buffer. The input buffer 306 also allows the data bus 204 to transfer data to the write data pipeline 106 at rates greater than can be sustained by the write data pipeline 106 in order to improve efficiency of operation of the data bus 204. Typically, when the write data pipeline 106 does not include an input buffer 306, a buffering function is performed elsewhere, such as in the solid-state storage device 102, but outside the write data pipeline 106, in the host device 114, such as within a network interface card ("NIC"), or at another device, for example, when using remote direct memory access ("RDMA").

In another embodiment, the write data pipeline 106 also includes a write synchronization buffer 308 that buffers packets received from the ECC generator 304 prior to writing the packets to the solid-state storage media 110. The write synch buffer 308 is located at a boundary between a local clock domain and a solid-state storage clock domain and provides buffering to account for the clock domain differences. In other embodiments, synchronous solid-state storage media 110 may be used and synchronization buffers 308 328 may be eliminated.

In one embodiment, the write data pipeline 106 also includes a media encryption module 318 that receives the one or more packets from the packetizer 302, either directly or indirectly, and encrypts the one or more packets using an encryption key unique to the solid-state storage device 102 prior to sending the packets to the ECC generator 304. Typically, the entire packet is encrypted, including the headers. In another embodiment, headers are not encrypted. In this document, encryption key is understood to mean a secret encryption key that is managed externally from a solid-state storage controller 104.

The media encryption module 318 and corresponding media decryption module 332 provide a level of security for data stored in the solid-state storage media 110. For example, where data is encrypted with the media encryption module 318, if the solid-state storage media 110 is connected to a different solid-state storage controller 104, solid-state storage device 102, or server, the contents of the solid-state storage media 110 typically could not be read without use of the same encryption key used during the write of the data to the solid-state storage media 110 without significant effort.

In a typical embodiment, the solid-state storage device 102 does not store the encryption key in non-volatile storage and allows no external access to the encryption key. The encryption key is provided to the solid-state storage controller 104 during initialization. The solid-state storage device 102 may use and store a non-secret cryptographic nonce that is used in conjunction with an encryption key. A different nonce may be stored with every packet. Data segments may be split between multiple packets with unique nonces for the purpose of improving protection by the encryption algorithm.

The encryption key may be received from a host device 114, a server, key manager, or other device that manages the encryption key to be used by the solid-state storage controller 104. In another embodiment, the solid-state storage media 110 may have two or more partitions and the solid-state storage controller 104 behaves as though it was two or more solid-state storage controllers 104, each operating on a single partition within the solid-state storage media 110. In this embodiment, a unique media encryption key may be used with each partition.

In another embodiment, the write data pipeline 106 also includes an encryption module 314 that encrypts a data or metadata segment received from the input buffer 306, either directly or indirectly, prior sending the data segment to the packetizer 302, the data segment encrypted using an encryption key received in conjunction with the data segment. The encryption keys used by the encryption module 314 to encrypt data may not be common to all data stored within the solid-state storage device 102. In some embodiments, the encryption keys may vary on a per data structure basis; new or updated encryption keys may be received in conjunction with receiving data segments as described below. For example, an encryption key for a data segment to be encrypted by the encryption module 314 may be received with the data segment or may be received as part of a command to write a data structure to which the data segment belongs. The solid-state storage device 102 may use and store a non-secret cryptographic nonce in each data structure packet that is used in conjunction with the encryption key. A different nonce may be stored with every packet. Data segments may be split between multiple packets with unique nonces for the purpose of improving protection by the encryption algorithm.

The encryption key may be received from a host device 114, a computer, key manager, or other device that holds the encryption key to be used to encrypt the data segment. In one embodiment, encryption keys are transferred to the solid-state storage controller 104 from one of a solid-state storage device 102, a computer, a host device 114, or other external agent, which has the ability to execute industry standard methods to securely transfer and protect private and public keys.

In one embodiment, the encryption module 314 encrypts a first packet with a first encryption key received in conjunction with the packet and encrypts a second packet with a second encryption key received in conjunction with the second packet. In another embodiment, the encryption module 314 encrypts a first packet with a first encryption key received in conjunction with the packet and passes a second data packet on to the next stage without encryption. Beneficially, the encryption module 314 included in the write data pipeline 106 of the solid-state storage device 102 allows data structure-by-data structure or segment-by-segment data encryption without a single file system or other external system to keep track of the different encryption keys used to store corresponding data structures or data segments. Each requesting device 155 or related key manager independently manages encryption keys used to encrypt only the data structures or data segments sent by the requesting device 155.

In one embodiment, the encryption module 314 may encrypt the one or more packets using an encryption key unique to the solid-state storage device 102. The encryption module 314 may perform this media encryption independently, or in addition to the encryption described above. Typically, the entire packet is encrypted, including the headers. In another embodiment, headers are not encrypted. The media encryption by the encryption module 314 provides a level of security for data stored in the solid-state storage media 110. For example, where data is encrypted with media encryption unique to the specific solid-state storage device 102 if the solid-state storage media 110 is connected to a different solid-state storage controller 104, solid-state storage device 102, or host device 114, the contents of the solid-state storage media 110 typically could not be read without use of the same encryption key used during the write of the data to the solid-state storage media 110 without significant effort.

In another embodiment, the write data pipeline 106 includes a compression module 312 that compresses the data for metadata segment prior to sending the data segment to the packetizer 302. The compression module 312 typically compresses a data or metadata segment using a compression routine known to those of skill in the art to reduce the storage size of the segment. For example, if a data segment includes a string of 512 zeros, the compression module 312 may replace the 512 zeros with code or token indicating the 512 zeros where the code is much more compact than the space taken by the 512 zeros.

In one embodiment, the compression module 312 compresses a first segment with a first compression routine and passes along a second segment without compression. In another embodiment, the compression module 312 compresses a first segment with a first compression routine and compresses the second segment with a second compression routine. Having this flexibility within the solid-state storage device 102 is beneficial, as it enables the host device 114 or other devices writing data to the solid-state storage device 102 to specify a compression routine or so that one can specify a compression routine while another specifies no compression. Selection of compression routines may also be selected according to default settings on a per data structure type or data structure class basis. For example, a first data structure of a specific data structure may be able to override default compression routine settings and a second data structure of the same data structure class and data structure type may use the default compression routine and a third data structure of the same data structure class and data structure type may use no compression.

In one embodiment, the write data pipeline 106 includes a garbage collector bypass 316 that receives data segments from the read data pipeline 108 as part of a data bypass in a garbage collection system. A garbage collection system typically marks packets that are no longer valid, typically because the packet is marked for deletion or has been modified and the modified data is stored in a different location. At some point, the garbage collection system determines that a particular section of storage may be recovered. This determination may be due to a lack of available storage capacity, the percentage of data marked as invalid reaching a threshold, a consolidation of valid data, an error detection rate for that section of storage reaching a threshold, or improving performance based on data distribution, etc. Numerous factors may be considered by a garbage collection algorithm to determine when a section of storage is to be recovered.

Once a section of storage has been marked for recovery, valid packets in the section typically must be relocated. The garbage collector bypass 316 allows packets to be read into the read data pipeline 108 and then transferred directly to the write data pipeline 106 without being routed out of the solid-state storage controller 104. In one embodiment, the garbage collector bypass 316 is part of an autonomous garbage collector system that operates within the solid-state storage device 102. This allows the solid-state storage device 102 to manage data so that data is systematically spread throughout the solid-state storage media 110 to improve performance, data reliability and to avoid overuse and underuse of any one location or area of the solid-state storage media 110 and to lengthen the useful life of the solid-state storage media 110.

The garbage collector bypass 316 coordinates insertion of segments into the write data pipeline 106 with other segments being written by a host device 114 or other devices. In the depicted embodiment, the garbage collector bypass 316 is before the packetizer 302 in the write data pipeline 106 and after the depacketizer 324 in the read data pipeline 108, but may also be located elsewhere in the read and write data pipelines 106 and 108. The garbage collector bypass 316 may be used during a flush of the write pipeline 108 to fill the remainder of the logical page in order to improve the efficiency of storage within the solid-state storage media 110 and thereby reduce the frequency of garbage collection.

In one embodiment, the write data pipeline 106 includes a write buffer 320 that buffers data for efficient write operations. Typically, the write buffer 320 includes enough capacity for packets to fill at least one logical page in the solid-state storage media 110. This allows a write operation to send an entire page of data to the solid-state storage media 110 without interruption. By sizing the write buffer 320 of the write data pipeline 106 and buffers within the read data pipeline 108 to be the same capacity or larger than a storage write buffer within the solid-state storage media 110, writing and reading data is more efficient since a single write command may be crafted to send a full logical page of data to the solid-state storage media 110 instead of multiple commands.

While the write buffer 320 is being filled, the solid-state storage media 110 may be used for other read operations. This is advantageous because other solid-state devices with a smaller write buffer or no write buffer may tie up the solid-state storage when data is written to a storage write buffer and data flowing into the storage write buffer stalls. Read operations will be blocked until the entire storage write buffer is filled and programmed. Another approach for systems without a write buffer or a small write buffer is to flush the storage write buffer that is not full in order to enable reads. Again this is inefficient because multiple write/program cycles are required to fill a page.

For depicted embodiment with a write buffer 320 sized larger than a logical page, a single write command, which includes numerous subcommands, can then be followed by a single program command to transfer the page of data from the storage write buffer in each solid-state storage element 216, 218, 220 to the designated page within each solid-state storage element 216, 218, 220. This technique has the benefits of eliminating partial page programming, which is known to reduce data reliability and durability and freeing up the destination bank for reads and other commands while the buffer fills.

In one embodiment, the write buffer 320 is a ping-pong buffer where one side of the buffer is filled and then designated for transfer at an appropriate time while the other side of the ping-pong buffer is being filled. In another embodiment, the write buffer 320 includes a first-in first-out ("FIFO") register with a capacity of more than a logical page of data segments. One of skill in the art will recognize other write buffer 320 configurations that allow a logical page of data to be stored prior to writing the data to the solid-state storage media 110.

In another embodiment, the write buffer 320 is sized smaller than a logical page so that less than a page of information could be written to a storage write buffer in the solid-state storage media 110. In the embodiment, to prevent a stall in the write data pipeline 106 from holding up read operations, data is queued using the garbage collection system that needs to be moved from one location to another as part of the garbage collection process. In case of a data stall in the write data pipeline 106, the data can be fed through the garbage collector bypass 316 to the write buffer 320 and then on to the storage write buffer in the solid-state storage media 110 to fill the pages of a logical page prior to programming the data. In this way a data stall in the write data pipeline 106 would not stall reading from the solid-state storage device 102.

In another embodiment, the write data pipeline 106 includes a write program module 310 with one or more user-definable functions within the write data pipeline 106. The write program module 310 allows a user to customize the write data pipeline 106. A user may customize the write data pipeline 106 based on a particular data requirement or application. Where the solid-state storage controller 104 is an FPGA, the user may program the write data pipeline 106 with custom commands and functions relatively easily. A user may also use the write program module 310 to include custom functions with an ASIC, however, customizing an ASIC may be more difficult than with an FPGA. The write program module 310 may include buffers and bypass mechanisms to allow a first data segment to execute in the write program module 310 while a second data segment may continue through the write data pipeline 106. In another embodiment, the write program module 310 may include a processor core that can be programmed through software.

Note that the write program module 310 is shown between the input buffer 306 and the compression module 312, however, the write program module 310 could be anywhere in the write data pipeline 106 and may be distributed among the various stages 302-320. In addition, there may be multiple write program modules 310 distributed among the various states 302-320 that are programmed and operate independently. In addition, the order of the stages 302-320 may be altered. One of skill in the art will recognize workable alterations to the order of the stages 302-320 based on particular user requirements. For example, in some embodiments, the write data pipeline 106 includes a write padding module (not shown) to insert padding data into the write buffer 320. The padding data may be inserted such that, when placed on the storage I/O bus 210, the padding data maps to OOS storage units within a particular logical storage unit. An example of a write data pipeline comprising a write padding module is described below in conjunction with FIG. 7.

Read Data Pipeline

The read data pipeline 108 includes an ECC correction module 322, which is configured to identify errors in the ECC blocks comprising the packet read from the solid-state storage media 110. The ECC correction module 322 determines if a data error exists in an ECC block and corrects any correctable errors using the ECC of the ECC block. For example, if the ECC can detect an error in six bits, but can only correct three bit errors, the ECC correction module 322 corrects ECC blocks of the requested packet with up to three bits in error. The ECC correction module 322 corrects the bits in error by changing the bits in error to the correct one or zero state so that the requested data packet is identical to when it was written to the solid-state storage media 110 and the ECC was generated for the packet.

If the ECC correction module 322 determines that the requested packets contains more bits in error than the ECC can correct, the ECC correction module 322 cannot correct the errors in the corrupted ECC blocks of the requested packet and sends an interrupt. In one embodiment, the ECC correction module 322 sends an interrupt with a message indicating that the requested packet is in error. The message may include information that the ECC correction module 322 cannot correct the errors or the inability of the ECC correction module 322 to correct the errors may be implied. In another embodiment, the ECC correction module 322 sends the corrupted ECC blocks of the requested packet with the interrupt and/or the message.

In one embodiment, a corrupted ECC block or portion of a corrupted ECC block of the requested packet that cannot be corrected by the ECC correction module 322 is read by the master controller 224, corrected, and returned to the ECC correction module 322 for further processing by the read data pipeline 108. In one embodiment, a corrupted ECC block or portion of a corrupted ECC block of the requested packet is sent to the device requesting the data. The requesting device 155 may correct the ECC block or replace the data using another copy, such as a backup or mirror copy, and then may use the replacement data of the requested data packet or return it to the read data pipeline 108. The requesting device 155 may use header information in the requested packet in error to identify data required to replace the corrupted requested packet or to replace the data structure to which the packet belongs. In another embodiment, the solid-state storage controller 104 stores data using some type of RAID and is able to recover the corrupted data. In another embodiment, the ECC correction module 322 sends an interrupt and/or message and the receiving device fails the read operation associated with the requested data packet. One of skill in the art will recognize other options and actions to be taken as a result of the ECC correction module 322 determining that one or more ECC blocks of the requested packet are corrupted and that the ECC correction module 322 cannot correct the errors.

The read data pipeline 108 includes a depacketizer 324 that receives ECC blocks of the requested packet from the ECC correction module 322, directly or indirectly, and checks and removes one or more packet headers. The depacketizer 324 may validate the packet headers by checking packet identifiers, data length, data location, etc. within the headers. In one embodiment, the header includes a hash code that can be used to validate that the packet delivered to the read data pipeline 108 is the requested packet. The depacketizer 324 also removes the headers from the requested packet added by the packetizer 302. The depacketizer 324 may be directed to not operate on certain packets but pass these forward without modification. An example might be a container label that is requested during the course of a rebuild process where the header information is required for index reconstruction. Further examples include the transfer of packets of various types destined for use within the solid-state storage device 102. In another embodiment, the depacketizer 324 operation may be packet type dependent.

The read data pipeline 108 includes an alignment module 326 that receives data from the depacketizer 324 and removes unwanted data. In one embodiment, a read command sent to the solid-state storage media 110 retrieves a packet of data. A device requesting the data may not require all data within the retrieved packet and the alignment module 326 removes the unwanted data. If all data within a retrieved page is requested data, the alignment module 326 does not remove any data.

The alignment module 326 re-formats the data as data segments of a data structure in a form compatible with a device requesting the data segment prior to forwarding the data segment to the next stage. Typically, as data is processed by the read data pipeline 108, the size of data segments or packets changes at various stages. The alignment module 326 uses received data to format the data into data segments suitable to be sent to the requesting device 155 and joined to form a response. For example, data from a portion of a first data packet may be combined with data from a portion of a second data packet. If a data segment is larger than a data requested by the requesting device 155, the alignment module 326 may discard the unwanted data.

In one embodiment, the read data pipeline 108 includes a read synchronization buffer 328 that buffers one or more requested packets read from the solid-state storage media 110 prior to processing by the read data pipeline 108. The read synchronization buffer 328 is at the boundary between the solid-state storage clock domain and the local bus clock domain and provides buffering to account for the clock domain differences.

In another embodiment, the read data pipeline 108 includes an output buffer 330 that receives requested packets from the alignment module 326 and stores the packets prior to transmission to the requesting device 155. The output buffer 330 accounts for differences between when data segments are received from stages of the read data pipeline 108 and when the data segments are transmitted to other parts of the solid-state storage controller 104 or to the requesting device 155. The output buffer 330 also allows the data bus 204 to receive data from the read data pipeline 108 at rates greater than can be sustained by the read data pipeline 108 in order to improve efficiency of operation of the data bus 204.

In one embodiment, the read data pipeline 108 includes a media decryption module 332 that receives one or more encrypted requested packets from the ECC correction module 322 and decrypts the one or more requested packets using the encryption key unique to the solid-state storage device 102 prior to sending the one or more requested packets to the depacketizer 324. Typically, the encryption key used to decrypt data by the media decryption module 332 is identical to the encryption key used by the media encryption module 318. In another embodiment, the solid-state storage media 110 may have two or more partitions and the solid-state storage controller 104 behaves as though it was two or more solid-state storage controllers 104 each operating on a single partition within the solid-state storage media 110. In this embodiment, a unique media encryption key may be used with each partition.

In another embodiment, the read data pipeline 108 includes a decryption module 334 that decrypts a data segment formatted by the depacketizer 324 prior to sending the data segment to the output buffer 330. The data segment may be decrypted using an encryption key received in conjunction with the read request that initiates retrieval of the requested packet received by the read synchronization buffer 328. The decryption module 334 may decrypt a first packet with an encryption key received in conjunction with the read request for the first packet and then may decrypt a second packet with a different encryption key or may pass the second packet on to the next stage of the read data pipeline 108 without decryption. When the packet was stored with a non-secret cryptographic nonce, the nonce is used in conjunction with an encryption key to decrypt the data packet. The encryption key may be received from a host device 114, a computer, key manager, or other device that manages the encryption key to be used by the solid-state storage controller 104.

In another embodiment, the read data pipeline 108 includes a decompression module 336 that decompresses a data segment formatted by the depacketizer 324. In one embodiment, the decompression module 336 uses compression information stored in one or both of the packet header and the container label to select an appropriate decompression routine (e.g., select a decompression routine compatible with the compression routine that was used by the compression module 312 to compress the data segment). In another embodiment, the decompression routine used by the decompression module 336 is dictated by the device requesting the data segment being decompressed. In another embodiment, the decompression module 336 selects a decompression routine according to default settings on a per data structure type or data structure class basis. A first packet of a first object may be able to override a default decompression routine and a second packet of a second data structure of the same data structure class and data structure type may use the default decompression routine and a third packet of a third data structure of the same data structure class and data structure type may use no decompression.

In another embodiment, the read data pipeline 108 includes a read program module 338 that includes one or more user-definable functions within the read data pipeline 108. The read program module 338 has similar characteristics to the write program module 310 and allows a user to provide custom functions to the read data pipeline 108. The read program module 338 may be located as shown in FIG. 3, may be located in another position within the read data pipeline 108, or may include multiple parts in multiple locations within the read data pipeline 108. Additionally, there may be multiple read program modules 338 within multiple locations within the read data pipeline 108 that operate independently. One of skill in the art will recognize other forms of a read program module 338 within a read data pipeline 108. As with the write data pipeline 106, the stages of the read data pipeline 108 may be rearranged and one of skill in the art will recognize other orders of stages within the read data pipeline 108.

The solid-state storage controller 104 includes control and status registers 340 and corresponding control queues 342. The control and status registers 340 and control queues 342 facilitate control and sequencing commands and subcommands associated with data processed in the write and read data pipelines 106, 108. For example, a data segment in the packetizer 302 may have one or more corresponding control commands or instructions in a control queue 342 associated with the ECC generator 304. As the data segment is packetized, some of the instructions or commands may be executed within the packetizer 302. Other commands or instructions may be passed to the next control queue 342 through the control and status registers 340 as the newly formed data packet created from the data segment is passed to the next stage.

Commands or instructions may be simultaneously loaded into the control queues 342 for a packet being forwarded to the write data pipeline 106 with each pipeline stage pulling the appropriate command or instruction as the respective packet is executed by that stage. Similarly, commands or instructions may be simultaneously loaded into the control queues 342 for a packet being requested from the read data pipeline 108 with each pipeline stage pulling the appropriate command or instruction as the respective packet is executed by that stage. One of skill in the art will recognize other features and functions of control and status registers 340 and control queues 342.

Figure 4:
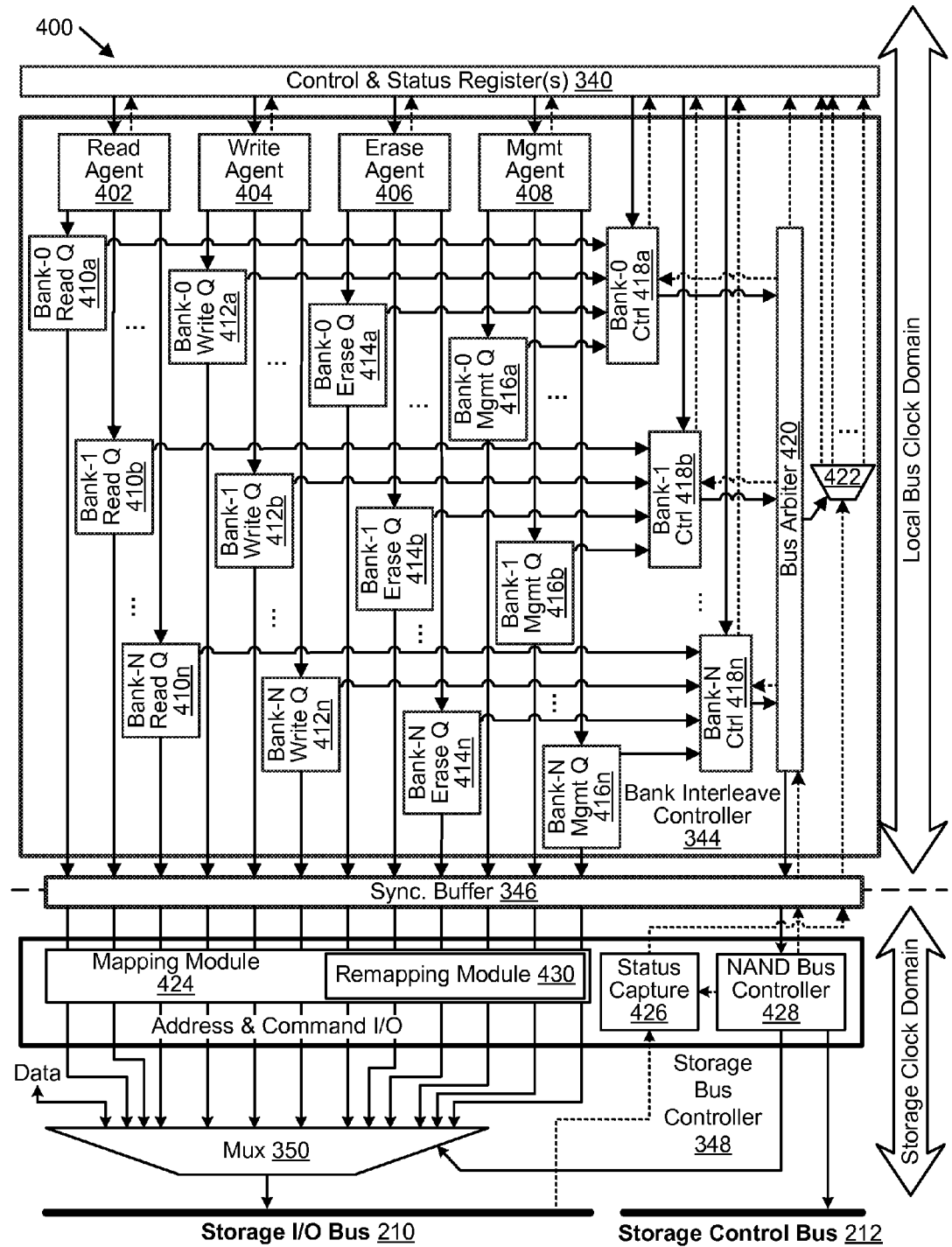
FIG. 4 is a schematic block diagram illustrating one embodiment of a bank interleave controller for a solid-state storage device.

The solid-state storage controller 104 and or the solid-state storage device 102 may also include a bank interleave controller 344, a synchronization buffer 346, a storage bus controller 348, and a multiplexer ("MUX") 350, which are described in relation to FIG. 4.

The ordering and/or configuration of the read data pipeline 108 may be adapted based on particular user requirements. For example, in some embodiments, the read data pipeline 108 includes a read padding module (not shown) to strip data from data read from the storage I/O bus 210. The data is stripped at locations corresponding to OOS storage units within a particular logical storage unit. An example of a read data pipeline comprising a read padding module is described below in conjunction with FIG. 7.

Bank Interleave

FIG. 4 is a schematic block diagram illustrating one embodiment 400 of a bank interleave controller 344 in the solid-state storage controller 104 in accordance with the present invention. The bank interleave controller 344 is connected to the control and status registers 340 and to the storage I/O bus 210 and storage control bus 212 through the MUX 350, storage bus controller 348, and synchronization buffer 346, which are described below. The bank interleave controller 344 includes a read agent 402, a write agent 404, an erase agent 406, a management agent 408, read queues 410a-n, write queues 412a-n, erase queues 414a-n, and management queues 416a-n for the banks 214 in the solid-state storage media 110, bank controllers 418a-n, a bus arbiter 420, and a status MUX 422, which are described below. In some embodiments, the storage bus controller 348 includes a mapping module 424 comprising a remapping module 430, a status capture module 426, and a NAND bus controller 428, which are described below.

The bank interleave controller 344 directs one or more commands to two or more queues in the bank interleave controller 104 and coordinates among the banks 214 of the solid-state storage media 110 execution of the commands stored in the queues, such that a command of a first type executes on one bank 214a, while a command of a second type executes on a second bank 214b. The one or more commands are separated by command type into the queues. Each bank 214 of the solid-state storage media 110 has a corresponding set of queues within the bank interleave controller 344 and each set of queues includes a queue for each command type.

The bank interleave controller 344 coordinates among the banks 214 of the solid-state storage media 110 execution of the commands stored in the queues. For example, a command of a first type executes on one bank 214a while a command of a second type executes on a second bank 214b. Typically the command types and queue types include read and write commands and queues 410, 412, but may also include other commands and queues that are storage media specific. For example, in the embodiment depicted in FIG. 4, erase and management queues 414, 416 are included and would be appropriate for flash memory, NRAM, MRAM, DRAM, PRAM, SONOS, RRAM, PMC, CBRAM, racetrack memory, memristor memory, nanocrystal wire-based memory, silicon-oxide based sub-10 nanometer process memory, graphene memory, etc.

For other types of solid-state storage media 110, other types of commands and corresponding queues may be included without straying from the scope of the invention. The flexible nature of an FPGA solid-state storage controller 104 allows flexibility in storage media. If flash memory were changed to another solid-state storage type, the bank interleave controller 344, storage bus controller 348, and MUX 350 could be altered to accommodate the media type without significantly affecting the data pipelines 106, 108 and other solid-state storage controller 104 functions.

In the embodiment depicted in FIG. 4, the bank interleave controller 344 includes, for each bank 214, a read queue 410 for reading data from the solid-state storage media 110, a write queue 412 for write commands to the solid-state storage media 110, an erase queue 414 for erasing an erase block in the solid-state storage, and a management queue 416 for management commands. The bank interleave controller 344 also includes corresponding read, write, erase, and management agents 402, 404, 406, 408. In another embodiment, the control and status registers 340 and control queues 342 or similar components queue commands for data sent to the banks 214 of the solid-state storage media 110 without a bank interleave controller 344.

The agents 402, 404, 406, 408, in one embodiment, direct commands of the appropriate type destined for a particular bank 214a to the correct queue for the bank 214a. For example, the read agent 402 may receive a read command for bank-1 214b and directs the read command to the bank-1 read queue 410b. The write agent 404 may receive a write command to write data to a location in bank-0 214a of the solid-state storage media 110 and will then send the write command to the bank-0 write queue 412a. Similarly, the erase agent 406 may receive an erase command to erase an erase block in bank-1 214b and will then pass the erase command to the bank-1 erase queue 414b. The management agent 408 typically receives management commands, status requests, and the like, such as a reset command or a request to read a configuration register of a bank 214, such as bank-0 214a. The management agent 408 sends the management command to the bank-0 management queue 416a.

The agents 402, 404, 406, 408 typically also monitor status of the queues 410, 412, 414, 416 and send status, interrupt, or other messages when the queues 410, 412, 414, 416 are full, nearly full, non-functional, etc. In one embodiment, the agents 402, 404, 406, 408 receive commands and generate corresponding sub-commands. In one embodiment, the agents 402, 404, 406, 408 receive commands through the control & status registers 340 and generate corresponding sub-commands which are forwarded to the queues 410, 412, 414, 416. One of skill in the art will recognize other functions of the agents 402, 404, 406, 408.

The queues 410, 412, 414, 416 typically receive commands and store the commands until required to be sent to the solid-state storage banks 214. In a typical embodiment, the queues 410, 412, 414, 416 are first-in, first-out ("FIFO") registers or a similar component that operates as a FIFO. In another embodiment, the queues 410, 412, 414, 416 store commands in an order that matches data, order of importance, or other criteria.

The bank controllers 418 typically receive commands from the queues 410, 412, 414, 416 and generate appropriate sub-commands. For example, the bank-0 write queue 412a may receive a command to write a page of data packets to bank-0 214a. The bank-0 controller 418a may receive the write command at an appropriate time and may generate one or more write subcommands for each data packet stored in the write buffer 320 to be written to the page in bank-0 214a. For example, bank-0 controller 418a may generate commands to validate the status of bank 0 214a and the solid-state storage array 216, select the appropriate location for writing one or more data packets, clear the input buffers within the solid-state storage memory array 216, transfer the one or more data packets to the input buffers, program the input buffers into the selected location, verify that the data was correctly programmed, and if program failures occur, do one or more of interrupting the master controller 224, retrying the write to the same physical location, and retrying the write to a different physical location. Additionally, in conjunction with example write command, the storage bus controller 348 will cause the one or more commands to be multiplexed to each of the each of the storage I/O buses 210a-n with the logical address of the command mapped to a first physical address for storage I/O bus 210a, and mapped to a second physical address for storage I/O bus 210b, and so forth as further described below.

Typically, bus arbiter 420 selects from among the bank controllers 418 and pulls subcommands from output queues within the bank controllers 418 and forwards these to the Storage Bus Controller 348 in a sequence that optimizes the performance of the banks 214. In another embodiment, the bus arbiter 420 may respond to a high level interrupt and modify the normal selection criteria. In another embodiment, the master controller 224 can control the bus arbiter 420 through the control and status registers 340. One of skill in the art will recognize other means by which the bus arbiter 420 may control and interleave the sequence of commands from the bank controllers 418 to the solid-state storage media 110.

The bus arbiter 420 typically coordinates selection of appropriate commands, and corresponding data when required for the command type, from the bank controllers 418 and sends the commands and data to the storage bus controller 348. The bus arbiter 420 typically also sends commands to the storage control bus 212 to select the appropriate bank 214. For the case of flash memory or other solid-state storage media 110 with an asynchronous, bi-directional serial storage I/O bus 210, only one command (control information) or set of data can be transmitted at a time. For example, when write commands or data are being transmitted to the solid-state storage media 110 on the storage I/O bus 210, read commands, data being read, erase commands, management commands, or other status commands cannot be transmitted on the storage I/O bus 210. For example, when data is being read from the storage I/O bus 210, data cannot be written to the solid-state storage media 110.

For example, during a write operation on bank-0, the bus arbiter 420 selects the bank-0 controller 418a, which may have a write command or a series of write sub-commands on the top of its queue which cause the storage bus controller 348 to execute the following sequence. The bus arbiter 420 forwards the write command to the storage bus controller 348, which sets up a write command by selecting bank-0 214a through the storage control bus 212, sending a command to clear the input buffers of the solid-state storage elements 110 associated with the bank-0 214a, and sending a command to validate the status of the solid-state storage elements 216, 218, 220 associated with the bank-0 214a.

The storage bus controller 348 then transmits a write sub-command on the storage I/O bus 210, which contains the physical addresses, including the address of the logical erase block for each individual physical erase solid-stage storage element 216a-m as mapped from the logical erase block address. The storage bus controller 348 then muxes the write buffer 320 through the write sync buffer 308 to the storage I/O bus 210 through the MUX 350 and streams write data to the appropriate page. When the page is full, then storage bus controller 348 causes the solid-state storage elements 216a-m associated with the bank-0 214a to program the input buffer to the memory cells within the solid-state storage elements 216a-m. Finally, the storage bus controller 348 validates the status to ensure that page was correctly programmed.

A read operation is similar to the write example above. During a read operation, the bus arbiter 420, or other component of the bank interleave controller 344, receives data and corresponding status information and sends the data to the read data pipeline 108 while sending the status information on to the control and status registers 340. Typically, a read data command forwarded from bus arbiter 420 to the storage bus controller 348 will cause the MUX 350 to gate the read data on storage I/O bus 210 to the read data pipeline 108 and send status information to the appropriate control and status registers 340 through the status MUX 422.

The bus arbiter 420 coordinates the various command types and data access modes so that only an appropriate command type or corresponding data is on the bus at any given time. If the bus arbiter 420 has selected a write command, and write subcommands and corresponding data are being written to the solid-state storage media 110, the bus arbiter 420 will not allow other command types on the storage I/O bus 210. Beneficially, the bus arbiter 420 uses timing information, such as predicted command execution times, along with status information received concerning bank 214 status to coordinate execution of the various commands on the bus with the goal of minimizing or eliminating idle time of the buses.

The master controller 224, through the bus arbiter 420, typically uses expected completion times of the commands stored in the queues 410, 412, 414, 416, along with status information, so that when the subcommands associated with a command are executing on one bank 214a, other subcommands of other commands are executing on other banks 214b-n. When one command is fully executed on a bank 214a, the bus arbiter 420 directs another command to the bank 214a. The bus arbiter 420 may also coordinate commands stored in the queues 410, 412, 414, 416 with other commands that are not stored in the queues 410, 412, 414, 416.

For example, an erase command may be sent out to erase a group of erase blocks within the solid-state storage media 110. An erase command may take 10 to 1000 times more time to execute than a write or a read command or 10 to 100 times more time to execute than a program command. For N banks 214, the bank interleave controller 344 may split the erase command into N commands, each to erase a logical erase block of a bank 214*a*. While bank-0 214*a* is executing an erase command, the bus arbiter 420 may select other commands for execution on the other banks 214*b-n*. The bus arbiter 420 may also work with other components, such as the storage bus controller 348, the master controller 224, etc., to coordinate command execution among the buses. Coordinating execution of commands using the bus arbiter 420, bank controllers 418, queues 410, 412, 414, 416, and agents 402, 404, 406, 408 of the bank interleave controller 344 can dramatically increase performance over other solid-state storage systems without a bank interleave function.

In one embodiment, the solid-state controller 104 includes one bank interleave controller 344 that serves all of the storage elements 216, 218, 220 of the solid-state storage media 110. In another embodiment, the solid-state controller 104 includes a bank interleave controller 344 for each column of storage elements 216*a-m*, 218*a-m*, 220*a-m*. For example, one bank interleave controller 344 serves one column of storage elements SSS 0.0-SSS M.0 216*a*, 216*b*, . . . 216*m*, a second bank interleave controller 344 serves a second column of storage elements SSS 0.1-SSS M.1 218*a*, 218*b*, . . . 218*m* etc.

Storage-Specific Components

The solid-state storage controller 104 includes a synchronization buffer 346 that buffers commands and status messages sent and received from the solid-state storage media 110. The synchronization buffer 346 is located at the boundary between the solid-state storage clock domain and the local bus clock domain and provides buffering to account for the clock domain differences. The synchronization buffer 346, write synchronization buffer 308, and read synchronization buffer 328 may be independent or may act together to buffer data, commands, status messages, etc. In one embodiment, the synchronization buffer 346 is located where there are the fewest number of signals crossing the clock domains. One skilled in the art will recognize that synchronization between clock domains may be arbitrarily moved to other locations within the solid-state storage device 102 in order to optimize some aspect of design implementation.

The solid-state storage controller 104 includes a storage bus controller 348 that interprets and translates commands for data sent to and read from the solid-state storage media 110 and status messages received from the solid-state storage media 110 based on the type of solid-state storage media 110. For example, the storage bus controller 348 may have different timing requirements for different types of storage, storage with different performance characteristics, storage from different manufacturers, etc. The storage bus controller 348 also sends control commands to the storage control bus 212.

In one embodiment, the solid-state storage controller 104 includes a MUX 350 that comprises an array of multiplexers 350*a-n* where each multiplexer is dedicated to either a row or a column in the solid-state storage array 110. For example, multiplexer 350*a* is associated with solid-state storage elements 216*a*, 218*a*, 220*a*. MUX 350 routes the data from the write data pipeline 106 and commands from the storage bus controller 348 to the solid-state storage media 110 via the storage I/O bus 210 and routes data and status messages from the solid-state storage media 110 via the storage I/O bus 210 to the read data pipeline 108 and the control and status registers 340 through the storage bus controller 348, synchronization buffer 346, and bank interleave controller 344.

In some embodiments, the solid-state storage controller 104 includes a MUX 350 for each column of solid-state storage elements (e.g., SSS 0.0 216*a*, SSS 1.0 218*a*, SSS N.0 220*a*). A MUX 350 combines data from the write data pipeline 106 and commands sent to the solid-state storage 110 via the storage I/O bus 210 and separates data to be processed by the read data pipeline 108 from commands. Packets stored in the write buffer 320 are directed on busses out of the write buffer 320 through a write synchronization buffer 308 for each column of solid-state storage elements (SSS 0*.x* to SSS N*.x* 216, 218, 220) to the MUX 350 for each column of solid-state storage elements (SSS 0*.x* to SSS N*.x* 216, 218, 220). The commands and read data are received by the MUXes 350 from the storage I/O bus 210. The MUXes 350 also direct status messages to the storage bus controller 348.

In some embodiments, the storage bus controller 348 includes a mapping module 424. The mapping module 424 maps a logical address of a storage unit (e.g., erase block or page) to one or more physical storage units on the solid-state storage media 110. For example, a solid-state storage 110 with an array of twenty storage elements (e.g., SSS 0.0 to SSS 0.M 216) per logical storage element 215 may have a logical address for a particular logical storage unit mapped to twenty respective physical storage units, one physical address per storage element in the logical storage element 215. Because the storage elements are accessed in parallel (and are included in the same logical storage element 215), storage units at the same position in each storage element in a column of storage elements 216*a*, 218*a*, 220*a* may share a physical address. To select one physical storage unit (e.g., in storage element SSS 0.0 216*a*) instead of all physical storage units in the column (e.g. in storage elements SSS 0.0, 1.0, . . . N.0 216*a*, 218*a*, 220*a*), one bank (in this case Bank-0 214*a*) is selected.

In some embodiments, this logical-to-physical mapping for storage units is used to manage OOS conditions. As described above, certain physical storage units on the solid-state storage elements 216, 218 and/or 220 may be taken out of service. If a physical storage unit that is part of a logical storage unit is taken out of service, the entire logical storage unit may also be taken out of service, resulting in losses to storage capacity and/or performance.

The logical-to-physical mapping of storage units may be used to mitigate the loss of an entire logical storage division when one of the constituent storage units is taken out of service. In some embodiments, the mapping 424 and remapping modules 430 are used to map replacement physical storage units into a logical storage unit. This remapping mitigates the loss of losing an entire logical storage unit when a few its constituent storage units are out of service. The remapping module 430 changes a mapping of a logical address to physical storage unit (e.g., erase block) to one or more physical addresses of a logical storage division (spread over the array of storage elements 216, 218, and/or 220).

For example, a logical erase block 1 (not shown) may be mapped to physical erase block 1 of storage element SSS 0.0 216*a*, to physical erase block 1 of storage element SSS 0.1 216*b*, . . . , and to storage element 0.M 216*m*, another logical erase block 2 (not shown) may be mapped to physical erase block 2 of storage element SSS 1.0 218*a*, to physical erase block 2 of storage element SSS 1.1 218*b*, . . . , and to storage element 1.M 218*m*, etc. Alternatively, logical erase block 1 may be mapped to one physical erase block from each storage element in an array such that logical erase block 1 includes physical erase block 1 of storage element SSS 0.0 216*a* and erase block 1 of storage element SSS 0.1 216*b* to storage element 0.M 216*m*, and erase block 1 of storage element SSS 1.0 218*a* to erase block 1 of storage element SSS 1.1 218*b*, . . . , and to storage element 1.M 218*m*, for each storage element in the array up to erase block 1 of storage element N.M 220*m*.

If erase block 1 of a storage element SSS 0.0 216*a* is taken out of service, the remapping module 430 may change the logical-to-physical mapping for the logical address that pointed to physical erase block 1 of logical erase block 1. If a spare physical erase block (e.g., referred to as "reserved erase block," not shown) of storage element SSS 0.0 216*a* is available and currently not mapped, the remapping module 430 may change the mapping of logical erase block 1 to point to the reserved erase block of storage element SSS 0.0 216*a*, while continuing to point to physical erase block 1 of storage element SSS 0.1 216*b*, physical erase block 1 of storage element SSS 0.2 (not shown) . . . , and to storage element 0.M 216*m*. The mapping module 424 or remapping module 430 may map erase blocks in a prescribed order (logical erase block 1 to erase block 1 of the storage elements, logical erase block 2 to erase block 2 of the storage elements, etc.) or may map erase blocks of the storage elements 216, 218, 220 in another order based on some other criteria.

In some embodiments, OOS conditions may be handled using data padding. For example, storage divisions that have been taken out of service may be tracked and masked by inserting "padding data" on the storage I/O bus 210. The padding data is inserted such that it maps to the OOS physical storage units in the logical storage unit. This approach may simplify logical storage element addressing since the same address is used by each element in the logical storage element.

In some embodiments, a hybrid OOS approach may be employed. The padding approach described above may be used in logical storage divisions comprising a relatively small number of OOS storage divisions. As the number of storage divisions increases, the OOS approach for the logical storage division may transition to remapping.

In one embodiment, the erase blocks could be grouped by access time. Grouping by access time, meaning time to execute a command, such as programming (writing) data into pages of specific erase blocks, can level command completion so that a command executed across the erase blocks of a logical erase block is not limited by the slowest erase block. In other embodiments, the erase blocks may be grouped by wear level, health, etc. One of skill in the art will recognize other factors to consider when mapping or remapping erase blocks.

In one embodiment, the storage bus controller 348 includes a status capture module 426 that receives status messages from the solid-state storage 110 and sends the status messages to the status MUX 422. In another embodiment, when the solid-state storage 110 is flash memory, the storage bus controller 348 includes a NAND bus controller 428. The NAND bus controller 428 directs commands from the read and write data pipelines 106, 108 to the correct location in the solid-state storage 110, coordinates timing of command execution based on characteristics of the flash memory, etc. If the solid-state storage 110 is another solid-state storage type, the NAND bus controller 428 would be replaced by a bus controller specific to the storage type. One of skill in the art will recognize other functions of a NAND bus controller 428.

As described above in connection with FIG. 3, the solid-state storage device controller 104 is coupled in parallel to a plurality of solid-state storage elements or die through the storage I/O bus 210. The solid-state storage elements that are accessible in parallel are referred to as a logical storage element. Storage operations, such as program operations, read operations, and so on, may be performed on a logical storage element basis: a read operation performed via the storage I/O bus 210 may read a storage unit (e.g., page) from each solid-state storage element in a logical storage element; a program operation may program a storage unit (e.g., page) on each solid-state storage element in a logical storage element; an erase operation may erase a storage division on each solid-state storage element in a logical storage element; and so on. Accordingly, a program operation may comprise the write data pipeline 106 streaming data packets to program buffers of solid-state storage elements in a logical storage element (via the storage I/O bus 210) and, when the respective program buffers are sufficiently full, issuing a program command to program the data into a logical storage unit. The program command may cause one or more storage units on each of the storage elements in the logical storage element to be programmed in parallel.

Figure 5A:
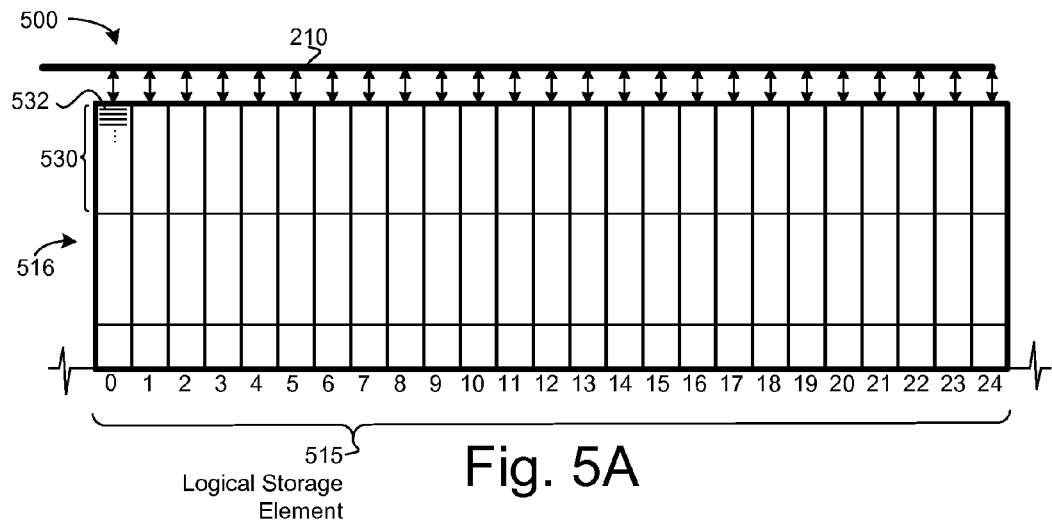
FIG. 5A is a block diagram depicting one embodiment of an adaptive logical storage element.

FIG. 5A is a block diagram of one embodiment 500 of a set of solid-state storage elements 516 accessible in parallel, forming a logical storage element 515. The FIG. 5A example includes twenty-five (25) solid-state storage elements (or die) 516 connected in parallel to the storage I/O bus 210. The storage I/O bus 210 may be coupled to a controller, such as the solid-state storage controller 104 of FIGS. 1, 2, and/or 3. The solid-state storage elements 516 comprise respective physical storage divisions 530 (e.g., erase blocks), each comprising a plurality of physical pages 532. However, the disclosure could be adapted to use different solid-state storage media comprising different media partitioning schemes and, as such, should not be read as limited in this regard.

As discussed above, the storage I/O bus 210 connecting the solid-state storage elements 516 in parallel allows the elements 516 to form a logical storage element 515. Storage operations performed on the logical storage element 515 (via the storage I/O bus 210) may be performed on each of the constituent solid-state storage elements 516 in parallel, as described above. When data is read and/or written to a logical storage unit on the logical storage element 515, it is read and/or written to a plurality of the constituent physical storage elements 516.

Figure 5B:
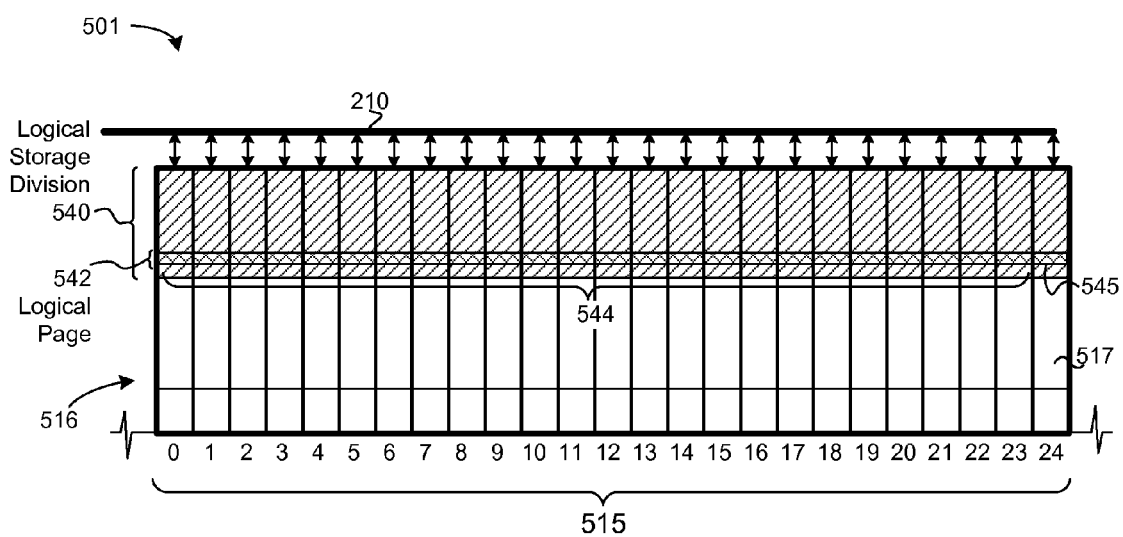
FIG. 5B is a block diagram depicting a logical storage element comprising a logical storage division and logical storage units.

FIG. 5B is a block diagram 501 that depicts the logical storage element 515 formed from the twenty-five (25) solid-state storage elements 516 in additional detail. The logical storage element 515 is formed by treating the separate solid-state storage elements 516 (numbered 0-24) as a single, logical storage element 515. This abstraction is enabled by, inter alia, the storage I/O bus 210 connecting the constituent solid-state storage elements 516 in parallel to a solid-state storage controller (not shown).

In the FIG. 5B example, the logical storage element 515 may be partitioned into logical storage units, such as logical storage divisions 540 and/or logical pages 542. Each logical storage division 540 may comprise a physical storage division of the constituent solid-state storage elements 516; the logical storage divisions 540 may span the solid-state storage elements 516 "0" through "24." Accordingly, the logical storage divisions 540 may each comprise twenty-five (25) physical storage divisions, one from each physical storage element 516 in the logical storage element 515. Each logical storage division 540 may comprise a plurality of logical storage units 542 (e.g., logical pages).

Storage operations performed on the logical storage element 515 may operate across the constituent solid-state storage elements 516: an operation to read a logical storage unit 542 comprises reading from twenty-five (25) physical storage units (e.g., one storage unit per solid-state storage element 516); an operation to program a logical storage unit 542 comprises programming twenty-five (25) physical storage units (e.g., pages); an operation to erase a logical storage division 540 comprises erasing twenty-five physical storage divisions (e.g., erase blocks); and so on. Accordingly, the effective read/write bandwidth of the logical storage element 515 may be proportional to the number of solid-state storage elements 516 included therein.

Arranging solid-state storage elements 516 into logical storage elements 515 may be used to address certain properties of the solid-state storage media. For example, the solid-state storage media may be asymmetric; it may take ten times as long to program data on a solid-state storage element 516 as it takes to read data from the solid-state storage element 516. Moreover, in some cases, data may only be programmed to physical storage divisions 530 that have first been initialized (e.g., erased). An erase operation may take ten times as long as a program operation (and by extension one hundred times as long as a read operation).

The arrangement of the solid-state storage elements 516 into logical storage elements 515 (and/or interleaved banks as described above), may allow a solid-state storage controller (e.g., controller 104) to address the asymmetric properties of the solid-state storage media. In some embodiments, the asymmetry in read, program, and/or erase operations is addressed by performing these operations on many elements in parallel (e.g., on a logical storage element 515). In the FIG. 5B example, programming asymmetry may be addressed by programming twenty-five (25) storage units in a logical storage unit 542 in parallel. Performing multiple program operations in parallel may increase the effective write or programming bandwidth of the storage device. The effective program bandwidth of the logical storage element depicted in FIGS. 5A and 5B may be as much as twenty-five times that of the program bandwidth of the same twenty-five (25) solid-state storage elements 516 in serial. The increase to programming bandwidth (along with the interleaving described above) may be used to "mask" the asymmetry between write/program and read operations. Like programming operations, erase operations may be performed on a logical storage division 540 basis. Physical storage divisions 530 may be erased by logical storage division 540, such that, in the FIG. 5B example, erase operations on logical storage divisions 540 occur on twenty-five (25) storage divisions in parallel. Like the logical programming operations described above, implementing erase operations on logical storage divisions (in parallel) may allow the asymmetry between erase, program, and read operations to be "hidden."

In some embodiments, a certain portion of a logical storage unit of the location storage element 515 may be configured to store error detection and/or recovery data. For example, the logical storage element 515 may support an operational mode in which one of the storage elements 516 (denoted 517 in FIG. 5B) is used to store parity data. In this operational mode, the "logical capacity" of the logical storage units 542 is reduced by one physical storage unit (e.g., reduced from 25 physical pages to 24 physical pages); the first twenty-four (24) physical storage units 544 are used to store data, and physical storage unit 545 is dedicated to storing parity. As used herein, the "logical capacity" of a storage unit refers to the number of storage units or divisions that are available to store data and/or the total amount of data that can be stored on a logical storage unit. The operational mode described above may be referred to as a "24+1" configuration, denoting that twenty-four (24) physical storage units are available to store data, and one (1) of the physical storage units is used for parity. One of skill in the art would recognize that a logical storage element 515 could be configured to operate in any number of operational modes, in which any proportion of the storage elements 516 are used to store error detection and/or recovery data, and as such, the disclosure should not be read as limited in this regard.

In some embodiments, error detection and/or recovery data (such as parity data) stored on the logical storage element 515 may be used to identify and correct data errors. Examples of apparatus, systems, and methods for detecting data errors are disclosed in United States Patent Application Publication No. 2009/0287956 (Ser. No. 12/467,914), entitled "Apparatus, System, and Method for Detecting and Replacing a Failed Data Storage," filed May 18, 2009, which is hereby incorporated by reference in its entirety.

As discussed above, a physical storage unit of a solid-state storage element 516 may be taken out of service (OOS) due to, inter alia, unacceptably high error rates, timing issues, loss of communication, performance considerations, wear leveling, or the like. Taking a physical solid-state storage unit out of service may affect the storage capacity and effective read/write bandwidth of the logical storage element of which the OOS physical storage unit is a part.

Figure 5C:
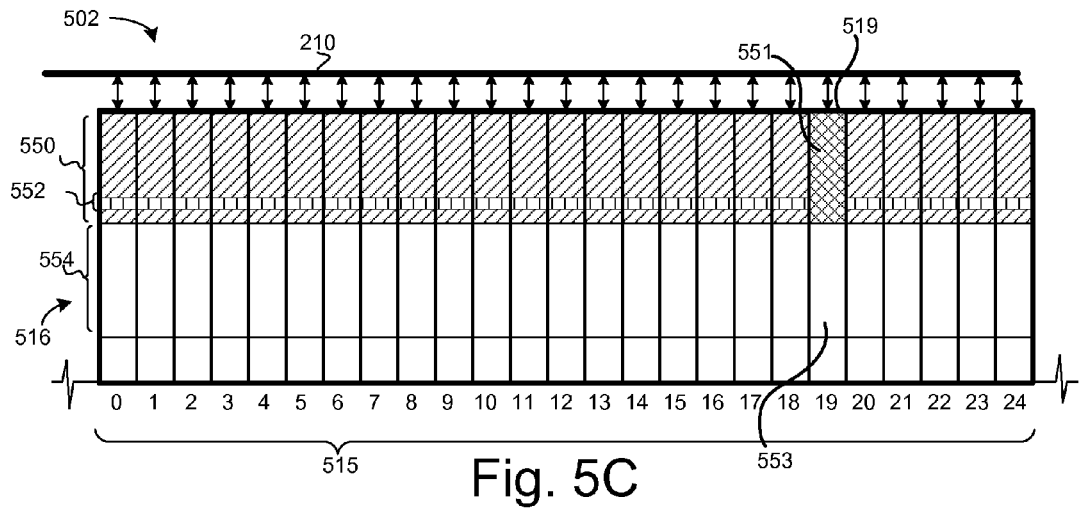
FIG. 5C is a block diagram depicting a logical storage element comprising a storage division that is out of service.

FIG. 5C is a block diagram 502 depicting one example of a logical storage element 515, having a physical storage unit of one of its constituent solid-state storage elements 516 taken out of service. In the FIG. 5C example, the storage division 551 of the solid-state storage element 519 is out of service. Other physical storage units of the solid-state storage element 519 may remain in service; the storage division 553 of storage element 519 remains in service. Taking the storage division 551 out of service affects the logical storage division 550 (logical erase block), as well as its constituent logical storage units 552 (logical pages in the logical erase block 550). However, other logical storage divisions, such as logical storage division 554, which incorporates the in-service physical storage division 553, may be unaffected, and continue to operate normally.

In one embodiment, the loss of the single physical storage division 551 may cause the entire logical storage division 550 to be taken out of service, since the logical storage division 550 can no longer store as much data as it could originally. This is wasteful, however, since in this approach the other, in-service physical storage divisions in the logical erase block 550 would also be removed from use.

Figure 5D:
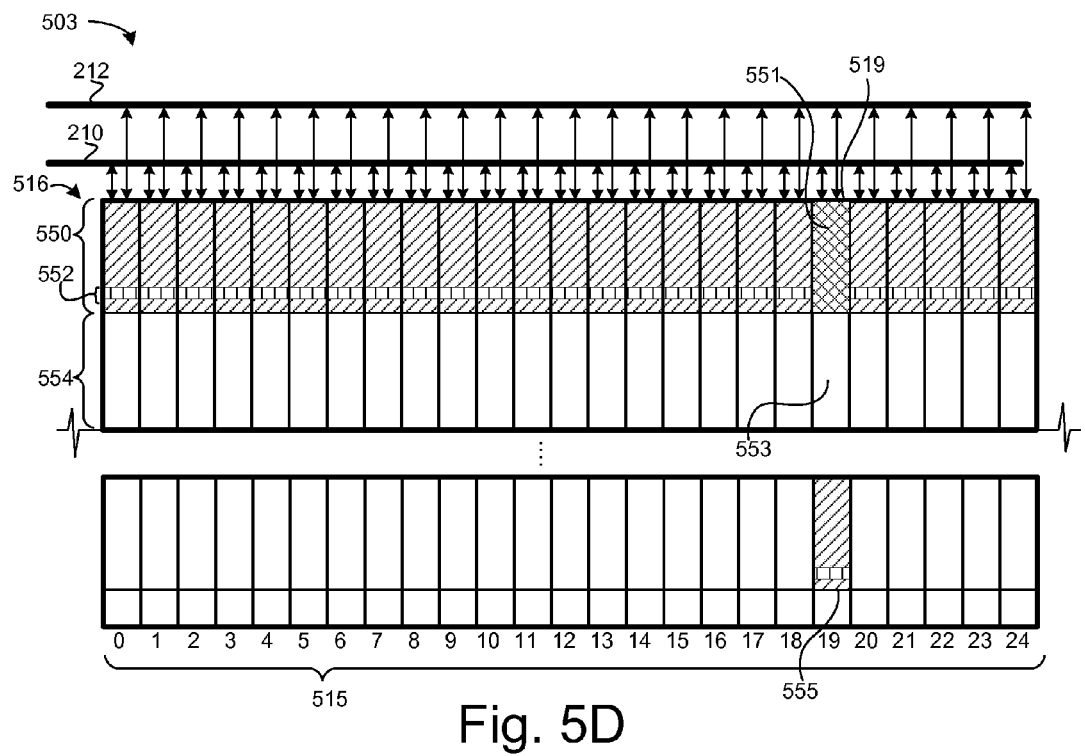
FIG. 5D is a block diagram depicting a logical storage element comprising remapped storage division to replace an out of service storage division.

In some embodiments, the out-of-service condition of the element 519 is managed without taking the entire logical storage division 550 out of service. The out-of-service condition may be managed using a number of different approaches. As described above, in some embodiments, the logical storage unit 550 remains in use by remapping another, in-service physical storage division into the logical storage division 550 to replace the out-of-service storage division 551. An example of this approach is depicted in FIG. 5D. In the FIG. 5D example, the logical storage division 550 remains operational (and may retain its original logical storage capacity) by remapping a replacement physical storage division 555 to take the place of the out-of-service storage division 551. The replacement storage division 555 may be another physical storage division of the solid-state storage element 519. In alternative embodiments, the replacement storage division 555 may be taken from another storage element (e.g., an initially dedicated "spare" solid-state storage element, reserve element, or the like, not shown).

The remapping depicted in FIG. 5D may comprise providing each of the solid-state storage elements 516 in the logical storage element 515 with separate and/or independent addressing information (e.g., via a storage I/O control bus 212 or other communication and/or control mechanism). As shown in FIG. 5D, each of the solid-state storage elements 515 may have an independent, parallel address and/or control connection to the storage I/O control bus 212. This separate and/or independent addressing information is needed since a logical storage division (e.g., storage division 550) may need to re-map replacement storage divisions for any of the storage elements 516. For example, when addressing the logical storage division 550 (that comprises the remapped storage division 555), the addressing information provided to the storage element 519 differs from the addressing information provided to the other storage elements 516. Since this remapping may occur on any of the storage elements 516 in the logical storage element 515, each element 516 may require independent address information. Metadata to track out-of-service storage divisions in the solid-state storage elements 516 and/or to maintain remapping information to replacement storage divisions may be maintained by a solid-state controller, driver software, or the like, as described above.

In some embodiments, out-of-service conditions are managed using an "adaptive logical storage element" approach. In this approach, each solid-state storage element 516 may be provided with the same addressing information, regardless of whether storage divisions within the logical storage element 515 have been taken out of service. Out-of-service conditions are managed by dynamically adapting the logical capacity of the logical storage element to mask OOS physical storage units. This approach may avoid wasting in-service storage divisions in a given logical storage division that includes one or more out-of-service elements, while obviating the need for complex addressing and/or remapping schemes.

Figure 5E:
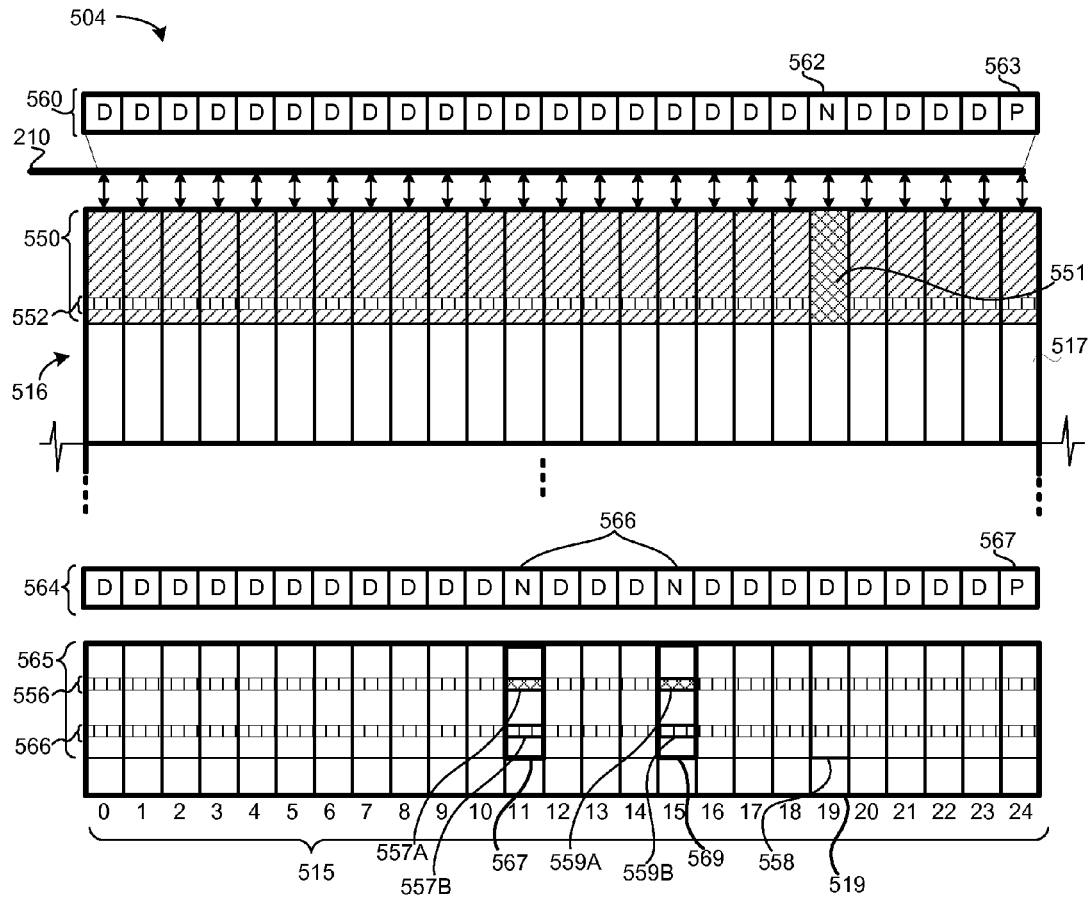
FIG. 5E is a block diagram depicting adaptive logical storage divisions in an adaptive logical storage element.

FIG. 5E is a block diagram 504 illustrating a system and/or method for managing out-of-service conditions using an adaptive logical storage element. In the FIG. 5E example, the storage division 551 of the logical storage division 550 has been taken out of service. Accordingly, the storage division 551 is not available to store data for the logical storage division 550. However, rather than remapping a replacement storage division (not shown) into the logical storage division 550 (which may comprise providing each of the storage elements 516 with separate, independent addressing information), the logical storage division 550 is adapted to "work around" the out-of-service division 551. In the adaptive approach, the logical storage capacity of the logical storage division 550 (and effective read, program, and/or erase bandwidth) is reduced in proportion to the number of out-of-service storage divisions therein.

In the FIG. 5E example, the entire storage division 551 of the solid-state storage element 519 is out of service, and all of the other storage divisions of the other solid-state storage elements 516 are in service. As such, the logical storage capacity of the logical storage division 550 is reduced by a single physical storage unit (e.g., page) for all logical storage units 552 (logical pages) in the logical storage division 550. In other embodiments, the entire physical storage division 551 may not be taken out of service; rather, only a subset of the physical storage units (pages) of the storage division 551 may be out of service. As described in greater detail below, the logical storage capacity of some of the logical storage units 552 may be unaffected, whereas the logical storage capacity of other logical storage units 552 that incorporate the OOS physical storage units of the solid-state storage element 519 are reduced.

Since no remapping is needed, each of the solid-state storage elements 516 may be provided with the same addressing information. Accordingly, separate independent addressing for each of the solid-state storage units 516 may not be required. Accordingly, the solid-state storage elements 516 in the logical storage unit 515 may share the same addressing information (e.g., via a shared address and/or control bus not shown).

The out-of-service portions of the logical storage division 550 are not used in storage operations. In some embodiments, the solid-state storage controller (not shown) may configure the data and/or storage commands directed to the logical storage division 550 to "work around" the out-of-service storage division 551. For example, when programming data to logical storage unit 552 in the logical storage division 550, the OOS physical storage units may be masked. In some embodiments, masking comprises mapping "padding data" to the OOS physical storage units within the storage division 551. When data is read from logical storage units of the logical storage division 550, data corresponding to the OOS physical storage units is removed. By masking the OOS storage units, the logical storage unit 552 may remain in service with reduced capacity despite the out-of-service storage division 551 (and its constituent storage units).

Masking may further comprise modifying one or more commands sent to the OOS storage units. For example, when programming data to the logical storage division 550, the solid-state storage controller may issue a programming command to storage elements comprising in-service physical storage units, and may issue a NOOP (or other command) to the storage element 519. In certain embodiments, the solid-state storage controller issues a non-program storage element command to the storage element 519 when programming data to the logical storage division 550. The non-program storage element command may be a command that causes the storage element 519 to perform low latency, non-stressful operation, such as "report status," "read," "reset," or the like. In this manner, the programming of the logical storage division 550 does not add additional operational stress to the storage element 519 that has the out-of-service storage division 551. In addition, the programming of the logical storage division 550 may not issue a program command to the storage element 519 that has the out-of-service storage division 551. Data read from the out-of-service storage division 551 and any padding data inserted that is to be programmed to the out-of-service storage division 551 is ignored, but serves to position other data of a write operation to be programmed on in-service physical storage units.

As discussed above, a solid-state storage controller (or other entity) may monitor the operation of the storage elements 515. The monitoring may comprise evaluating the status of the storage elements 515 following storage operations, such as programming commands, read commands, erase commands, and the like. In certain embodiments, storage elements that are out-of-service have been taken out of service because they do not perform reliably and/or may exhibit failures. Consequently, storage elements that are out-of-service generally will respond to storage operations with an error signal, may not respond, or may respond with an undefined signal. Therefore, in some embodiments, the status of storage elements that are out-of-service may be ignored. The monitoring may further comprise waiting for an acknowledgement (e.g., return code) from one or more of the storage elements 515 and ignoring (not waiting) for an acknowledgement from storage elements comprising the out-of-service storage units (e.g., physical storage unit 519).

In some embodiments, OOS conditions are managed by adaptively masking, or otherwise ignoring, OOS physical storage units. Masking may comprise a solid-state storage controller (or other entity) configuring data 560 provided to the storage elements 516 on the storage I/O bus 210 such that valid data is provided to in-service portions of the logical storage element 515, and padding data 562 is provided to out-of-service portions. FIG. 5E shows data 560 to be programmed on the logical storage unit 552 of logical storage division 550. The data 560 maps valid data ("D") to storage elements comprising in-service storage units, and padding data ("N") 562 to the storage element 519 that comprises the OOS physical storage division 551. The data 560 includes parity data "P" 563 positioned on bus 210 such that the parity data 563 is sent to the storage element 517.

Data programmed to and/or read from the logical storage element 515 may be adapted according to the out-of-service conditions of the logical storage element 515. The out-of-service status may vary from logical storage division to logical storage division. For example, a first logical storage division (e.g., storage division 550) may comprise one (1) out-of-service storage division 551, whereas all of the storage divisions of another logical storage division may be in-service. Other logical storage divisions of the logical storage element 515 may have different sets of OOS physical storage divisions.

A solid-state controller (or other entity) may maintain out-of-service metadata (OOS metadata) that tracks the out-of-service status of each logical storage division of the logical storage element 515. The OOS metadata may comprise an entry describing the out-of-service status of physical storage divisions of the logical storage division 550, which indicates that the storage division 551 (of storage element 519) is out-of-service. Other OOS metadata entries may track the out-of-service status of other logical storage divisions in the logical storage element 515.

For example, FIG. 5E shows another logical storage division 565, in which the physical storage division 558 of storage element 519 is in service. The OOS metadata may indicate that, for the logical storage division 565, the storage element 519 comprises in-service storage units. The controller may adapt the storage operations in accordance with the OOS metadata. As illustrated in FIG. 5E, the data 564 masks OOS physical storage units 567 and 569 (with padding data 566), and provides valid data to element 519. The padding data 566 positions the data to be stored on in-service storage units and avoiding use of out-of-service storage units.

In some embodiments, the OOS metadata may track the out-of-service conditions at different levels of granularity; for example, the OOS metadata may track the OOS status of individual storage units (pages) of the logical storage element 515. Such finer-grained OOS metadata may allow for a more efficient use of the logical storage element 515, but may impose a heavier metadata overhead on the controller (or other entity) that maintains the OOS metadata and/or configures the data to be programmed to and/or read from the logical storage element 515. Different embodiments may shift the impacts of efficient use of storage capacity versus metadata overhead. For example, OOS metadata may be tracked by storage unit, storage division, page, erase block, die, plane, chip, or any other suitable level of granularity (or combination of different levels of granularity).

The logical storage division 565 of the logical storage element 515 may comprise two out-of-service physical storage units 557A and 559A on respective physical storage divisions 567 and 569. Data 564 to be programmed on the logical storage unit 556 may be configured to provide padding data 566 to the elements 516 comprising the OOS storage units 557A and 559A. As described above, the physical storage division 558 of the solid-state storage element 519 is in-service and, as such, the data 564 provides valid data "D" to the storage element 519.

OOS metadata may be maintained at different levels of granularity. In some embodiments, OOS metadata may track out-of-service conditions at a "storage division" (e.g., erase block) level of granularity. In this case, when one or more storage units (e.g., pages) of a storage division are out of service, the entire physical storage division may be marked out of service in the OOS metadata (even though other storage units in the storage division are still usable). However, if OOS metadata is maintained at a finer level of granularity (e.g., at "storage unit" or page granularity), only the specific OOS storage units are marked as out-of-service, and the other, in-service storage units may continue to be used. In other examples, the OOS metadata may track out-of-service conditions at a die granularity, chip granularity, plane granularity, or the like.

In the FIG. 5E example, the physical storage divisions 567 and 569 comprise out-of-service storage units 557A and 559A, which may be masked by providing padding data 566 to the elements 11 and 15 comprising the out-of-service units 557A and 559A. When "storage division" granularity OOS metadata is used, all of the physical storage units in the physical storage divisions 567 and 569 may be marked as out of service, regardless of whether the other physical storage units are still in service. Accordingly, other logical storage units within the logical storage division 565 (e.g., logical page 566) may treat all of the physical storage units in the physical storage divisions 567 and 569 as out-of-service. For example, the logical page 566 may treat the storage units 557B and 559B as out-of-service (and provide padding data thereto) even though the storage units 557B and 559B are still usable. Such a behavior may serve as a proactive step in protecting data from loss if storage units 557B and 559B were to continue to be used.

In embodiments in which the OOS metadata is maintained at a finer level of granularity (e.g., at the storage unit level of granularity), the in-service storage units 557B and 559B may continue to be used. Therefore, although the storage units 557A and 559A are marked as out of service, the OOS metadata may indicate that other, in-service storage units (e.g., storage units 557B and 559B) are still usable. Therefore, the logical storage unit 566 may use the in-service storage units 557B and 559B on the storage divisions 567 and 569 even though the storage divisions 567 and 569 comprise out-of-service storage units 557A and 559A. Data to be programmed on the logical storage unit 566 may, therefore, provide valid data "D" to the storage units 11 and 15 rather than padding data "N."

As discussed above, in some embodiments, one or more of the storage elements 516 in the logical storage element 515 may be used to store error detection and/or recovery data (e.g., parity data). In the FIG. 5E example, the storage element 517 stores parity data for the logical storage element 515.

Figure 5F:
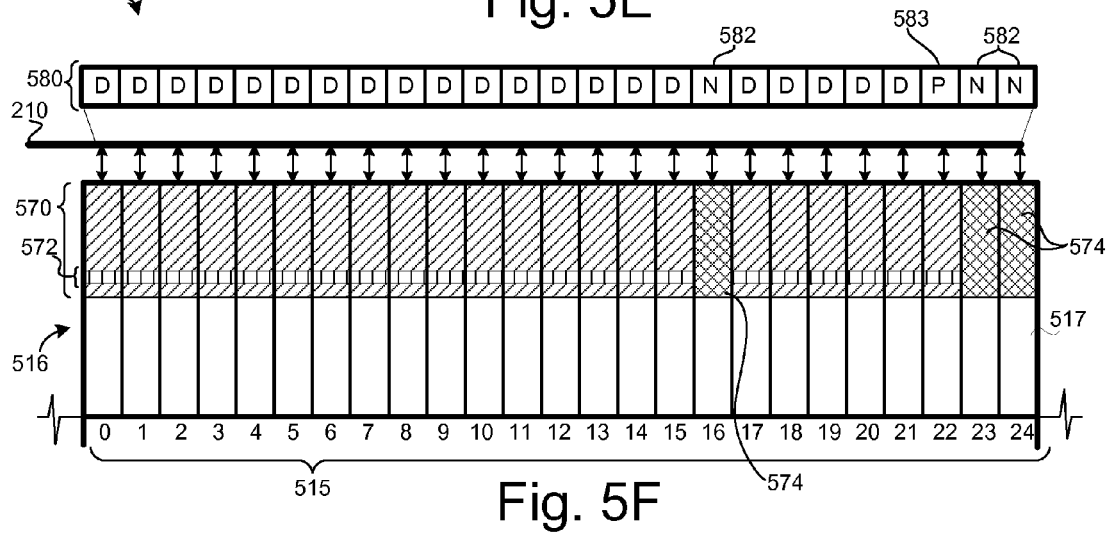
FIG. 5F is a block diagram depicting an adaptive logical storage division in an adaptive logical storage element.

The storage element 517 and/or portions thereof may be taken out of service. When this occurs, the parity data 563 or 567 may be stored on another one of the in-service storage elements. FIG. 5F is a block diagram 505 depicting an example of a logical storage element 515 having a logical storage division 570 that comprises three (3) OOS storage divisions 574. The OOS storage divisions 574 may be masked, as described above; data 580 to be programmed on a logical storage unit 572 of the logical storage division 570 is configured to provide padding data 582 to the solid-state storage elements comprising OOS storage divisions 574 (elements 16, 23, and 24). The data 580 is further configured to provide parity data 583 to an in-service storage division in the logical storage division 570 (element 22 in FIG. 5F). The remaining in-service storage divisions receive valid data "D." In some embodiments, the parity data may be stored in the "highest" or "rightmost," in-service storage element 516 in the logical storage division. This pre-determined arrangement may allow a parity module (or other error correction and/or detection module) to identify the parity data when data is read from the logical storage element. Alternatively, parity data 583 may be placed within any of the in-service storage elements in the logical storage element 515.

As described above, as physical storage units are taken out of service, the logical storage capacity and effective read, write, and/or erase bandwidth of the logical storage element 515 is affected (in proportion to the number of out-of-service storage units). For example, a logical storage unit comprising twenty-five (25) storage units, of which thirteen (13) are out-of-service, retains less than half of its original logical storage capacity and provides less than half of its original effective bandwidth. In some embodiments, when the number of out-of-service storage units in a logical storage unit exceeds an out-of-service threshold (OOS threshold), the logical storage capacity and/or bandwidth of the logical storage unit may degrade to a point that it is no longer feasible to continue keeping the logical unit in service. The OOS threshold may be selected according to testing and/or experience. In some embodiments, the OOS threshold is adapted according to the needs of a user. A higher OOS threshold may be used if storage capacity is more important to the user than performance, whereas a low OOS threshold may be biased towards performance.

In some embodiments, when the number of out-of-service storage units in a logical storage unit reaches the OOS threshold, the entire logical storage unit is taken out of service. Alternatively, or in addition, when the OOS threshold is reached, a hybrid mechanism for managing out-of-service conditions may be employed that combines the adaptive logical storage element and re-mapping approaches described above.

Figure 5G:
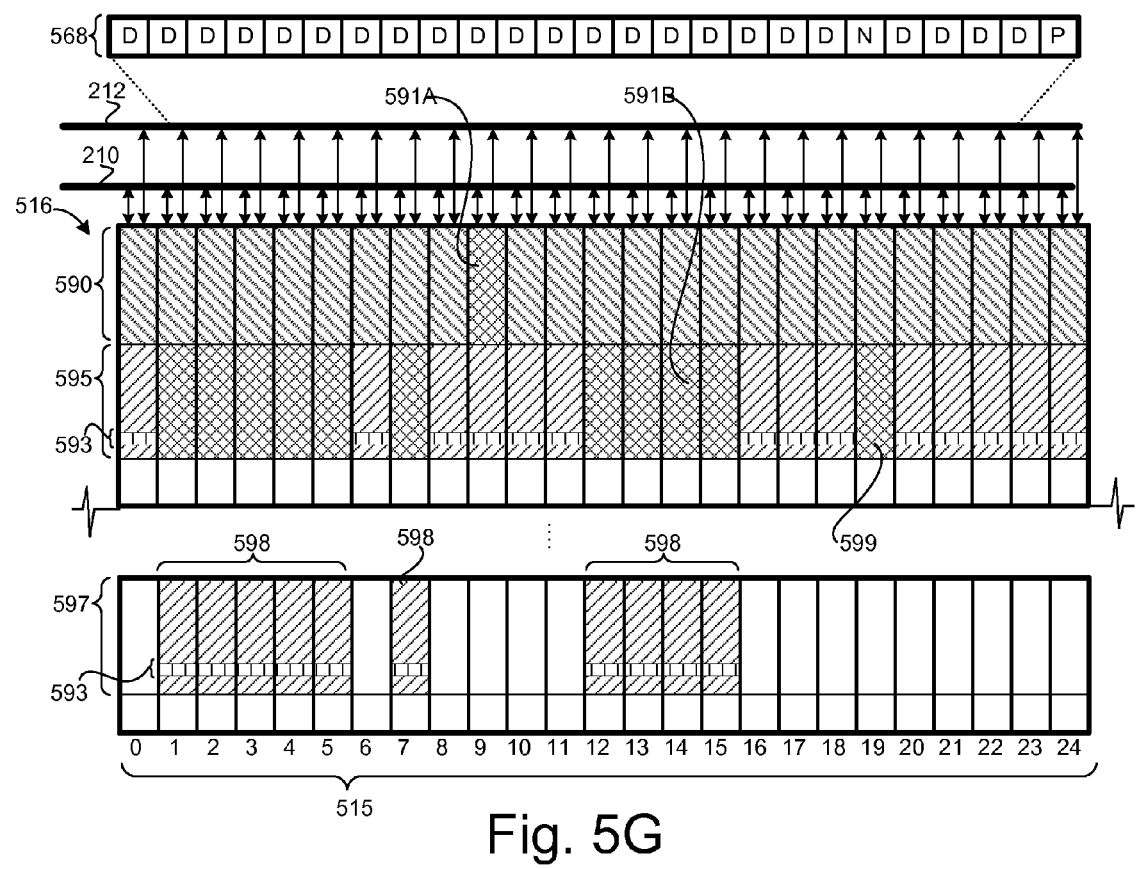
FIG. 5G is a block diagram depicting a hybrid mechanism for managing out-of-service storage units in a logical storage element.

FIG. 5G depicts exemplary hybrid approaches for managing OOS conditions in a logical storage element 515 and, in particular, to managing logical units comprising a large proportion of storage units that are out of service.

In the FIG. 5G example, the logical storage division 590 comprises one (1) out-of-service storage division 591A. Having one (1) out-of-service storage division is less than the OOS threshold and, as such, the logical storage division may continue to operate using the adaptive logical element approach described above. In the adaptive logical element approach, OOS metadata identifies out-of-service storage units in the logical storage division 590. The OOS metadata is used to mask OOS storage unit 591A (e.g., configure padding data on the storage I/O bus 210 such that padding data is provided to the OOS storage unit 591A). The resulting effective read/write bandwidth of the logical storage division 590 may be reduced, however, since data is read/written to twenty-four (24) storage units as opposed to the original twenty-five (25).

When the number of OOS storage units in a logical storage unit exceed the OOS threshold (e.g., as in the logical storage division 595), different approaches for managing OOS service conditions may be used. As described above, when the number of OOS physical storage units of a logical storage unit exceed an OOS threshold, the entire logical storage unit may be taken out of service. Alternatively, OOS conditions may be managed using an alternative approach. For example, the logical storage unit may transition from an adaptive approach to managing OOS conditions to a re-mapping or hybrid approach.

In a remapping approach, replacement physical storage divisions (e.g., storage divisions 598) are mapped into the logical storage division 595 to replace the out-of-service physical storage divisions 591B. The replacement storage divisions 598 may all be taken from the same logical storage division (e.g., storage division 597 as shown in FIG. 5G) or from different logical storage elements (e.g., reserved spare storage elements). As discussed above, the remapping approach may comprise providing each storage element 516 in the logical storage element 515 with separate, independent addressing information (via the storage control bus 212).

If there are insufficient replacement storage divisions 598 available to replace all of the OOS storage divisions 591B, the logical storage unit 595 may operate using a hybrid adaptive/remapping approach. In this approach, the logical storage division 595 maps the available replacement storage divisions 598 to replace the out-of-service storage divisions 591B. Other remaining out-of-service storage divisions (e.g., storage division 599) may be managed using the adaptive masking mechanisms described above (e.g., padding data is mapped to the storage division 599). Accordingly, the storage controller configures data 568 to be programmed to the logical storage unit 593 of the logical storage division 595 to provide valid data to the replacement storage divisions 598 (when possible), and padding data is provided to the storage unit 599 that could not be replaced.

Figure 6:
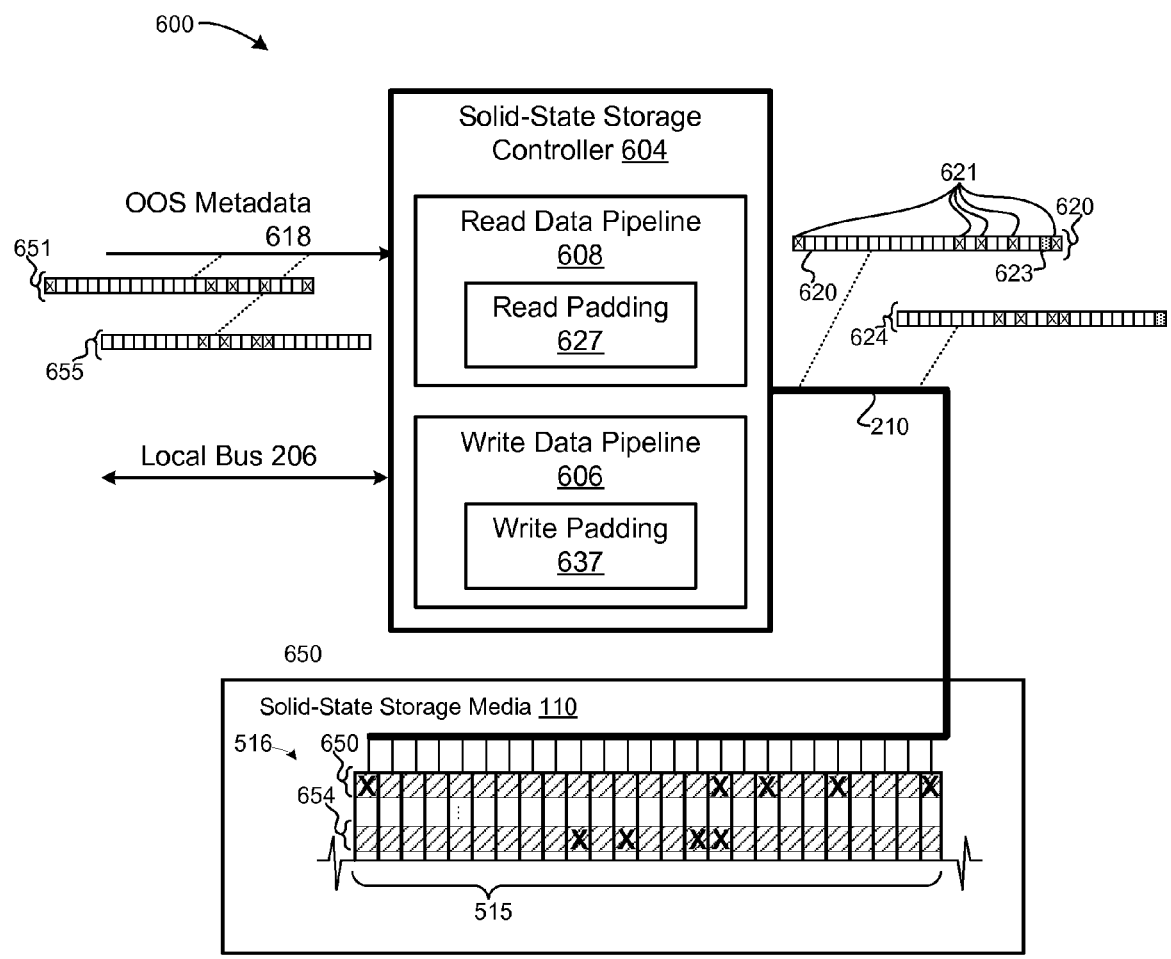
FIG. 6 is a block diagram of an embodiment of a solid-state storage controller configured to manage adaptive logical storage units.

FIG. 6 is a block diagram 600 depicting a solid-state controller configured to manage out-of-service storage units in a logical storage element. In some embodiments, the solid-state controller 604 configures data streamed to the logical storage element 515 via the storage I/O bus 210 to map data to in-service physical storage units and padding data to OOS physical storage units. The solid-state storage controller 604 is communicatively coupled to a local bus 206, which, as described above, may stream data to be stored on the solid-state storage media 110. The local bus 206 may also be used to provide data read from the solid-state storage media 210 to a host and/or client (e.g., the client 114 described above).

The solid-state storage controller 604 accesses OOS metadata 618 that indicates, for a particular logical storage unit, which physical storage units are out-of-service. In some embodiments, the OOS metadata 618 is maintained and/or stored by the solid-state storage controller 604. In other embodiments, the OOS metadata 618 is maintained by another process or controller, such as a client or host (not shown), a driver, or the like. The OOS metadata 618 may track out-of-service conditions within the logical storage element 515 at various levels of granularity. In some embodiments, the OOS metadata 618 comprises entries indicating the out-of-service status of each logical storage division on the logical storage element 515. Each OOS metadata entry may comprise a bitmask (or other type of data structure) indicating which physical storage divisions in a logical storage division are out-of-service. Alternatively, or in addition, the OOS metadata 618 may track out-of-service conditions at a finer granularity; the OOS metadata 618 may include entries to track out-of-service conditions on a per-logical-storage-unit basis (e.g., track individual physical pages for each logical page). In this case, the OOS metadata 618 may indicate, for each logical storage unit on the logical storage element 515, which physical storage units are OOS. The OOS metadata 618 may be implemented as a sparse data structure that only comprises entries that identify OOS storage units and omits entries in which no OOS conditions exist.

The solid-state storage controller 604 uses the OOS metadata 618 to perform storage operations on the logical storage element 515. The write data pipeline 606 accesses the OOS metadata 618 when streaming data to be programmed on a particular logical storage unit of a logical storage element 515. The OOS metadata 618 identifies physical storage units that are out-of-service (if any). In FIG. 6, OOS physical storage units are represented with an "X." The write padding module 637 uses the OOS metadata 618 to configure data 620 sent to the logical storage element 515 on the storage I/O bus 210 in accordance with the OOS metadata 618. The write data padding module 637 configures the data 620 to map padding data (denoted by "X") to out-of-service storage units and to map valid data (including parity data) to in-service storage units. The configuration performed by the write padding module 637 may comprise inserting padding data into the write data pipeline 606 and/or on the storage I/O bus 210 in accordance with the OOS metadata 618.

The read data pipeline 608 uses the OOS metadata 618 when data is read from the logical storage element 515. When data is read from a logical storage unit the read data pipeline 608 accesses the OOS metadata 618 to determine which (if any) of the constituent physical storage units are out-of-service. The read padding module 627 is configured to strip the padding data (if any) from the data.

The OOS metadata 618 may be adapted according to the configuration of the solid-state storage media 110 and/or the logical storage elements 515 defined thereon. For example, the logical storage element 515 of FIG. 6 may include twenty-five (25) solid-state storage elements 516 accessible in parallel via the storage I/O bus 210. Accordingly, the OOS metadata 618 may be capable of indicating the OOS status of each of twenty-five storage units. If out-of-service conditions are maintained at a logical storage division granularity (e.g., erase block granularity), the OOS metadata 618 may comprise an OOS metadata entry for each logical storage division on the logical storage element 515. The OOS metadata 618 pertaining to the logical storage division 650 may comprise a 25-bit bitmask (or other data structure) capable of indicating the status of twenty-five storage units. In the FIG. 6 example, the logical storage division 650 comprises five (5) storage divisions that are OOS, which is reflected in a corresponding OOS metadata entry 651. The OOS metadata entry 651 identifies the logical unit of the out-of-service storage divisions within the logical storage division 650. In some embodiments, the OOS metadata entry 651 may also identify the one or more storage divisions that are to store error detection and/or recovery data (e.g., parity data). Alternatively, and as depicted in FIG. 6, the OOS metadata entry 651 may omit the parity indicator, and the parity data may be identified as the rightmost (or leftmost) in-service storage element. The OOS metadata entry 651 allows the write data pipeline 606 and/or write padding module 637 to configure the data 620 to be stored on logical storage units of the logical storage division 650. The write data pipeline 606 configures the data 620 such that padding data 621 is provided to OOS physical storage units, and valid data and/or parity data is provided to in-service physical storage units. The OOS metadata entry 651 may be accessed by the read data pipeline 608 and/or read padding module 627 when data is read from the logical storage division 650 to identify and/or strip padding data and/or to locate parity data 623.

Other logical storage divisions of the logical storage element 515 may have a different OOS status; as shown in FIG. 6, the logical storage division 654 includes a different set of OOS physical storage units. Accordingly, the OOS metadata 618 contains a respective OOS metadata entry for each logical storage division in the logical storage element 515. The OOS metadata entry 655 corresponding to the logical storage division 654 reflects that a different set of storage divisions are out of service. The write data pipeline 606 (and/or write padding module 637) uses the entry 655 to configure data 624 to be programmed on logical storage division 654 accordingly. The OOS metadata entry 655 may be accessed by the read data pipeline 608 (and/or the read padding module 627) to strip padding data from data read from the logical storage division 654.

As described above, the OOS metadata 618 may track OOS conditions on the logical storage element 515 at different levels of granularity. For example, the OOS metadata 618 may comprise an OOS metadata entry for each logical storage unit (page) on the logical storage element 515. While this approach may result in more efficient use of the logical storage element 515, it may require maintaining a larger number of OOS metadata entries.

The OOS metadata 618 may be adapted to different types of solid-state storage media 110. For example, in some embodiments, the solid-state storage media 110 may operate in a "dual-plane" mode, in which the size of the storage units (e.g., page size) of the storage elements 516 are doubled (by accessing two planes of the solid-state storage media in parallel); each storage element address accesses two (2) pages (one per plane) as opposed to a single page. Consequently, the page size is effectively doubled. The OOS metadata 618 may be adapted accordingly. Since there are twice the number of storage units associated with a particular storage address, the OOS metadata 618 may be adapted to include twice the number of out-of-service indicators (e.g., one indicator for each plane). In the FIG. 6 example, since the logical storage element 515 includes twenty-five (25) storage elements 516 in parallel, the OOS metadata 618 for a dual-plane configuration may comprise fifty (50) indicators (e.g., a bitmask of fifty bits). Although a particular configuration of solid-state storage media 110 and corresponding OOS metadata 618 are described herein, the disclosure is not limited in this regard. The teachings of this disclosure could be adapted to other configurations of the solid-state storage media 110 and/or the logical storage element 515.

As described above, inserting padding data may dynamically change the effective read/write bandwidth between the solid-state storage controller 604 and the logical storage element 515; the change in bandwidth of a logical storage unit may be proportional to the number of out-of-service storage units therein. Accordingly, the effective bandwidth (read, write, erase, etc.) may change from storage unit to storage unit, depending upon out-of-service conditions. For example, a first logical storage unit may comprise a first set of OOS storage units, whereas a second logical storage unit may comprise a second, different set of OOS storage units (as indicated by the OOS metadata 618). The solid-state controller 604 may be capable of storing a first data capacity on the first logical storage unit and a second, different data capacity on the second logical storage unit. The solid-storage controller 604 manages these changes within the logical storage element 515 using the OOS metadata 618.

As described above, the solid-state storage controller 604 (or other entity) may define an OOS threshold. When the number of OOS storage units in a logical storage unit exceeds the OOS threshold, the logical storage unit itself may be taken out of service and/or the mechanism used to manage of the OOS conditions may transition to a remapping approach and/or a hybrid adaptive and remapping approach, as described above.

Figure 7:
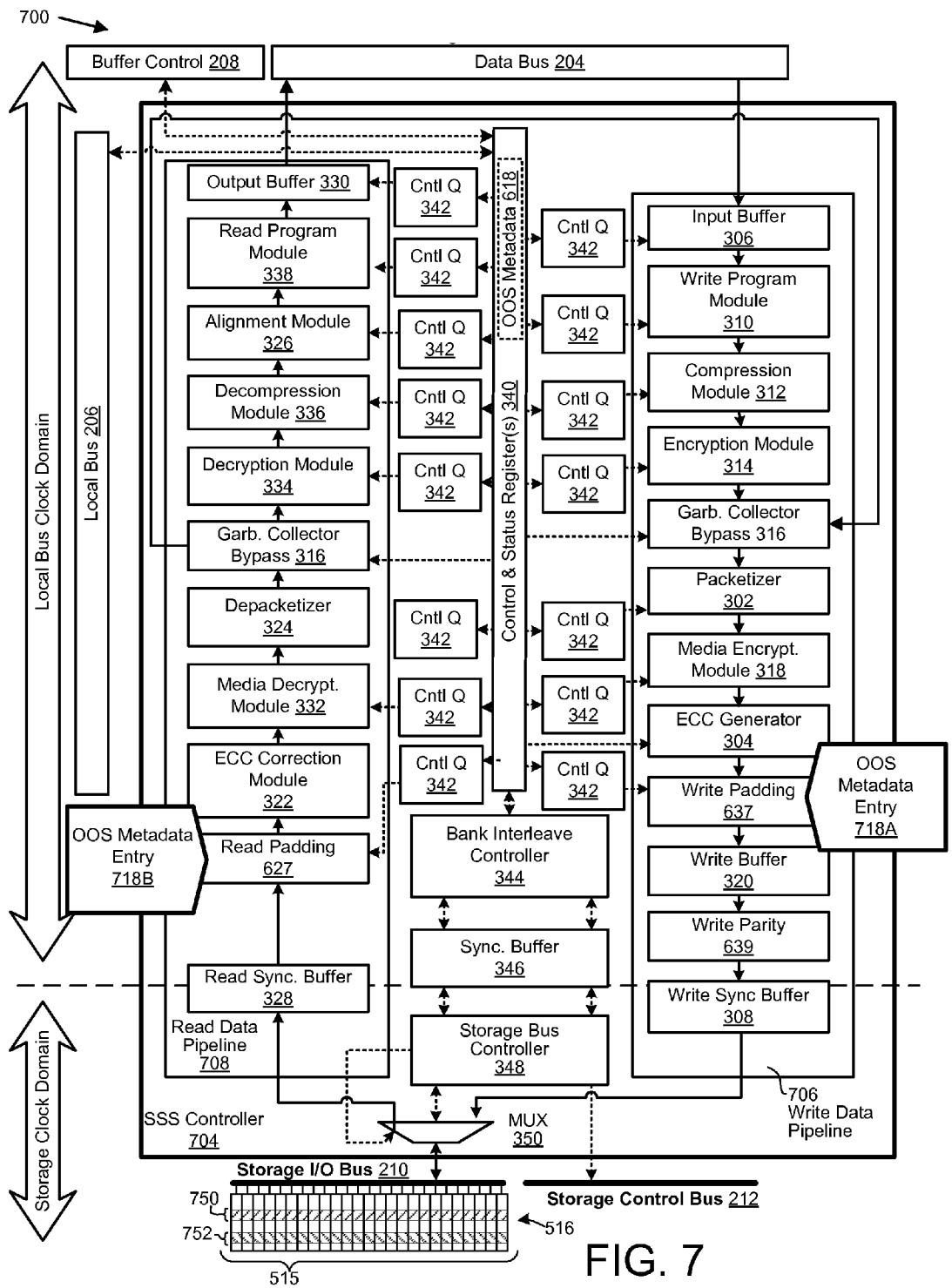
FIG. 7 is a block diagram of another embodiment of a solid-state storage controller configured to manage adaptive logical storage units.

FIG. 7 is a block diagram 700 of one embodiment of a solid-state storage controller adapted to manage OOS conditions in a logical storage element. As described above, the write data pipeline 706 writes data sequentially to a logical storage element 515 using storage I/O bus 210. Each of the storage elements 516 in the logical storage element 515 may be accessible in parallel via the storage I/O bus 210. The elements 516 may receive addressing information and/or storage commands (in parallel) via the storage control bus 212.

In some embodiments, the write data pipeline 706 fills a write buffer 320 with data to be programmed on a logical storage unit (e.g., a logical storage unit 750 or 752) of the logical storage element 515. The logical storage unit 750 may be a logical page comprising a physical page on each solid-state storage element 516 in the logical storage element 515. As discussed above, certain storage units in the logical storage element 515 may be out-of-service. OOS metadata 618 may identify the OOS storage units as described above (e.g., using a bitmap or other data structure).

The OOS metadata 618 may comprise OOS metadata entries to track OOS conditions on the logical storage element 515. The OOS metadata entries may be maintained at various levels of granularity. In some embodiments, the OOS metadata 618 may comprise an entry for each logical storage unit (logical page). Alternatively, or in addition, metadata entries may be maintained on a logical storage division basis (e.g., by logical erase blocks).

When the write data pipeline 706 is to stream data to a logical storage unit (e.g., logical storage unit 750), the write padding module 637 accesses an OOS metadata entry 718A associated therewith. The write padding module 637 may access the OOS metadata entry 718A from an internal metadata storage unit and/or from another metadata provider, such as a client (e.g., client 114), a driver, or the like. The metadata entry 718A may be accessible via the control status registers 340 and/or control queues 342 or via another control channel. The OOS metadata entry 718A of the logical storage unit 750 indicates which (if any) of the storage units in the logical storage unit 750 are out-of-service. Using this metadata entry 718A, the write padding module 637 inserts padding data into the write buffer 320. The padding inserted into the write buffer 320 is configured to direct padding data to the OOS storage units (as indicated by the OOS metadata entry 718A). Accordingly, when the contents of the write buffer 320 are streamed to the logical storage element 515 via the storage I/O bus 210, padding data is provided to storage elements comprising OOS storage units, and valid data (including parity data) is provided to storage elements comprising in-service storage units.

In some embodiments, the write data pipeline 706 includes a write parity module 639 to calculate parity data for a logical storage unit. For example, write data pipeline 706 may store data in a "24+1" configuration, in which one of the twenty-five (25) storage units in the logical storage unit 750 comprises parity data for the other twenty-four (24). However, this disclosure should not be read as limited in this regard, as the teachings of this disclosure could be adapted to any parity configuration. The write parity module 639 calculates parity data for the logical storage unit as the data streams from the write buffer 320 to the storage I/O bus. Padding data inserted into the write buffer 320 by the write padding module 637 may be included in the parity calculation. In one embodiment, the write padding module 637 may configure the padding data such that it does not alter the parity calculation. For example, if the write parity module 639 implements XOR parity, the write padding module 637 may insert "FF" padding data.

The write parity module 639 may also access the OOS metadata entry 718A to determine where to place the parity data on the storage I/O bus 210. As described above, parity data may be placed within a pre-determined storage unit (e.g., in the leftmost, or rightmost storage element in the logical storage element 515). The write parity module 639 may place the parity data in a different location on the storage I/O bus 210 when OOS metadata entry 718A indicates that a "default" storage unit is out-of-service. Alternatively, the parity data may be placed anywhere within the logical storage region.

The read data pipeline 708 may be configured to manage OOS conditions on the logical storage element 515. When data is read from a logical storage unit (e.g., logical storage unit 752), the read padding module 627 accesses a corresponding OOS metadata entry 718B. Like the OOS metadata entry 718A described above, the metadata entry 718B indicates which (if any) storage units in the logical storage unit 752 are out-of-service. The metadata entry 718B may be accessed from a local metadata storage location and/or from the control and status registers 340 or control queues 342. The read padding module 627 may use the OOS metadata entry 718B to remove data corresponding to OOS storage units (if any) in the data read from the logical storage unit 752. The data (with the data corresponding to OOS storage units removed) then flows through other portions of the read data pipeline 708 as described above.

In some embodiments, the read data pipeline 708 includes a read parity module (not shown), which accesses the OOS metadata entry 718B to determine the location of the parity data in the data read from the logical storage unit 752. The read parity module may perform error detection and/or correction using the parity data. In some embodiments, the parity data is used to identify a physical storage unit that should be taken out of service.

Figure 8A:
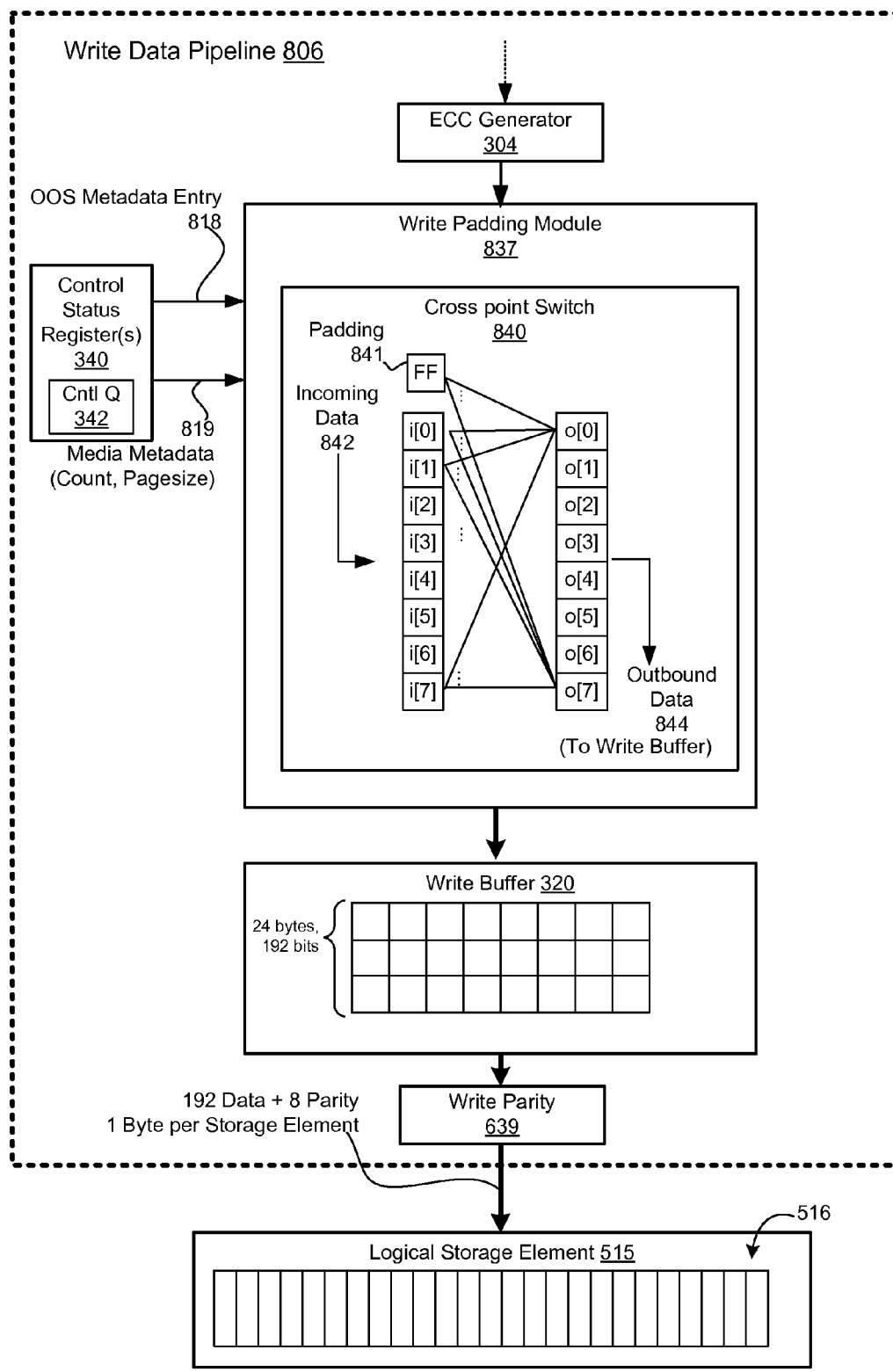
FIG. 8A is a block diagram of one embodiment of a write data pipeline configured to manage adaptive logical storage units.

FIG. 8A is a block diagram of one embodiment of a write data pipeline configured to insert padding data into a write buffer in accordance with an OOS metadata entry. The write padding module 837 uses the OOS metadata entry 818 and/or the media metadata 819 to map incoming data 842 and/or padding data 841 into an outbound data stream 844. As discussed above, the OOS metadata entry 818 (and/or the media metadata 819) may be accessed via control status register(s) 340, control queue 342, or from another source (e.g., internal storage, with the incoming data 842, or the like).

In the FIG. 8A example, the write padding module 837 includes a cross point switch 840 that is configured to map an incoming data stream 842 (data streamed from the ECC generator module 304) and/or padding 841 to an outbound data stream 844 that flows into the write buffer 320. The mappings performed by the cross point switch 840 are determined by the OOS metadata entry 818, which identifies out-of-service storage units in the logical storage unit to which the data is to be programmed. The cross point switch 840 maps padding data 841 ("FF" or "11111111", or alternatively "00" or "00000000") to bytes in the outbound data stream 844 that correspond to OOS storage units. For example, if byte i[0] in the incoming data stream 842 would map to an out-of-service storage unit (as indicated by the OOS metadata entry 818), the cross point switch 840 maps padding data 841 to byte o[0] of the outbound data 844. The incoming data in byte i[0] may be mapped to the next in-service byte in the outbound data stream 844 (e.g., byte o[1]) as indicated by the OOS metadata entry 818. Although FIG. 8A depicts a particular pattern of padding data ("FF") 841, the disclosure is not limited in this regard, and could be adapted to use any suitable masking scheme. For example, the padding data may comprise old data, NOOP data, undefined (floating) data, or the like.

As shown in FIG. 8A, a logical page may comprise multiple rows of 25 storage units, and the write data pipeline 806 (via the write buffer 320) may stream a byte to each storage element 516 in the logical storage element 515 during a given cycle (for a total of 200 bits (25 bytes) per cycle). Each storage element 516 may comprise a respective program buffer capable of holding a storage unit (e.g., page) of data. When the write data pipeline 806 has filled the storage element program buffers, a page program command is issued to cause the storage elements 516 to program the data.

As depicted in FIG. 8A, the write padding module 837 may operate on subsets or "sections" of the data as it is streamed to the logical storage element 515. In the FIG. 8A example, the write padding module 837 operates on 8 byte subsets of the 24 bytes (192 bits) of data streamed, in parallel, to the elements 516 (192 bits of data plus 8 bits of parity, such that each of the twenty-five (25) elements receive a byte per cycle). Accordingly, the write padding module 837 may perform the mapping operation described above three times per cycle. Each iteration of the mapping operation fills 64 bytes of the 192 byte write buffer 320. When the write buffer 320 is filled, the 192 bytes are streamed to the write parity module 639, which computes an additional 8 bytes of parity data. The 200 bits (192 data and 8 parity) are then streamed to the storage elements 516 in the logical storage element 515.

In some embodiments, the write padding module 837 accesses media metadata 819, which may indicate where the write padding module 837 is operating in relation to a logical storage unit or logical erase block. The media metadata 819 may comprise an offset count, a count of remaining capacity, a position indicator, or the like. For example, the media metadata 819 may comprise a "count" or "offset" that indicates the current offset within the current logical erase block (e.g., indicates the relative position within the logical erase block to which the outbound data 844 is streaming). The write padding module 837 may use the media metadata 819 to configure the padding to retain certain data structures within media boundaries of the logical storage element 515. These media boundaries may correspond to logical storage units (e.g., a logical page), logical storage divisions (e.g., logical erase blocks), and/or any other boundary of the logical storage element 515 (e.g., plane boundaries, die boundaries, chip boundaries, etc.). The media metadata 819 may be used to prevent a data structure (e.g., an ECC codeword) from overrunning a media boundary.

In some embodiments, the ECC generator 304 generates ECC "chunks" (e.g., ECC codewords), which in certain embodiments do not cross certain media boundaries (e.g., logical erase block boundaries); ECC codewords may preferably be stored on the same logical storage unit (e.g., a single logical page) and/or on the same logical storage division (e.g., on the same logical erase block). Since the storage capacity of logical storage units may vary dynamically as storage units are taken out-of-service, it may be difficult to determine, a priori, how a particular ECC codeword will lay out on the logical storage element 515. Therefore, in some embodiments, the write padding module 837 accesses (or maintains) media metadata 819 to determine whether the remaining capacity on the logical storage unit (and/or logical storage division) can accommodate the next ECC codeword (or other data structure) to be streamed into the write buffer 320. When the write padding module 837 determines the remaining capacity is insufficient, the write padding module 837 fills the remainder of the write buffer 320 (outbound data 844) and/or logical page with padding data 841. Logical pages may be boundary aligned with the media boundary such as an erase block boundary. Consequently, filling the remainder of the last logical page of a logical erase block also fills out the logical erase block. Alternatively, the write padding module 837 may stream replacement data. For example, if a next ECC codeword will not fit, but another data structure will (e.g., a persistent note or the like), the write padding module 837 streams the alternative data structure in place of the ECC codeword. Once the current logical storage unit (e.g., page or erase block) is programmed (and a next logical storage is available), the write padding module 837 may resume operation as described above. Although FIG. 8A describes an ECC codeword data structure, the disclosure is not limited in this regard; the disclosed embodiments could be adapted to prevent any type and/or size of data structure from overrunning media boundaries.

Figure 8B:
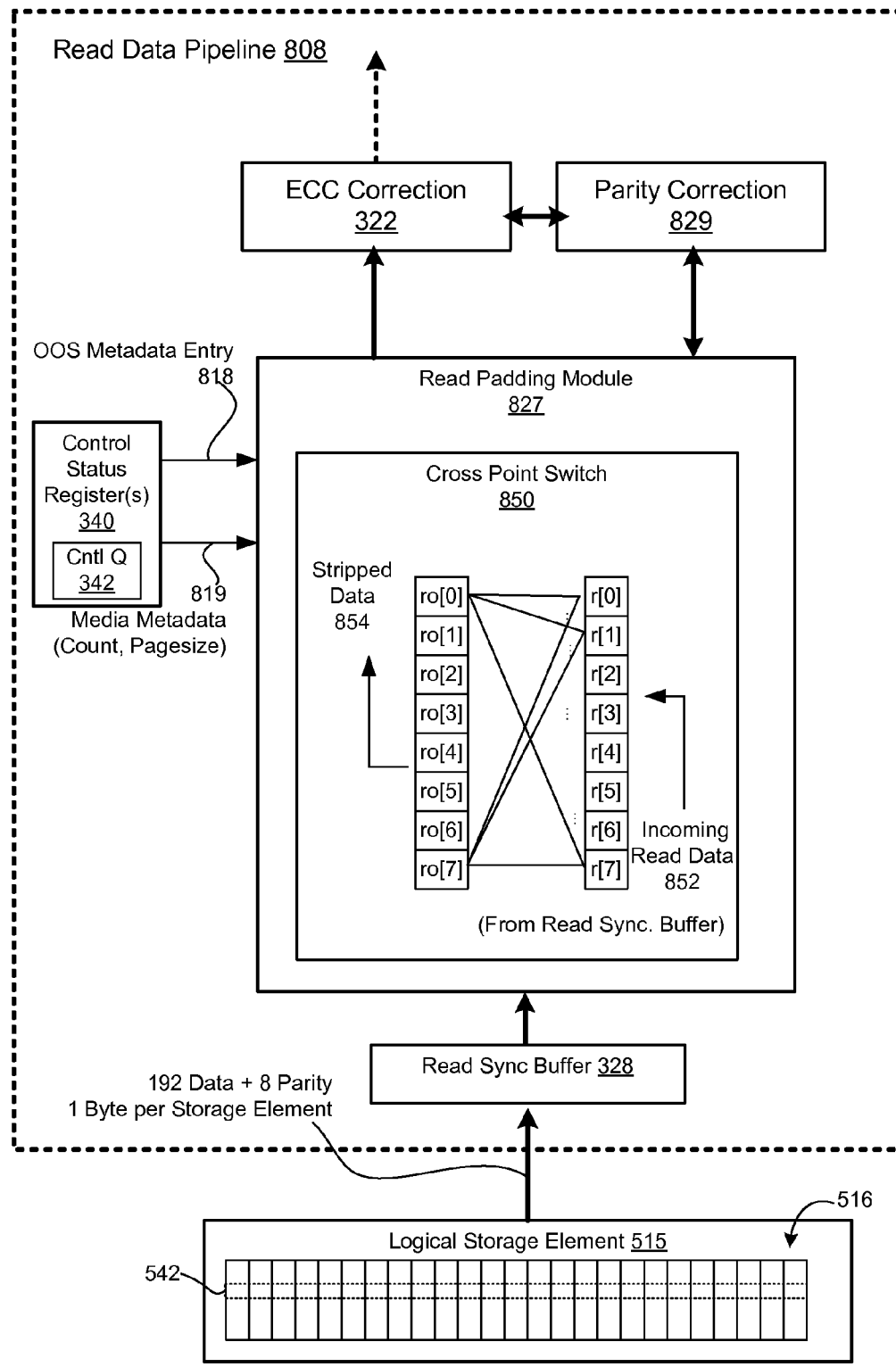
FIG. 8B is a block diagram of one embodiment of a read data pipeline configured to manage adaptive logical storage units.

FIG. 8B is a block diagram of one embodiment of a read data pipeline configured to manage adaptive logical storage units. The read data pipeline 808 may comprise a cross-point switch 850 (or other data manipulation module) that is configured to adaptively strip padding data from the incoming read data 852 of the logical storage element 515. The cross-point switch 850 may be capable of switching any byte r[0]-r[7] from the incoming read data 852 with any output byte ro[0]-ro[7] of the stripped data 854. In some embodiments, the write data pipeline 806 and read data pipeline 808 may share the same cross-point switch. Alternatively, and as depicted in FIGS. 8A and 8B, the write data pipeline 806 and the read data pipeline 808 may each comprise respective cross-point switches 840 and 850.

In response to accessing incoming read data 852 (data r[0]-r[n]) of a particular logical storage unit 542, the read padding module 827 may identify OOS physical storage elements of the logical storage unit 542 (if any) using the OOS metadata entry 818, as described above. The read padding module 827 may also access media metadata 819 to identify padding data within the incoming read data 852. The read padding module 827 may use the cross-point switch 850 to strip padding data (e.g., data corresponding to the OOS physical storage units and/or data added to account for storage unit boundaries "fill padding") from the incoming read data 852, resulting in stripped/padded data 854. Accordingly, the stripped/padded data 854 may comprise less data than the incoming read data 852.

The stripped data 854 may flow to the ECC correction module 322, which may validate and/or correct ECC codewords, as described above. In response to detecting an error that cannot be corrected using the ECC correction module 322, the read data pipeline 808 (or other entity) may attempt to identify and/or correct the error using parity information and the OOS metadata entry 818. In this manner, there is no need for the cross-point switch 850 to add padding data to the data stream. Instead, the parity correction module 829 (e.g., using an iterative parity substitution operation), as described in United States Patent Application Publication No. 2009/0287956 uses the OOS metadata entry 818 to identify which of the in-service storage units causes the ECC codeword decoding to fail, and uses the parity data to produce a codeword that can be used by the ECC correction module 322 to correct any remaining errors such that the data is recovered and its integrity is intact.

In another embodiment, rather than stripping data corresponding to OOS physical storage units, the cross-point switch 850 may mask these bytes with padding data. The padding data may be configured such that it does not affect parity calculations of the parity correction module 829. The insertion of the padding data 851 may facilitate the parity correction module 829 to identifying the source of the error. However, in other embodiments, no padding may be inserted, and the parity correction module 829 may identify the source of the error from the stripped data 854. The resulting stripped/padded data 854 may flow to the parity correction module 829 that performs a parity check on the data to correct and/or identify the source of the errors therein, as described above.

In some embodiments, correcting and/or identifying the source of the error may comprise re-reading the data 852 of the logical storage unit 542, inserting padding data using the cross point switch 850, and processing parity information of the padded data 854 using the parity correction module 829 (e.g., using an iterative parity substitution operation), as described in United States Patent Application Publication No. 2009/0287956, incorporated by reference above.

Figure 9:
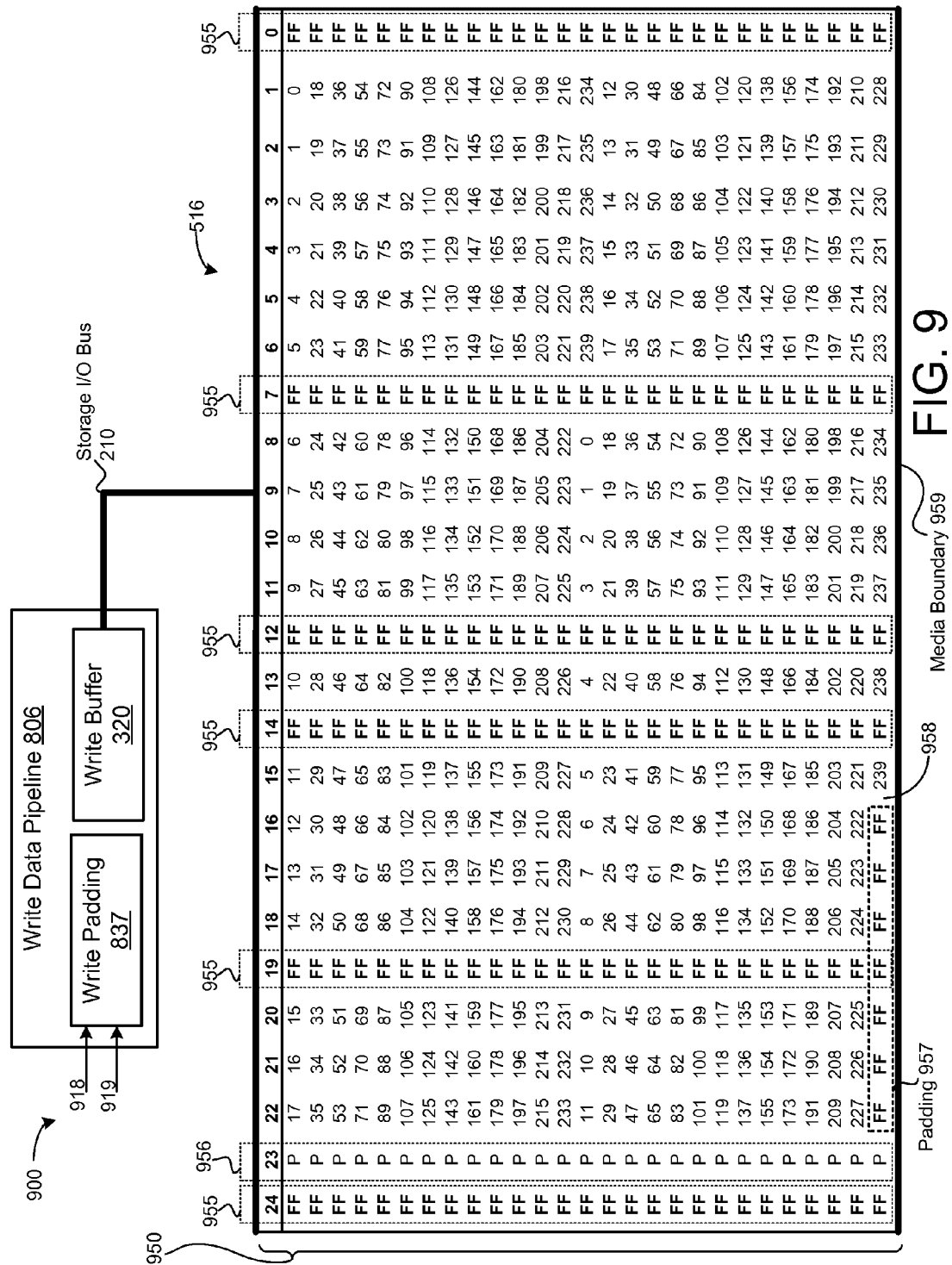
FIG. 9 is a block diagram depicting a data pattern for an adaptive logical storage element.

FIG. 9 is a block diagram 900 that depicts one example of a data padding pattern generated by a write padding module 837. The FIG. 9 example depicts a data pattern for ECC codewords that comprises 240 bytes (224 bytes of data and a 16 byte error-correcting code). In FIG. 9, the ECC codeword data is represented as a sequence from (0) to two hundred thirty-nine (239). The disclosure, however, should not be read as limited in this regard and could be adapted to operate using any ECC codeword size and/or data configuration.

The OOS metadata entry 918 for the logical storage unit 950 indicates that five (5) of the physical storage units are out-of-service. The OOS metadata entry 918 may be represented by the following 24-bit OOS metadata entry 819 bitmask: "0_11110111_10101111_01111110." FIG. 9 also depicts a media boundary 959 of the logical storage unit 950. The media boundary 959 may comprise a physical storage unit boundary (e.g., a page boundary of the storage elements 516), a physical storage division boundary (e.g., an erase block boundary of the storage elements 516), or another type of boundary.

FIG. 9 illustrates ECC codewords stored sequentially on the logical storage unit 950 (from byte 0 to 239). The write padding module 837 inserts padding data into the write buffer 320, such that padding data ("FF") maps to the storage elements 955 comprising out-of-service storage units (per the OOS metadata entry 918). The write data pipeline 806 may also comprise a write parity module (e.g., the write parity module 639 described above), which may calculate parity data. In some embodiments, the parity data may be stored on a pre-determined location in the logical storage unit 950 (e.g., on the "highest" in-service storage element). In the FIG. 9 example, the parity data is stored on the storage element 956 (storage element 23) since the "highest" storage element 24 is out-of-service.

The write padding module 837 accesses the media metadata 919 to determine, inter alia, the relative location of the data streaming to the write buffer 320 with respect to the media boundary 959. The write padding module 837 may use the media metadata 919 to lay out data on the storage elements 516 and/or to prevent ECC codewords (or other data structures) from overrunning media boundaries (e.g., media boundary 959). As shown in the FIG. 9 example, as the write padding module 837 streams the end of the ECC codeword terminating at position 958 to the write buffer 320, the write padding module 837 determines that a next ECC codeword cannot be placed in the logical storage unit 950 without overrunning the media boundary 959 (e.g., using a "count" value or other media metadata 919). To prevent the next ECC codeword from overrunning the media boundary 959, the write padding module 837 may insert padding 957 to fill the remainder of the logical storage unit 950. Alternatively, or in addition, the write data pipeline 806 may replace the next ECC codeword with another data structure that can fit into the space remaining in the logical page 950 without overrunning the media boundary 959 (e.g., a trim note, or the like). After the logical page 950 is programmed to the storage elements 516, the write padding module 837 accesses a next OOS metadata entry 918 and/or media metadata 919 and continues operation as described above.

Figure 10:
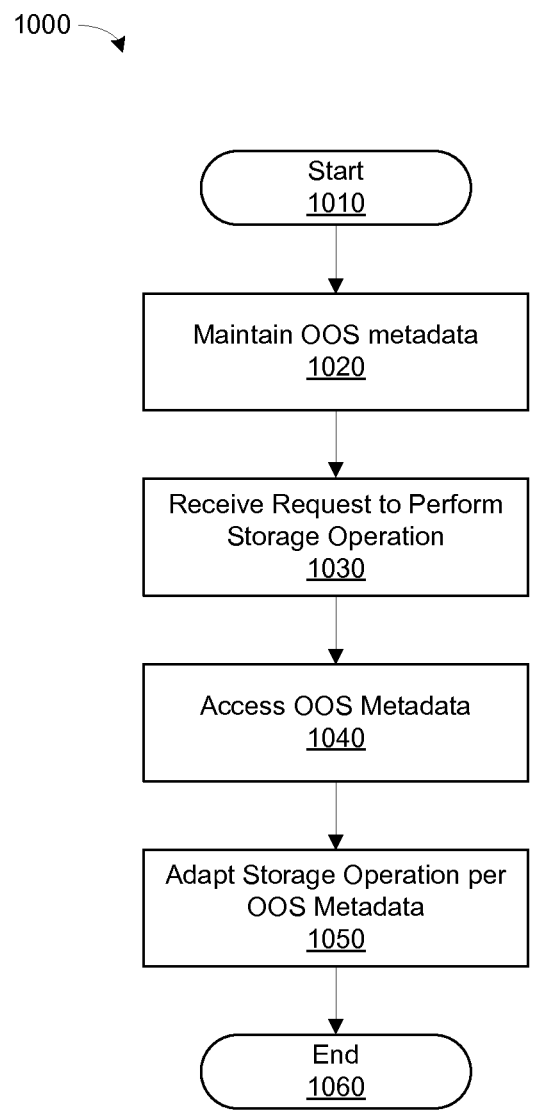
FIG. 10 is a flow diagram of one embodiment of a method for performing storage operations on an adaptive logical storage element.

FIG. 10 is a flow diagram of one embodiment of a method 1000 for performing storage operations on an adaptive logical storage element. The method 1000 may be implemented in connection with a solid-state storage device, such as the device 102 described above. However, the systems and methods disclosed herein are not limited to particular solid-state storage device configurations, and could be applied to other solid-state storage device configurations and/or types. The method 1000 may be embodied as one or more machine-readable instructions stored on a non-transitory storage medium, such as a solid-state storage device, hard disk, optical media, or the like. The instructions may be executable by a machine (e.g., comprising processor, FPGA, or the like) to perform one or more of the following steps. Steps of the method 1000 may be tied to particular machine components, such as communications interfaces, communication buses, solid-state storage media, and the like.

At step 1010, the method 1000 starts and is initialized. Step 1010 may comprise loading one or more machine-readable instructions from a non-transitory machine-readable storage medium, initializing communication interfaces, and so on.

At step 1020, the method 1000 initializes and/or maintains OOS metadata for a logical storage element. The OOS metadata may identify physical storage units on the logical storage element that are out of service. An OOS storage unit may refer to a particular storage unit (e.g., page), a storage division (e.g., erase block), or other unit of storage that is not used for storage operations due to, inter alia, unacceptable error rates, loss of communication, performance, or the like. Maintaining the OOS metadata may comprise maintaining an OOS metadata entry (e.g., bitmask) for each of a plurality of logical storage units on the solid-state storage media. The logical storage units may refer to logical storage divisions (e.g., logical erase blocks), logical storage units (e.g., logical pages), or other logical storage units. The bitmasks may identify, for each logical storage unit, which physical storage units are out of service.

At step 1030, the method 1000 receives a request to perform a storage operation on a logical storage unit of the solid-state storage media. The requested storage operation may be a read, write (program), or the like.

At step 1040, and in connection with performing the requested storage operation of step 1030, the method 1000 accesses the OOS metadata entry pertaining to the logical storage unit on which the storage operation is to be performed. Step 1040 may comprise accessing the OOS metadata in a data structure, such as a reverse map, or the like.

At step 1050, the OOS metadata is used to adapt the storage operation of step 1030, according to the OOS conditions of the logical storage unit. If the operation is a write (program), step 1050 may comprise masking the OOS physical storage units, which may comprise configuring data to be programmed on the logical storage unit, such that padding data is mapped to out-of-service storage units (e.g., as identified by the OOS metadata entry). Alternatively, the masking may comprise allowing pins of the OOS physical storage units to float (the pins may not be driven, may retain old values, or the like). If the operation is a read operation, step 1050 may comprise stripping data corresponding to the OOS physical storage units from data read from the logical storage unit. Step 1050 may further comprise masking data read from the logical storage unit with padding data configured to be compatible with an error detection/recovery functions implemented by the method 1000. For example, the padding data may comprise "1s" to operate with an XOR parity calculation.

At step 1060, the method ends until a next storage operation is to be performed, at which point the flow returns to step 1020.

Figure 11:
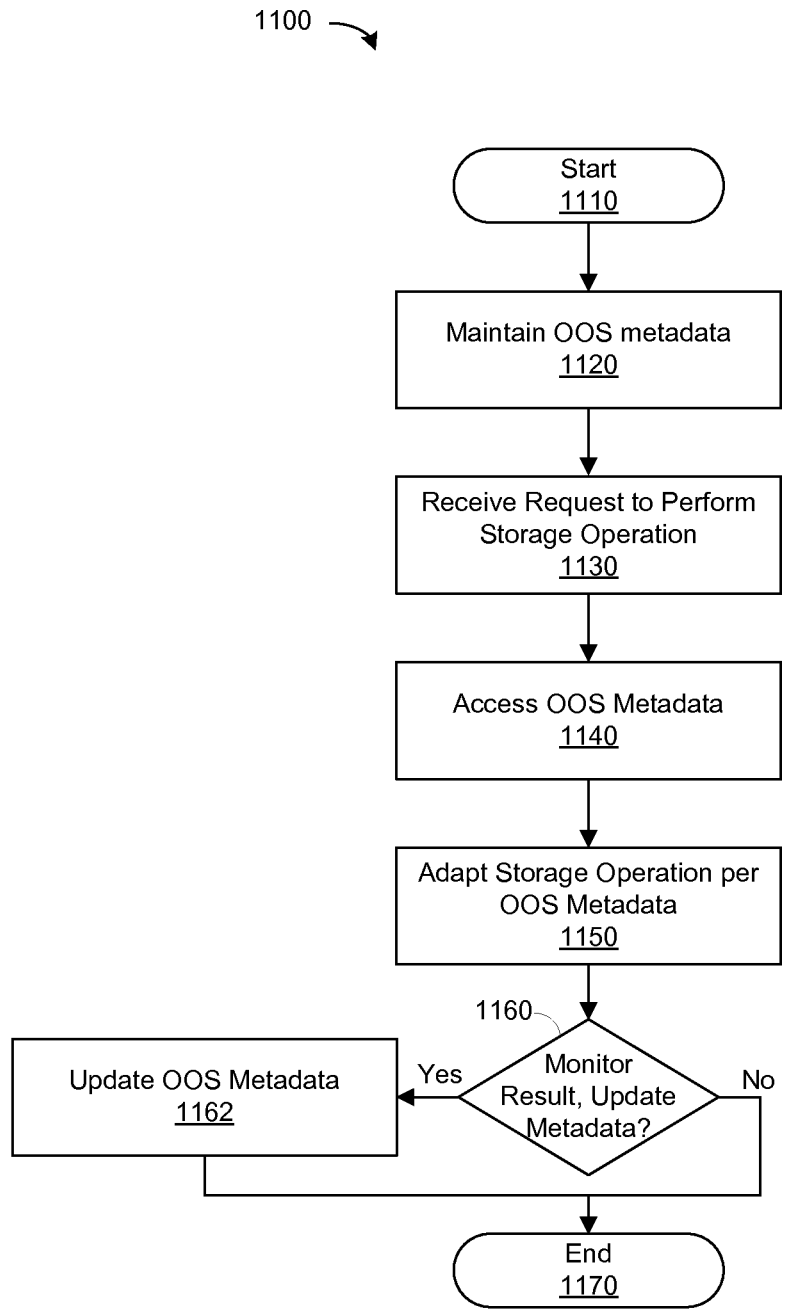
FIG. 11 is a flow diagram of another embodiment of a method for performing storage operations on an adaptive logical storage element.

FIG. 11 is a flow diagram of another embodiment of a method for performing storage operations on an adaptive logical storage element.

At steps 1110, 1120, 1130, 1140, and 1150 the method 1100 starts, OOS metadata is maintained, a storage request is received, the OOS metadata is accessed, and the storage operation is adapted per the OOS metadata, as described above.

At step 1160, the method 1160 monitors a result of the storage operation to determine whether any of the storage units upon which the operation was performed returned an error condition, exhibited unacceptable performance, or otherwise indicated that the storage unit should be taken out of service. If step 1160 indicates that one or more storage units should be taken out of service, the flow continues to step 1162; otherwise the flow continues to step 1170.

At step 1162, the OOS metadata is updated to indicate that the one or more storage units identified at step 1160 should be taken out of service. The updating of step 1162 may comprise setting an OOS bitmask of the logical storage unit to identify the storage units.

At step 1170, the flow terminates until a next storage operation request is received, at which point the flow continues at step 1120.

Figure 12:
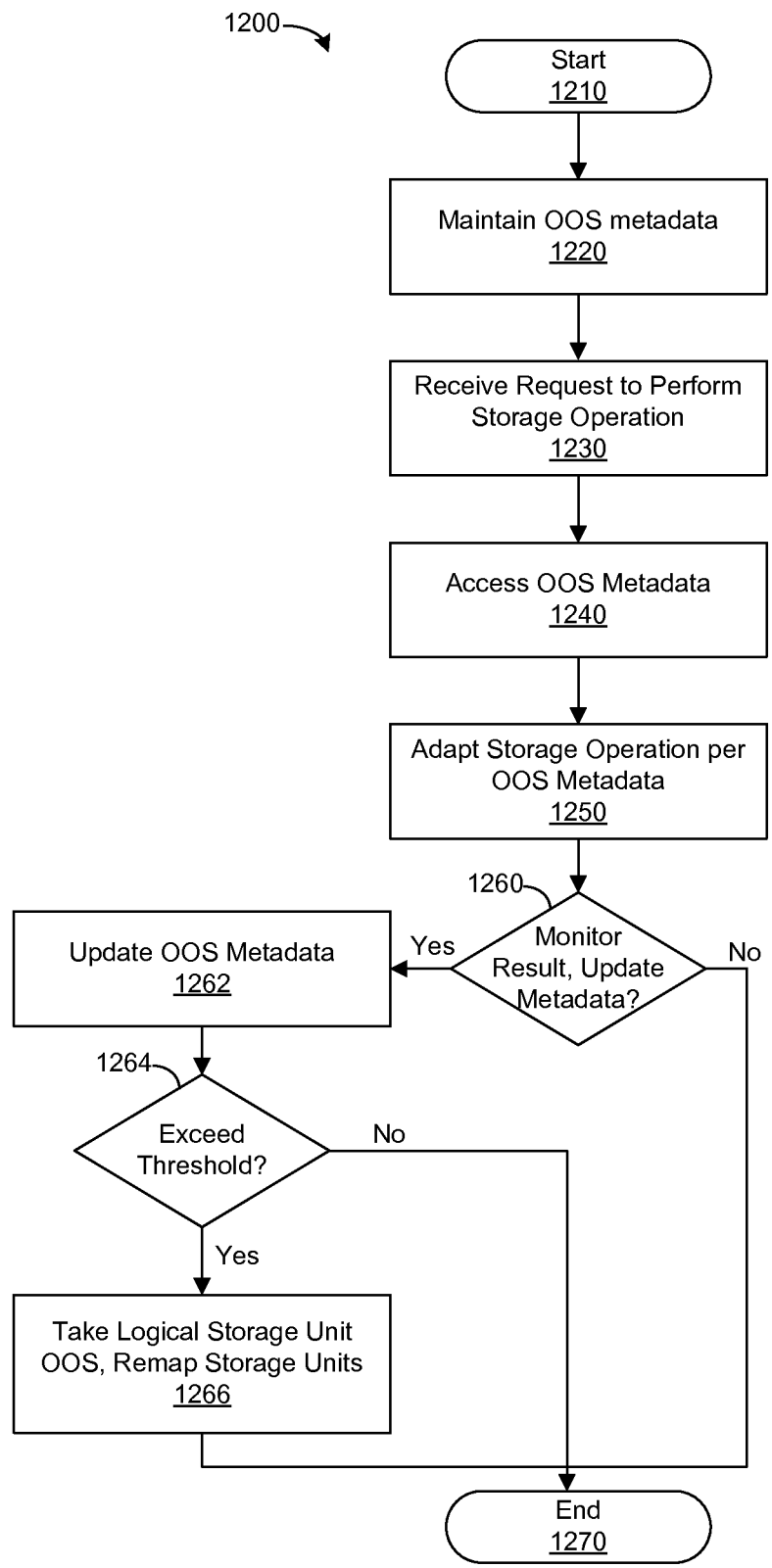
FIG. 12 is a flow diagram of another embodiment of a method for performing storage operations on an adaptive logical storage element.

FIG. 12 is a flow diagram of another embodiment of a method 1200 for performing storage operations on an adaptive logical storage element.

At steps 1210, 1220, 1230, 1240, 1250, 1260, and 1262 the method 1200 may start, OOS metadata may be maintained, a storage request may be received, OOS metadata is accessed, the storage operation may adapted per the OOS metadata, a result of the operation may be monitored, and/or the OOS metadata may be updated as described above.

At step 1264, the method may determine whether the number of OOS storage units in the logical storage unit exceed a maximum OOS threshold. If the threshold is exceeded, the flow continues at step 1266; otherwise, the flow continues at step 1270.

At step 1266, the logical storage unit may be taken out of service. Alternatively, step 1266 may comprise implementing a hybrid mechanism for handling OOS conditions. For example, at step 1266, one or more replacement storage units are identified and remapped into the logical storage unit as described above. This remapping may comprise providing a different physical address to each of the solid-state storage elements in the logical storage unit (as depicted in FIG. 5D).

At step 1270, the flow terminates until a next storage operation request is received, at which point the flow continues at step 1220.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing storage operations, the method comprising:
   receiving a request to perform a storage operation on a logical storage unit comprising a plurality of solid state physical storage units of a storage media that are accessible in parallel; and
   adapting the storage operation performed on the logical storage unit to account for a physical storage unit of the logical storage unit that is out of service in response to the request;
   wherein the storage operation comprises storing data on the logical storage unit, and wherein adapting the storage operation comprises combining padding data with data of the storage operation to mask the out-of-service physical storage units with the padding data.

2. The method of claim 1, wherein adapting the storage operation comprises masking physical storage units of the logical storage unit that are out of service.

3. The method of claim 1, further comprising referencing out-of-service metadata of the logical storage unit to identify out-of-service physical storage units of the logical storage unit.

4. The method of claim 3, further comprising maintaining the out-of-service metadata at one of a page level of granularity, an erase block level of granularity, a die level of granularity, a plane level of granularity, and a storage element level of granularity.

5. The method of claim 1, further comprising accessing each physical storage unit of the logical storage unit using the same address.

6. The method of claim 1, further comprising remapping one or more replacement physical storage units into the logical storage unit to replace physical storage units in the first a set in response to a number of out-of-service physical storage units of the logical storage unit exceeding a threshold.

7. The method of claim 1, further comprising adapting the storage operation without remapping the out of service physical storage unit.

8. An apparatus for performing storage operations, comprising:
   a plurality of storage elements; and
   a storage controller in parallel communication with each of the plurality of storage elements to form a plurality of logical storage units, each logical storage unit comprising respective physical storage units of the storage elements;
   wherein the storage controller is configured to adapt storage operations performed on the logical storage units in accordance with out-of-service metadata that identifies physical storage units that are out of service, wherein the storage controller adapts a storage operation to store data on a logical storage unit by mapping padding data to out-of-service physical storage units of the logical storage unit on a bus coupling the storage controller to the storage elements.

9. The apparatus of claim 8, wherein the storage controller comprises a switch to combine padding data with data of the storage operation such that the padding data masks the out-of-service physical storage units of the logical storage unit.

10. The apparatus of claim 8, wherein the storage controller provides the same physical address to each physical storage unit of the logical storage unit and programs data on the logical storage unit using a single program command.

11. The apparatus of claim 10, wherein the storage controller configures the single program command to bypass out-of-service physical storage units of the logical storage unit.

12. The apparatus of claim 8, wherein the storage controller adapts a storage operation to read data on a logical storage unit by stripping data corresponding to out-of-service physical storage units from data read from the logical storage unit.

13. The apparatus of claim 8, wherein the storage controller ignores status pertaining to physical storage units that are out of service.

14. The apparatus of claim 8, wherein the storage controller identifies a physical storage unit to hold parity data of a logical storage unit using the out-of-service metadata.

15. The apparatus of claim 8, wherein the storage controller replaces an out-of-service physical storage unit of a logical storage unit with a replacement physical storage unit in response to a number of out-of-service physical storage units of the logical storage unit exceeding a threshold.

16. A computer-readable, non-transitory storage medium comprising instructions to cause a computing device to perform a method, comprising:
  receiving a request to perform a storage operation on one of a plurality of logical storage units, each logical storage unit comprising a respective plurality of solid state physical storage units of a storage media that are all accessible in parallel;
  referencing out-of-service metadata to identify a physical storage unit of the logical storage unit that is out of service; and
  adapting a storage operation performed on the logical storage unit to mask the physical storage unit that is out of service;
  wherein adapting the storage operation comprises one of: mapping padding data to the out-of-service physical storage units on a bus that couples the storage controller to the physical storage units of the logical storage unit; and stripping data corresponding to the out-of-service physical storage units from data read from the physical storage units of the logical storage unit.

17. A method for managing storage operations, the method comprising:
  receiving a request to perform a storage operation on a logical storage unit comprising a plurality of solid state physical storage units of a storage media that are accessible in parallel; and
  adapting the storage operation performed on the logical storage unit to account for a physical storage unit of the logical storage unit that is out of service in response to the request;
  wherein the storage operation comprises reading data of the logical storage unit, and wherein adapting the storage operation comprises one of:
  stripping data corresponding to the out-of-service physical storage units from data read from the logical storage unit; and
  stripping padding data from data read from the logical storage unit, wherein the padding data prevents an ECC codeword from overrunning a storage boundary.

* * * * *